United States Patent
Horowitz et al.

(10) Patent No.: US 9,983,686 B2
(45) Date of Patent: *May 29, 2018

(54) SYSTEMS AND METHODS OF TRACKING MOVING HANDS AND RECOGNIZING GESTURAL INTERACTIONS

(71) Applicant: Leap Motion, Inc., San Francisco, CA (US)

(72) Inventors: Kevin A. Horowitz, San Francisco, CA (US); Matias Perez, San Francisco, CA (US); Raffi Bedikian, San Francisco, CA (US); David S. Holz, San Francisco, CA (US); Gabriel A. Hare, Daly City, CA (US)

(73) Assignee: Leap Motion, Inc., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/728,242

(22) Filed: Oct. 9, 2017

(65) Prior Publication Data
US 2018/0032144 A1    Feb. 1, 2018

Related U.S. Application Data

(63) Continuation of application No. 14/712,699, filed on May 14, 2015, now Pat. No. 9,785,247.
(Continued)

(51) Int. Cl.
*G09G 5/00*     (2006.01)
*G06F 3/01*     (2006.01)
(Continued)

(52) U.S. Cl.
CPC ............ *G06F 3/017* (2013.01); *G06F 3/0304* (2013.01); *G06K 9/00355* (2013.01); *G06T 7/20* (2013.01);
(Continued)

(58) Field of Classification Search
CPC . G05B 15/02; G05B 2219/2642; G06F 3/017; G06F 3/0304; H04L 12/2803; H04L 12/2809
See application file for complete search history.

(56) References Cited

U.S. PATENT DOCUMENTS 7,472,047 B2    12/2008 Kramer et al.
8,768,022 B2    7/2014 Miga et al.
(Continued)

OTHER PUBLICATIONS

U.S. Appl. No. 14/712,699—Office Action dated Nov. 7, 2016, 17 pages.
(Continued)

*Primary Examiner* — Insa Sadio
(74) *Attorney, Agent, or Firm* — Haynes Beffel & Wolfeld LLP; Ernest J. Beffel, Jr.

(57) ABSTRACT

The technology disclosed relates to relates to providing command input to a machine under control. It further relates to gesturally interacting with the machine. The technology disclosed also relates to providing monitoring information about a process under control. The technology disclosed further relates to providing biometric information about an individual. The technology disclosed yet further relates to providing abstract features information (pose, grab strength, pinch strength, confidence, and so forth) about an individual.

25 Claims, 49 Drawing Sheets

Related U.S. Application Data

(60) Provisional application No. 61/996,778, filed on May 14, 2014.

(51) Int. Cl.

| | |
|---|---|
| *G06T 7/246* | (2017.01) |
| *G06T 19/00* | (2011.01) |
| *G06T 7/20* | (2017.01) |
| *H04N 13/02* | (2006.01) |
| *G06F 3/03* | (2006.01) |
| *G06K 9/00* | (2006.01) |

(52) U.S. Cl.
CPC ............ *G06T 7/251* (2017.01); *G06T 19/006* (2013.01); *H04N 13/0296* (2013.01)

(56) References Cited

U.S. PATENT DOCUMENTS

| | | | |
|---|---|---|---|
| 9,119,670 | B2 | 9/2015 | Yang et al. |
| 9,135,503 | B2 | 9/2015 | Sundaresan et al. |
| 9,305,229 | B2 | 4/2016 | DeLean et al. |
| 9,721,383 | B1 | 8/2017 | Horowitz et al. |
| 2008/0291160 | A1 | 11/2008 | Rabin |
| 2010/0127995 | A1 | 5/2010 | Rigazio et al. |
| 2010/0329509 | A1* | 12/2010 | Fahn .................. G06F 3/017 382/103 |
| 2013/0086531 | A1 | 4/2013 | Sugita et al. |
| 2013/0120319 | A1 | 5/2013 | Givon |
| 2013/0182902 | A1* | 7/2013 | Holz .................. G06K 9/3233 382/103 |
| 2013/0300831 | A1 | 11/2013 | Mavromatis et al. |

OTHER PUBLICATIONS

U.S. Appl. No. 14/712,699—Response to Office Action dated Nov. 7, 2016 filed Mar. 7, 2017, 9 pages.

U.S. Appl. No. 14/712,699—Notice of Allowance dated Apr. 24, 2017, 8 pages.

U.S. Appl. No. 14/474,068—Office Action dated Sep. 12, 2016, 23 pages.

Ballan et al., "Lecture Notes Computer Science: 12th European Conference on Computer Vision: Motion Capture of Hands in Action Using Discriminative Salient Points", Oct. 7-13, 2012 [retrieved Jul. 14, 2016], Springer Berlin Heidelberg, vol. 7577, pp. 640-653. Retrieved from the Internet: <http://link.springer.com/chapter/1 0.1 007/978-3-642-33783-3 46>.

Cui et al., "Applications of Evolutionary Computing: Vision-Based Hand Motion Capture Using Genetic Algorithm", 2004 [retrieved Jul. 15, 2016], Springer Berlin Heidelberg, vol. 3005 of LNCS, pp. 289-300. Retrieved from the Internet: <http://link.springer.com/chapter/10.1007/978-3-540-24653-4_30>.

Delamarre et al., "Finding Pose of Hand in Video Images: A Stereo-based Approach", Apr. 14-16, 1998 [retrieved Jul. 15, 2016], Third IEEE Intern Conf on Auto Face and Gesture Recog, pp. 585-590. Retrieved from the Internet: <http://ieeexplore.ieee.org/xpl/login.jsp?tp=&arnumber=671011&url=http%3A%2F%2Fieeexplore.ieee.org%2Fxpls%2Fabs_all.jsp%3Farnumber%3D671011>.

Gorce et al., "Model-Based 3D Hand Pose Estimation from Monocular Video", Feb. 24, 2011 [retrieved Jul. 15, 2016], IEEE Transac Pattern Analysis and Machine Intell, vol. 33, Issue: 9, pp. 1793-1805, Retri Internet: <http://ieeexplore.ieee.org/xpl/logi n .jsp ?tp=&arnu mber=571 9617 &u rl=http%3A %2 F%2 Fieeexplore.ieee.org%2Fxpls%2 Fabs all.jsp%3Farnumber%3D5719617>.

Guo et al., Featured Wand for 3D Interaction, Jul. 2-5, 2007 [retrieved Jul. 15, 2016], 2007 IEEE International Conference an Multimedia and Expo, pp. 2230-2231 Retrieved from the Internet: <http://ieeexplore.ieee.org/xpl/login.jsp?tp=&arnumber=4285129&tag=1&url=http%3A%2F%2Fieeexplore.ieee.org%2Fxpls%2Fabs_all.jsp%3Farnumber%3D4285129%26tag%3D1>.

Melax et al., "Dynamics Based 3D Skeletal Hand Tracking", May 29, 2013 [retrieved Jul. 14, 2016], Proceedings of Graphics Interface, 2013, pp. 63-70. Retrived from the Internet: <http://dl.acm.org/citation.cfm?id=2532141>.

Oka et al., "Real-Time Fingertip Tracking and Gesture Recognition", Nov./Dec. 2002 [retrieved Jul. 15, 2016], IEEE computer Graphics and Applications, vol. 22, Issue: 6, pp. 64-71. Retrieved from the Internet: <http://ieeexplore.ieee.org/xpl/login.jsp?tp=&arnumber=1046630&url=http%3A%2F%2Fieeexplore.ieee.org%2Fxpls%2Fabsall.jsp%3Farnumber%3D1046630>.

Schlattmann et al., "Markerless 4 gestures 6 DOF real-time visual tracking of the human hand with automatic initialization", 2007 [retrieved Jul. 15, 2016], Eurographics 2007, vol. 26, No. 3, 10 pages, Retrieved from the Internet: <http://cg.cs.uni-bonn.de/aigaion2root/attachments/schlattmann-2007-markerless.pdf>.

Wang et al., "Tracking of Deformable Hand in Real Time as Continuous Input for Gesture-based Interaction", Jan. 28, 2007 [retrieved Jul. 15, 2016], Proceedings of the 12th International Conference on Intelligent User Interfaces, pp. 235-242. Retrieved fromthe Internet: <http://dl.acm.org/citation.cfm?id=1216338>.

Zhao et al., "Combining Marker-Based Mocap and RGB-D Camera for Acquiring High-Fidelity Hand Motion Data", Jul. 29, 2012 [retrieved Jul. 15, 2016], Proceedings of the ACM SIGGRAPH/Eurographics Symposium on Computer Animation, pp. 33-42, Retrieved from the Internet: <http://dl.acm.org/citation.cfm?id=2422363>.

U.S. Appl. No. 14/474,077—Office Action dated Mar. 14, 2017, 13 pages.

De La Gorce et al., "Model-Based 30 Hand Pose Estimation from Monocular Video", IEEE Transactions on Pattern Analysis and Machine Intelligence, vol. 33, No. 9, Sep. 2011, pp. 1793-1805.

Stenger, "Model-Based 30 Tracking of an Articulated Hand", Computer Vision and Pattern Recognition, 2001. CVPR 2001 Proceedings of the 2001 IEEE Computer Society Conference on. vol. 2. IEEE, 2001, pp. 1-6.

U.S. Appl. No. 14/474,068—Notice of Allowance dated Jan. 25, 2017, 15 pages.

U.S. Appl. No. 14/474,077—Office Action dated Jul. 26, 2016, 30 pages.

U.S. Appl. No. 14/474,077—Response to Office Action dated Mar. 14, 2017 filed Jun. 9, 2017, 12 pages.

U.S. Appl. No. 14/474,077—Response to Office Action dated Jul. 26, 2016 filed Dec. 1, 2016, 10 pages.

U.S. Appl. No. 14/474,077—Office Action dated Sep. 8, 2017, 16 pages.

U.S. Appl. No. 14/474,077—Response to Office Action dated Sep. 8, 2017, filed Dec. 8, 2017, 11 pages.

U.S. Appl. No. 14/474,068—Response to Office Action dated Sep. 12, 2016 filed Dec. 12, 2016, 9 pages.

\* cited by examiner

SYSTEMS AND METHODS OF TRACKING MOVING HANDS AND RECOGNIZING GESTURAL INTERACTIONS

PRIORITY DATA

This application is a continuation of U.S. patent application Ser. No. 14/712,699, entitled "Systems and Methods of Tracking Moving Hands and Recognizing Gestural Interactions", filed on 14 May 2015, which claims the benefit of U.S. Provisional Patent Application No. 61/996,778, entitled, "SYSTEMS AND METHODS OF TRACKING MOVING HANDS AND RECOGNIZING GESTURAL INTERACTIONS," filed on 14 May 2014. The non-provisional and provisional applications are hereby incorporated by reference for all purposes.

FIELD OF THE TECHNOLOGY DISCLOSED

The technology disclosed relates, in general, to motion capture and gesture recognition and interpretation in pervasive computing environments, and in particular implementations, to facilitate recognition of gestural inputs from tracked motions of hands.

INCORPORATIONS

Materials incorporated by reference in this filing include the following:

DETERMINING POSITIONAL INFORMATION FOR AN OBJECT IN SPACE, U.S. Prov. App. No. 61/895,965, filed 25 Oct. 2013, DRIFT CANCELATION FOR PORTABLE OBJECT DETECTION AND TRACKING, U.S. Prov. App. No. 61/938,635, filed 11 Feb. 2014, BIOMETRIC AWARE OBJECT DETECTION AND TRACKING, U.S. Prov. App. No. 61/952,843, filed 13 Mar. 2014, PREDICTIVE INFORMATION FOR FREE SPACE GESTURE CONTROL AND COMMUNICATION, U.S. Prov. App. No. 61/871,790, filed 29 Aug. 2013, PREDICTIVE INFORMATION FOR FREE-SPACE GESTURE CONTROL AND COMMUNICATION, U.S. Prov. App. No. 61/873,758, filed 4 Sep. 2013, PREDICTIVE INFORMATION FOR FREE SPACE GESTURE CONTROL AND COMMUNICATION, U.S. Prov. App. No. 61/898,462, filed 31 Oct. 2013, INITIALIZING PREDICTIVE INFORMATION FOR FREE SPACE GESTURE CONTROL AND COMMUNICATION, U.S. Prov. App. No. 61/911,975, filed 4 Dec. 2013, INITIALIZING ORIENTATION IN SPACE FOR PREDICTIVE INFORMATION FOR FREE SPACE GESTURE CONTROL AND COMMUNICATION, U.S. Prov. App. No. 61/924,193, filed 6 Jan. 2014, DYNAMIC USER INTERACTIONS FOR DISPLAY CONTROL, U.S. Non-Prov. application. Ser. No. 14/214,336, filed 14 Mar. 2014, and RESOURCE-RESPONSIVE MOTION CAPTURE, U.S. Non-Prov. application. Ser. No. 14/214,569, filed 14 Mar. 2014.

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

There has been a growing interest in developing natural interactions with electronic devices that facilitate intuitiveness and enhance user experience. For instance, a user might want to control a surgical robot performing open heart surgery in another room, or a wafer processing machine in a remote clean room environment, or adjust the music volume while cooking with a free-form gesture in the air, or change the song playing on an entertainment system in the living room while cooking, or turn up the thermostat while in bed, or switch on a lamp while sitting on a couch.

Existing techniques utilize conventional motion capture approaches that rely on markers or sensors worn by the occupant while executing activities and/or on the strategic placement of numerous bulky and/or complex equipment in specialized smart home environments to capture occupant movements. Unfortunately, such systems tend to be expensive to construct. In addition, markers or sensors worn by the occupant can be cumbersome and interfere with the occupant's natural movement. Further, systems involving large amounts of hardware tend not to operate in real time due to the volume of data that needs to be analyzed and correlated. Such considerations have limited the deployment and use of motion capture technology.

Consequently, there is a need for improved techniques to capture motion of objects in real time without attaching sensors or markers thereto and to facilitate robust tracking of hands that provide inputs or perform tasks in pervasive computing environments.

SUMMARY

The technology disclosed relates to providing command input to a machine under control by tracking of hands (or other body portions, alone or in conjunction with tools) serving as control objects that provide input to, or perform tasks monitored by, computers or other intelligent machinery. A motion sensory control device detects gestures in a three dimensional (3D) sensory space by capturing images using cameras (and/or other sensory input devices), analyzing the images to yield 3D information suitable for defining a capsule model of the subject being imaged, associating 3D information to each capsule model, aligning (rigidly, non-rigidly, or combinations thereof) the capsule model with the 3D information, abstracting information from the model to detect a variance and/or a state of the subject being imaged, determining whether the variance is a gesture in the 3D sensory space, and interpreting the gesture as providing command input to a machine under control.

In one implementation, described is a method of determining command input to a machine responsive to control object gestures in three dimensional (3D) sensory space. The method comprises determining observation information including gestural motion of a control object in three dimensional (3D) sensory space from at least one image captured at time t0, constructing a 3D model to represent the control object by fitting one or more 3D capsules to the observation information based on the image captured at time t0, responsive to modifications in the observation information based on another image captured at time t1, wherein the control object moved between t0 and t1, improving alignment of the 3D capsules to the modified observation information by determining variance between a point on another set of observation information based on the image captured at time t1 and a corresponding point on at least one of the 3D capsules fitted to the observation information based on the image captured at time t0 and responsive to the variance adjusting the 3D capsules and determining a gesture performed by the control object based on the adjusted 3D capsules, and interpreting the gesture as providing command input to a machine under control.

In some implementations, adjusting the 3D capsules further includes improving conformance of the 3D capsules to at least one of length, width, orientation, and arrangement of portions of the observation information.

In other implementations, the method further includes receiving an image of a hand as the control object, determining span modes of the hand, wherein the span modes include at least a finger width span mode and a palm width span mode, and using span width parameters for the finger width and palm width span modes to initialize 3D capsules of a 3D model of the hand.

In yet other implementations, the method further includes receiving an image of a hand as the control object, determining span modes of the hand, wherein the span modes include at least a finger width span mode, a palm width span mode, and a wrist width span mode, and using span width parameters for the finger width, palm width, and wrist width span modes to initialize a 3D model of the hand and corresponding arm.

In a further implementation, the method includes interpreting the gesture as selecting one or more heterogeneous devices in the 3D sensory space.

The method further includes interpreting the gesture as selecting one or more heterogeneous marker images that trigger augmented illusions.

The method further includes automatically switching the machine under control from one operational mode to another in response to interpreting the gesture.

The method further includes determining whether the point on another set of observation information based on the image captured at time t1 and the corresponding point on one of the 3D capsules fitted to the observation information defined based on the image captured at time t0 are within a threshold closest distance.

The method further includes pairing point sets on an observation information of the control object with points on axes of the 3D capsules, wherein the observation information points lie on vectors that are normal to the axes and determining a reduced root mean squared deviation (RMSD) of distances between paired point sets.

The method further includes pairing point sets on an observation information of the control object with points on the 3D capsules, wherein normal vectors to the points sets are parallel to each other and determining a reduced root mean squared deviation (RMSD) of distances between bases of the normal vectors.

The method further includes determining from the 3D model at least one of a velocity of a portion of a hand, a state, a pose.

The method further includes determining at least one of a velocity of one or more fingers, and a relative motion of a portion of the hand.

The method further includes determining at least one of a position, an orientation, and a location of a portion of the hand.

The method further includes determining at least one of whether one or more fingers are extended or non-extended, one or more angles of bend for one or more fingers, a direction to which one or more fingers point, a configuration indicating a pinch, a grab, an outside pinch, and a pointing finger.

The method further includes determining from the 3D model whether a tool or object is present in the hand.

In yet another implementation, described is a method of determining gesture features responsive to control object gestures in three dimensional (3D) sensory space. The method comprises determining observation information including gestural motion of a control object in three dimensional (3D) sensory space from at least one image of the control object, constructing a 3D model to represent the control object by fitting one or more 3D capsules to the observation information, determining gesture features of the control object based on the 3D capsules, and issuing a feature-specific command input to a machine under control based on the determined gesture features.

In one implementation, the control object is a hand and the gesture features include edge information for fingers of the hand.

In another implementation, the control object is a hand and the gesture features include edge information for palm of the hand.

In yet another implementation, the control object is a hand and the gesture features include joint angle and segment orientation information of the hand.

In a further implementation, the control object is a hand and the gesture features include finger segment length information for fingers of the hand.

In yet further implementation, the control object is a hand and the gesture features include curling of the hand during the gestural motion.

In another implementation, the control object is a hand and the gesture features include at least one of a pose, a grab strength, a pinch strength and a confidence of the hand.

In yet another implementation, a method of authenticating a user of a machine responsive to control object gestures in three dimensional (3D) sensory space is described. The method comprises determining observation information including gestural motion of a control object in three dimensional (3D) sensory space from at least one image of the control object, constructing a 3D model to represent the control object by fitting one or more 3D capsules to the observation information, determining biometric features of the control object based on the 3D capsules, authenticating the control object based on the determined biometric features, determining a command input indicated by the gestural motion of the control object, determining whether the authenticated control object is authorized to issue the command input, and issuing an authorized command input to a machine under control.

In one implementation, the control object is a hand and the determined biometric features include at least one of measurements across a palm of the hand and finger width at a first knuckle of the hand.

The technology disclosed relates to providing monitoring information about a process under control by tracking of hands (or other body portions, alone or in conjunction with tools) serving as control objects that provide input to, or perform tasks monitored by, computers or other intelligent machinery. A motion sensory control device detects gestures in a three dimensional (3D) sensory space by capturing images using cameras (and/or other sensory input devices), analyzing the images to yield 3D information suitable for defining a capsule model of the subject being imaged, associating 3D information to each capsule model, aligning (rigidly, non-rigidly, or combinations thereof) the capsule model with the 3D information, abstracting information from the model to detect a variance and/or a state of the subject being imaged, extracting from the variance and/or state, information about the subject being imaged in the 3D sensory space, and interpreting the information as providing monitoring information about a process under control.

The technology disclosed relates to providing biometric information about an individual being identified by tracking of hands (or other body portions, alone or in conjunction with tools) serving as control objects that provide input to, or perform tasks monitored by, computers or other intelligent machinery. A motion sensory control device detects gestures in a three dimensional (3D) sensory space by capturing images using cameras (and/or other sensory input devices), analyzing the images to yield 3D information suitable for defining a capsule model of the subject being imaged, associating 3D information to each capsule model, aligning (rigidly, non-rigidly, or combinations thereof) the capsule model with the 3D information, abstracting information from the model to detect a variance and/or a state of the subject being imaged, extracting from the variance and/or state, information about the subject being imaged in the 3D sensory space, and interpreting the information as providing biometric information about an individual being identified.

The technology disclosed relates to providing abstract features information (pose, grab strength, pinch strength, confidence, and so forth) about an individual by tracking hands (or other body portions, alone or in conjunction with tools) serving as control objects that provide input to, or perform tasks monitored by, computers or other intelligent machinery. A motion sensory control device detects gestures in a three dimensional (3D) sensory space by capturing images using cameras (and/or other sensory input devices), analyzing the images to yield 3D information suitable for defining a capsule model of the subject being imaged, associating 3D information to each capsule model, aligning (rigidly, non-rigidly, or combinations thereof) the capsule model with the 3D information, abstracting information from the model to detect a variance and/or a state of the subject being imaged, extracting from the variance and/or state, information about the subject being imaged in the 3D sensory space, and interpreting the information as providing abstract features information (pose, grab strength, pinch strength, confidence, and so forth) about an individual being imaged useful to an application developed to work with the sensory device. Accordingly, applications can be built upon a platform including the sensory device.

In all the implementations above, the 3D model can be a hollow model or a solid model. In all the implementations above, the 3D capsules can be hollow capsules or solid capsules.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DESCRIPTION

As used herein, a given signal, event or value is "based on" a predecessor signal, event or value of the predecessor signal, event or value influenced by the given signal, event or value. If there is an intervening processing element, step or time period, the given signal, event or value can still be "based on" the predecessor signal, event or value. If the intervening processing element or step combines more than one signal, event or value, the signal output of the processing element or step is considered "based on" each of the signal, event or value inputs. If the given signal, event or value is the same as the predecessor signal, event or value, this is merely a degenerate case in which the given signal, event or value is still considered to be "based on" the predecessor signal, event or value. "Responsiveness" or "dependency" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Gesture-Recognition System

Figure 1A:
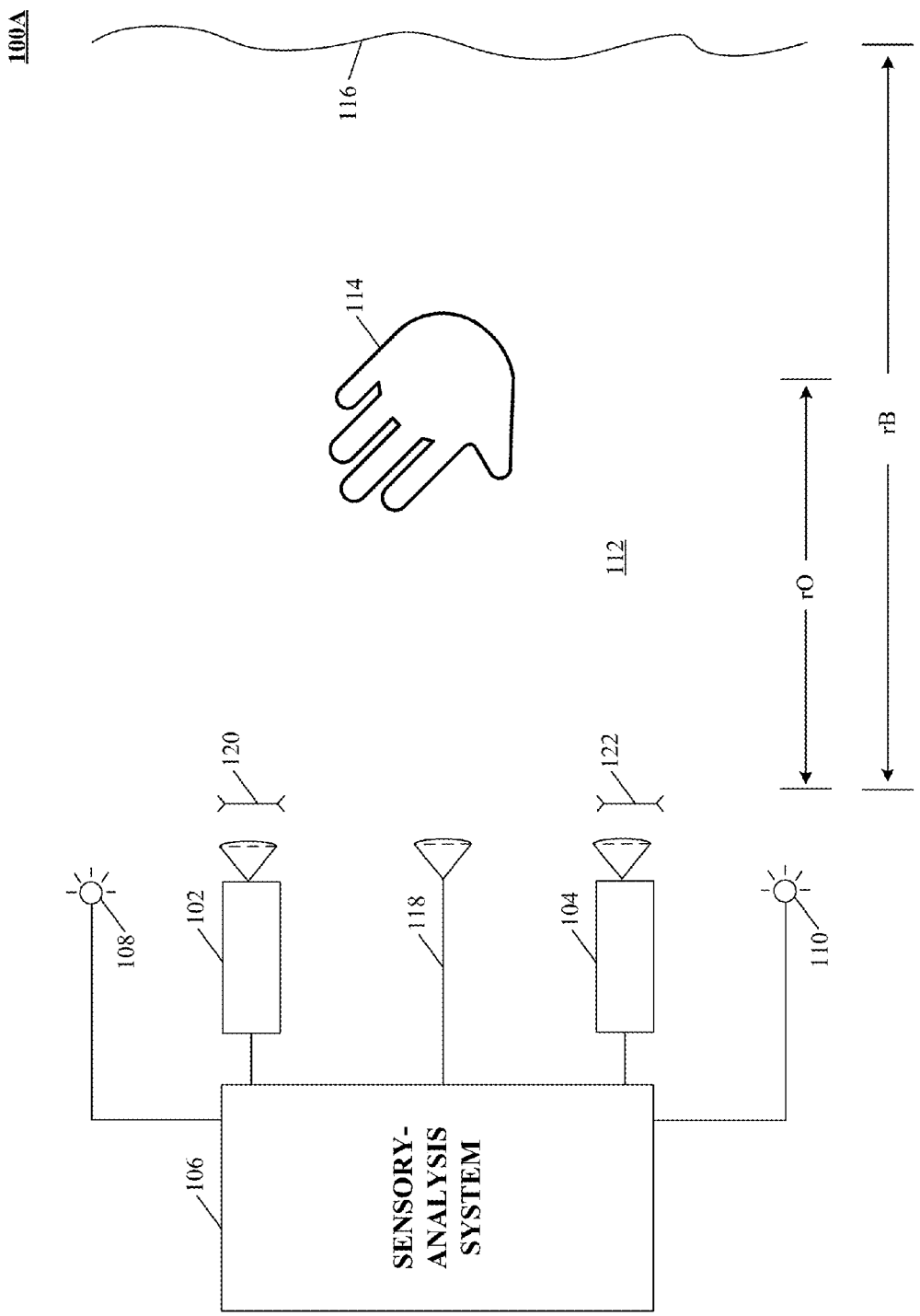
FIG. 1A illustrates a system for capturing image data according to an implementation of the technology disclosed.

Referring first to FIG. 1A, which illustrates an exemplary gesture-recognition system 100A including any number of cameras 102, 104 coupled to a sensory-analysis system 106. Cameras 102, 104 can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors (e.g. 118) or combinations thereof. For example, line sensors or line cameras rather than conventional devices that capture a two dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of a hand of an otherwise stationary person, the volume of interest can be defined as a cube approximately one meter on a side.

In some implementations, the illustrated gesture-recognition system 100A includes one or more sources 108, 110, which can be disposed to either side of cameras 102, 104, and are controlled by sensory-analysis system 106. In one implementation, the sources 108, 110 are light sources. For example, the light sources can be infrared light sources, e.g., infrared light-emitting diodes (LEDs), and cameras 102, 104 can be sensitive to infrared light. Use of infrared light can allow the gesture-recognition system 100A to operate under a broad range of lighting conditions and can avoid various inconveniences or distractions that may be associated with directing visible light into the region where the person is moving. However, a particular wavelength or region of the electromagnetic spectrum can be required. In one implementation, filters 120, 122 are placed in front of cameras 102, 104 to filter out visible light so that only infrared light is registered in the images captured by cameras 102, 104. In another implementation, the sources 108, 110 are sonic sources providing sonic energy appropriate to one or more sonic sensors (not shown in FIG. 1A for clarity sake) used in conjunction with, or instead of, cameras 102, 104. The sonic sources transmit sound waves to the user; the user either blocks (or "sonic shadowing") or alters the sound waves (or "sonic deflections") that impinge upon her. Such sonic shadows and/or deflections can also be used to detect the user's gestures and/or provide presence information and/or distance information using ranging techniques known in the art. In some implementations, the sound waves are, for example, ultrasound, that are not audible to humans.

It should be stressed that the arrangement shown in FIG. 1A is representative and not limiting. For example, lasers or other light sources can be used instead of LEDs. In implementations that include laser(s), additional optics (e.g., a lens or diffuser) may be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

In operation, light sources 108, 110 are arranged to illuminate a region of interest 112 that includes a control object such as hand 114 that can optionally hold a tool or other object of interest and cameras 102, 104 are oriented toward the region of interest 112 to capture video images of the hand 114 with background 116. In some implementations, the operation of light sources 108, 110 and cameras 102, 104 is controlled by the sensory-analysis system 106, which can be, e.g., a computer system, control logic implemented in hardware and/or software or combinations thereof. Based on the captured images, sensory-analysis system 106 determines the position and/or motion of an object of interest such as hand 114.

Figure 1B:
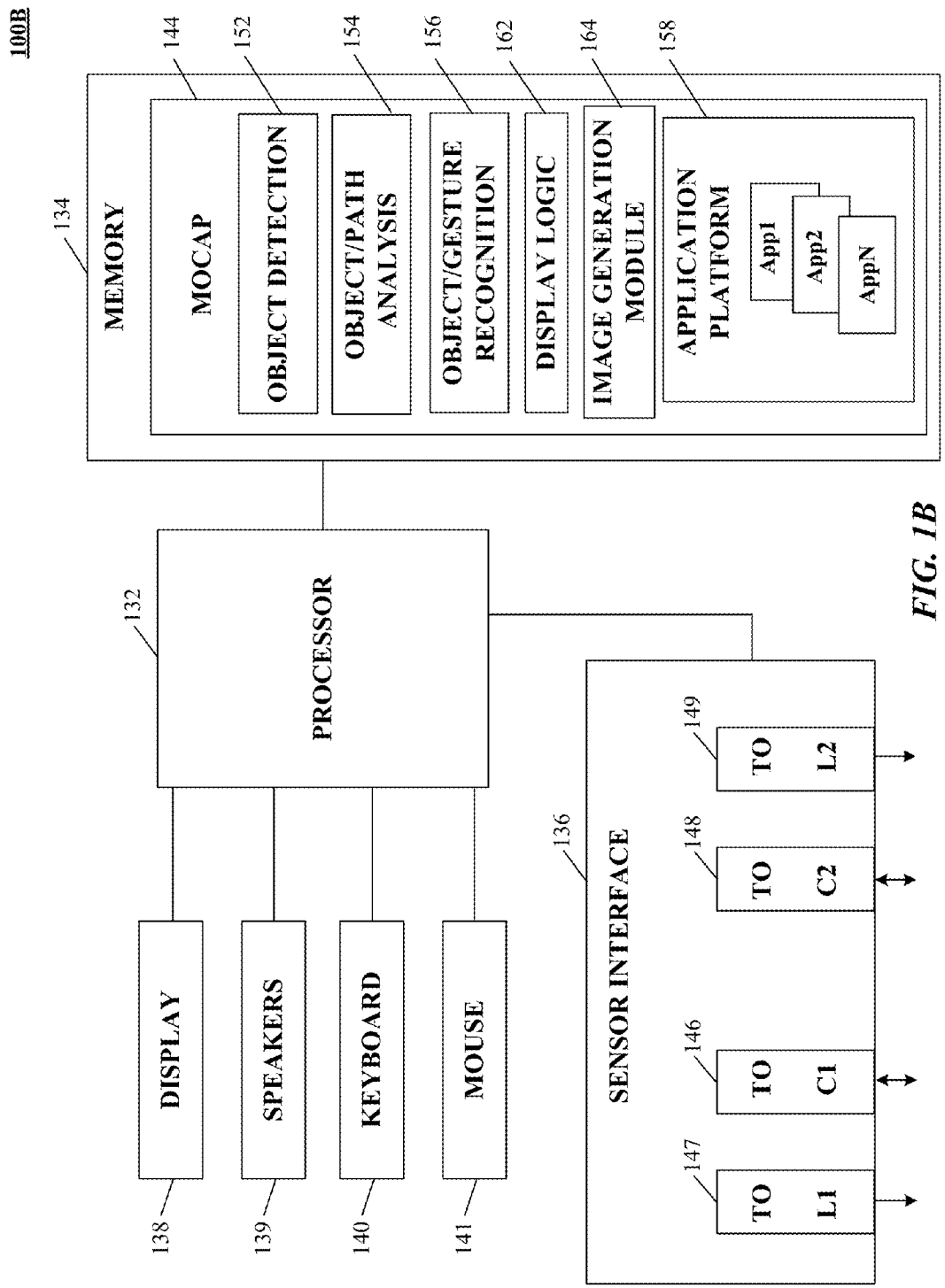
FIG. 1B is a simplified block diagram of a gesture-recognition system implementing an image analysis apparatus according to an implementation of the technology disclosed.

FIG. 1B is a simplified block diagram of a computer system 100B, implementing sensory-analysis system 106 (also referred to as an image analyzer) according to an implementation of the technology disclosed. Sensory-analysis system 106 can include or consist of any device or device component that is capable of capturing and processing image data. In some implementations, computer system 100B includes a processor 132, memory 134, a sensor interface 136, a display 138 (or other presentation mechanism(s)), e.g. holographic projection systems, wearable goggles or other head mounted devices (HMDs), heads up displays (HUDs), other visual presentation mechanisms or combinations thereof, speakers 139, a keyboard 140, and a mouse 141. Memory 134 can be used to store instructions to be executed by processor 132 as well as input and/or output data associated with execution of the instructions. In particular, memory 134 contains instructions, conceptually illustrated as a group of modules described in greater detail below that control the operation of processor 132 and its interaction with other hardware components. An operating system directs the execution of low-level, basic system functions such as memory allocation, file management, and operation of mass storage devices. The operating system can include a variety of operating systems such as the Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, the OPENACTION operating system, iOS, Android or other mobile operating systems, or another operating system platform.

The computing environment 100B can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 132 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Sensor interface 136 can include hardware and/or software that enables communication between computer system 100B and cameras such as cameras 102, 104 shown in FIG. 1A, as well as associated light sources such as light sources 108, 110 of FIG. 1A. Thus, for example, sensor interface 136 can include one or more data ports 146, 148 to which cameras can be connected, as well as hardware and/or software signal processors that modify data signals received from the cameras (e.g., to reduce noise or reformat data) prior to providing the signals as inputs to a motion-capture ("mocap") program 144 executing on processor 132. In some implementations, sensor interface 136 can also transmit signals to the cameras, e.g., to activate or deactivate the cameras, to control camera settings (frame rate, image quality, sensitivity, etc.), or the like. Such signals can be transmitted, e.g., in response to control signals from processor 132, which can in turn be generated in response to user input or other detected events.

Sensor interface 136 can also include controllers 147, 149, to which light sources (e.g., light sources 108, 110) can be connected. In some implementations, controllers 147, 149 provide operating current to the light sources, e.g., in response to instructions from processor 132 executing mocap program 144. In other implementations, the light sources can draw operating current from an external power supply, and controllers 147, 149 can generate control signals for the light sources, e.g., instructing the light sources to be turned on or off or changing the brightness. In some implementations, a single controller can be used to control multiple light sources.

Instructions defining mocap program 144 are stored in memory 134, and these instructions, when executed, perform motion-capture analysis on images supplied from cameras connected to sensor interface 136. In one implementation, mocap program 144 includes various modules, such as an object detection module 152, an object/path analysis module 154, and an object/gesture-recognition module 156. Object detection module 152 can analyze images (e.g., images captured via sensor interface 136) to detect edges of an object therein and/or other information about the object's location. Object/path analysis module 154 can analyze the object information provided by object detection module 152 to determine a 3D position and/or motion of the object (e.g., a user's hand 114). Examples of operations that can be implemented in code modules of mocap program 144 are described below. Memory 134 can also include other information and/or code modules used by mocap program 144 such as an application platform 158 that allows a user to interact with the mocap program 144 using different applications like application 1 (App1), application 2 (App2), and application N (AppN).

Display 138, speakers 139, keyboard 140, and mouse 141 can be used to facilitate user interaction with computer system 100B. In some implementations, results of gesture capture using sensor interface 136 and mocap program 144 can be interpreted as user input. For example, a user can perform hand gestures that are analyzed using mocap program 144, and the results of this analysis can be interpreted as an instruction to some other program executing on processor 132 (e.g., a web browser, word processor, or other application). Thus, by way of illustration, a user might use upward or downward swiping gestures to "scroll" a webpage currently displayed on display 138, or use rotating gestures to increase or decrease the volume of audio output from speakers 139, and so on.

It will be appreciated that computer system 100B is illustrative and that variations and modifications are possible. Computer systems can be implemented in a variety of form factors, including server systems, desktop systems, laptop systems, tablets, smart phones or personal digital assistants, wearable devices, e.g., googles, head mounted devices (HMDs), wrist computers, and so on. A particular implementation can include other functionality not described herein, e.g., wired and/or wireless network interfaces, media playing, and/or recording capability, etc. In some implementations, one or more cameras can be built into the computer or other device into which the sensor is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 100B is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

Again referring to FIGS. 1A and 1B, the user performs a gesture that is captured by cameras 102, 104 as a series of temporally sequential images. In other implementations, cameras 102, 104 can capture any observable pose or portion of a user. For instance, if a user walks into the field of view near the cameras 102, 104, cameras 102, 104 can capture not only the whole body of the user, but the positions of arms and legs relative to the person's core or trunk. These are analyzed by the object/gesture-recognition module 156, which can be implemented as another module of the mocap 144. In an exemplary implementation, object/gesture-recognition module 156 provides input to an electronic device, allowing a user to remotely control the electronic device, and/or manipulate virtual objects, such as prototypes/models, blocks, spheres, or other shapes, buttons, levers, or other controls, in a virtual environment displayed on display 138. The user can perform the gesture using any part of her body, such as a finger, a hand, or an arm. As part of gesture recognition or independently, the sensory-analysis system 106 can determine the shapes and positions of user's hand in 3D space and in real time; see, e.g., U.S. Ser. Nos. 61/587, 554, 13/414,485, 61/724,091, and 13/724,357 filed on Jan. 17, 2012, Mar. 7, 2012, Nov. 8, 2012, and Dec. 21, 2012 respectively, the entire disclosures of which are hereby incorporated by reference. As a result, the sensory-analysis system 106 can not only recognize gestures for purposes of providing input to the electronic device, but can also capture the position and shape of user's hand in consecutive video images in order to characterize the hand gesture in 3D space and reproduce it on display 138.

In one implementation, the object/gesture-recognition module 156 compares the detected gesture to a library of gestures electronically stored as records in a database, which is implemented in the sensory-analysis system 106, the electronic device, or on an external storage system. (As used herein, the term "electronically stored" includes storage in volatile or non-volatile storage, the latter including disks, Flash memory, etc., and extends to any computationally addressable storage media (including, for example, optical storage).) For example, gestures can be stored as vectors, i.e., mathematically specified spatial trajectories, and the gesture record can have a field specifying the relevant part of the user's body making the gesture; thus, similar trajectories executed by a user's hand and head can be stored in the database as different gestures so that an application can interpret them differently.

Capsule Hand

Figure 2A:
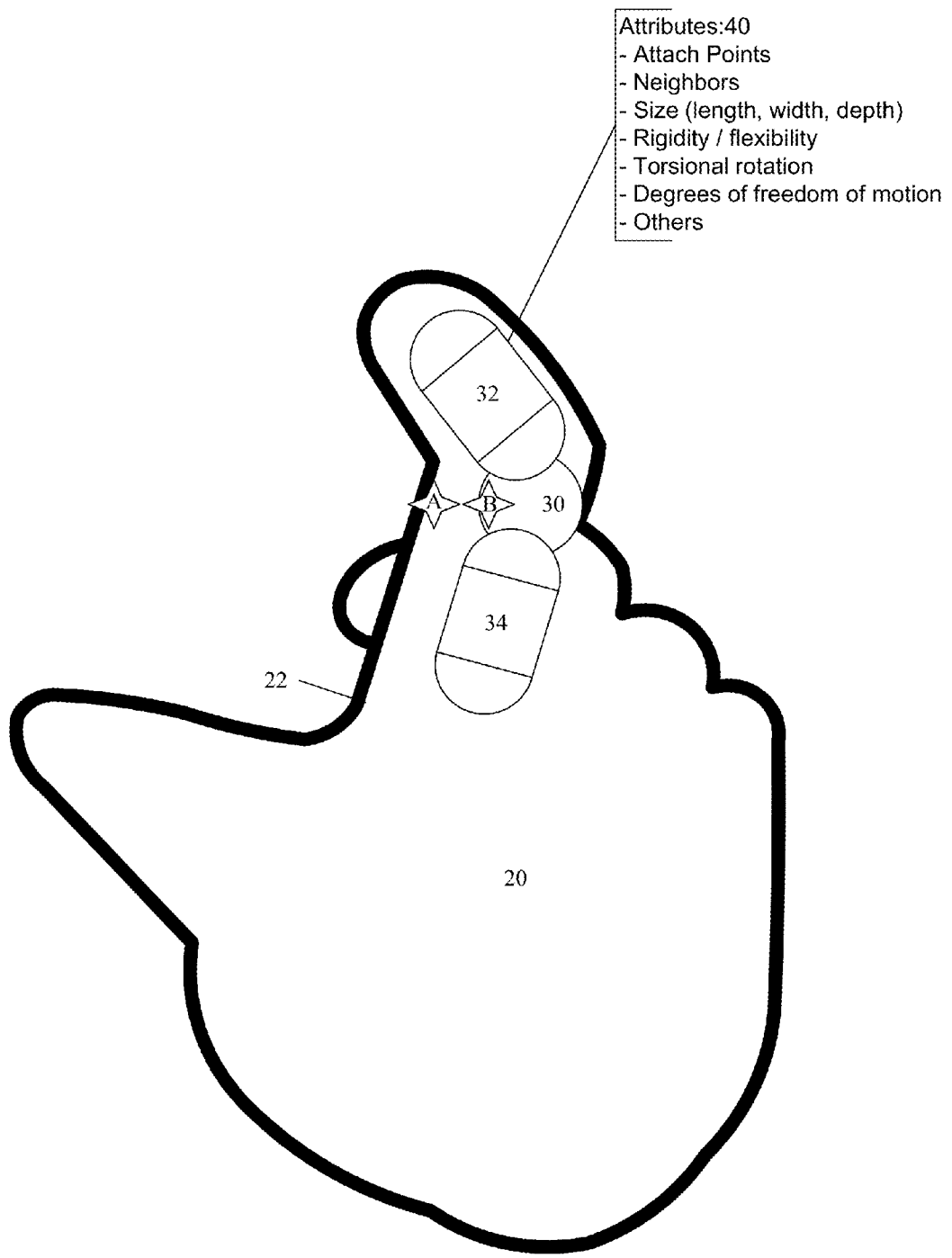
FIGS. 2A, 2B, 2C, and 2D illustrate one implementation of capsule representation of predictive information.

FIGS. 2A, 2B, 2C, and 2D illustrate one implementation of capsule representation of predictive information. FIG. 2A is a simplified illustration of prediction information for an object according to an implementation. As illustrated by FIG. 2A, prediction information 20 of a control object 114 of FIG. 1A (also interchangeably referred to as an "object of interest") can be constructed from one or more model subcomponents 30, 32, 34 selected and/or configured to represent at least a portion of a surface of control object 114, one or more attributes 40, and virtual surface portion 22. Other components can be included in prediction information 20, not shown in FIG. 2A for clarity sake. In an implementation, the model subcomponents can be selected from a set of radial solids, which can reflect at least a portion of the control object 114 in terms of one or more of structure, motion characteristics, conformational characteristics, other types of characteristics of control object 114, and/or combinations thereof. In one implementation, radial solids are objects made up of a 2D primitive (e.g., line, curve, plane) and a surface having a constant radial distance to the 2D primitive. A closest point to the radial solid can be computed relatively quickly. As used herein, three or greater capsules are referred to as a "capsoodle".

One radial solid implementation includes a contour and a surface defined by a set of points having a fixed distance from the closest corresponding point on the contour. Another radial solid implementation includes a set of points normal to points on a contour and a fixed distance therefrom. In an implementation, computational technique(s) for defining the radial solid include finding a closest point on the contour and the arbitrary point, then projecting outward the length of the radius of the solid. In an implementation, such projection can be a vector normal to the contour at the closest point. An example radial solid (e.g., 32, 34) includes a "capsuloid", i.e., a capsule shaped solid including a cylindrical body and semi-spherical ends. Another type of radial solid (e.g., 30) includes a sphere. Other types of radial solids can be identified based on the foregoing teachings.

One or more attributes 40 can define characteristics of a model subcomponent 32. Attributes can include e.g., sizes, rigidity, flexibility, torsion, zero or more degrees of freedom of motion with respect to one or more defined points, which can include endpoints for example. In an implementation, predictive information about the control object can be formed to include a model of the control object 114 together with attributes defining the model and values of those attributes.

In an implementation, when control object 114 morphs, conforms, and/or translates, motion information reflecting such motion(s) is included into the observed information.

Points in space can be recomputed based on the new observation information. Responsively, the model subcomponents can be scaled, sized, selected, rotated, translated, moved, or otherwise re-ordered to enable portions of the model corresponding to the virtual surface(s) to conform within the set of points in space.

Figure 2B:
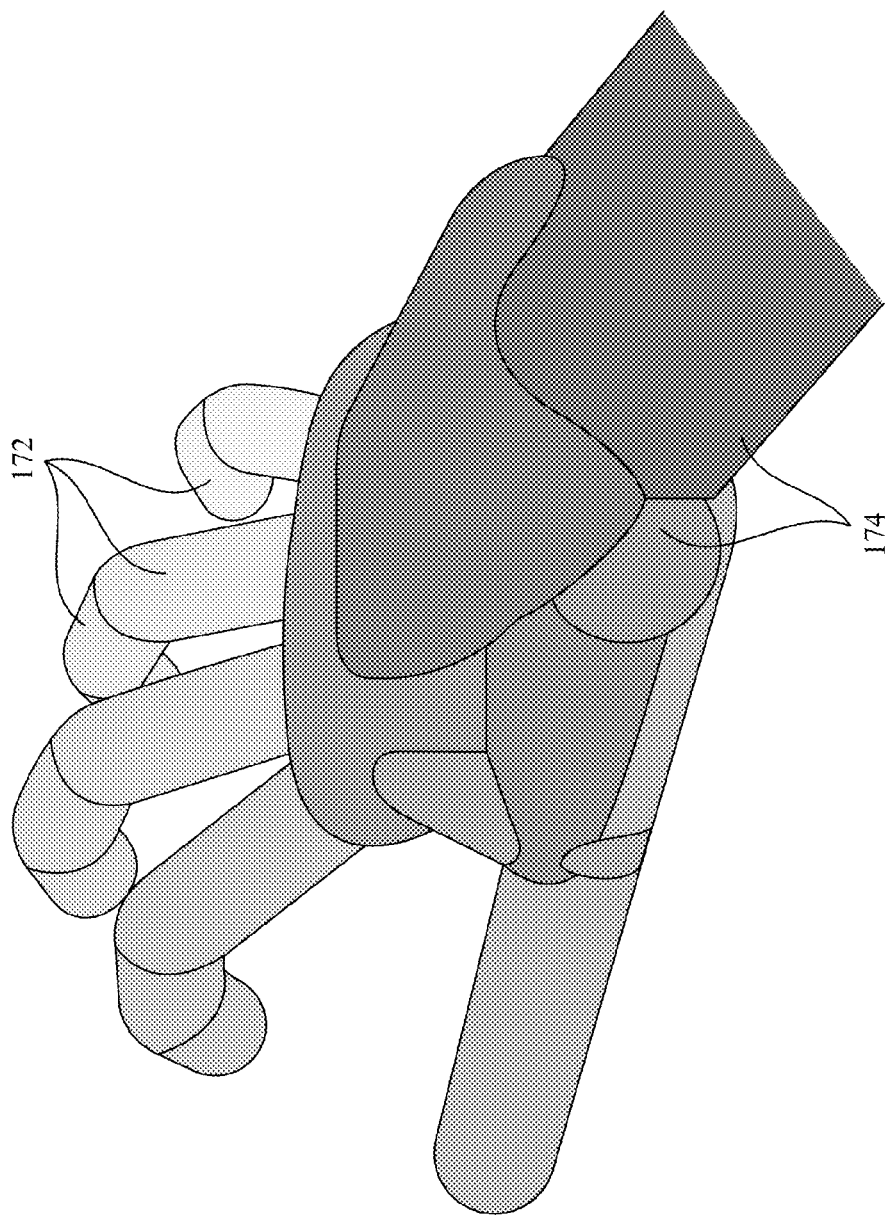
Figure 2C:
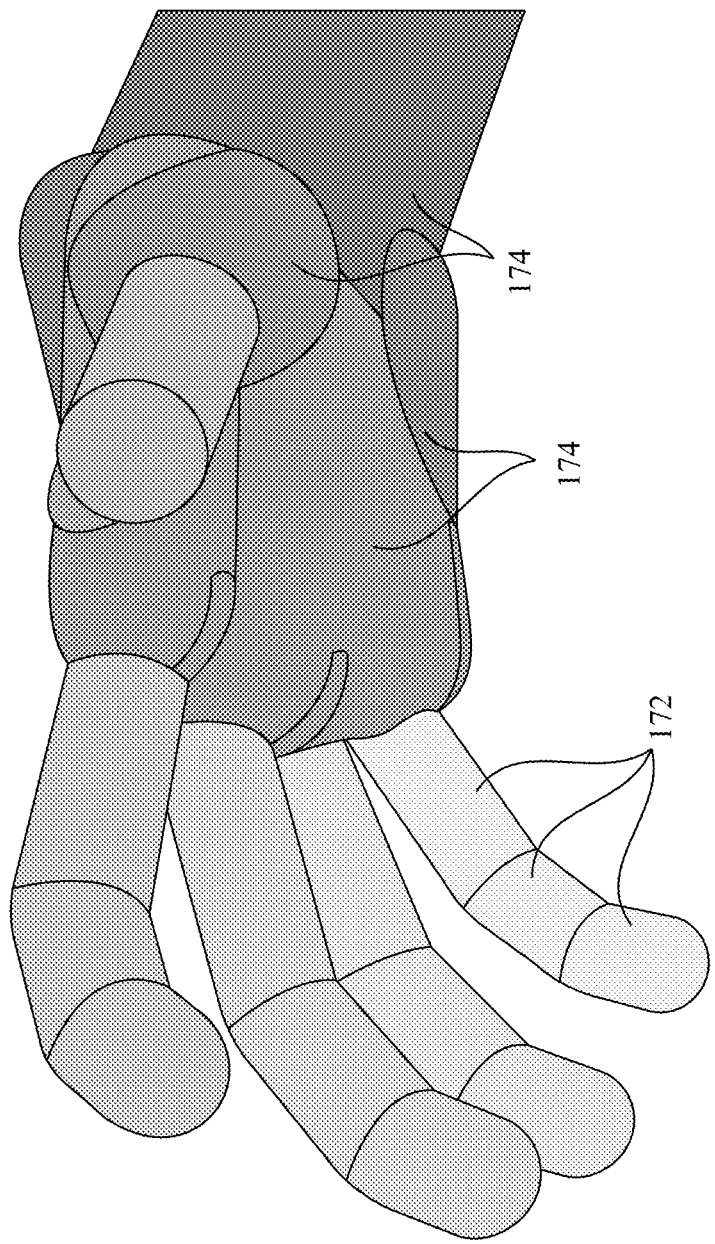
Figure 2D:
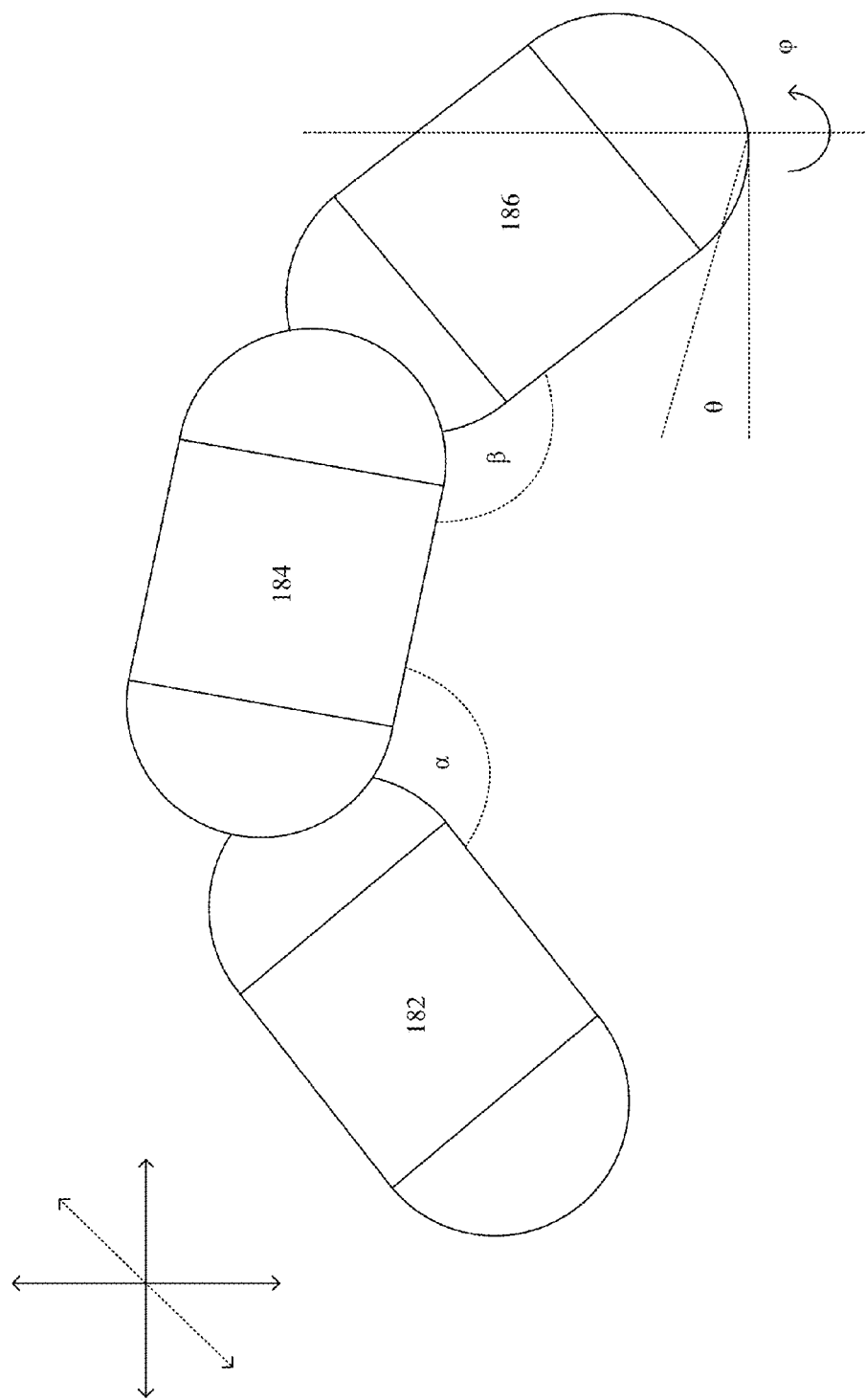

In an implementation and with reference to FIGS. 2B and 2C, a collection of radial solids and/or capsuloids can be considered a "capsule hand". A number of capsuloids 172, e.g. five capsuloids, are used to represent fingers on a hand while a number of radial solids 174 are used to represent the shapes of the palm and wrist. With reference to FIG. 2D, a finger capsuloid with radial solids 182, 184, 186 can be represented by its two joint angles ($\alpha$, $\beta$), pitch ($\theta$), and yaw ($\varphi$). In an implementation, the angle $\beta$ can be represented as a function of joint angle $\alpha$, pitch $\theta$, and yaw $\varphi$. Allowing angle $\beta$ to be represented this way can allow for faster representation of the finger capsuloid with fewer variables; see, e.g., U.S. Ser. Nos. 61/871,790, filed 29 Aug. 2013 and 61/873,758, filed 4 Sep. 2013. For example, one capsule hand can include five capsules for each finger, a radial polygon defining a base of a hand and a plurality of definitional capsules that define fleshy portions of the hand.

In one implementation, analyzing includes stereo matching, depth maps, finding contours and/or feature points reduced to certain finite number of degrees of freedom. Such an analysis enables simplification of problems of IK, sampling sizes, pose determination, etc.

Initialization

FIGS. 3A, 3B, 3C, 3D, 3E, 3F, 3G, and 3H illustrate one implementation of initializing capsule representation of predictive information. Initialization can include determining and applying one or more initialization parameters to the model to scale and orient the model.

Scaling

Figure 3A:
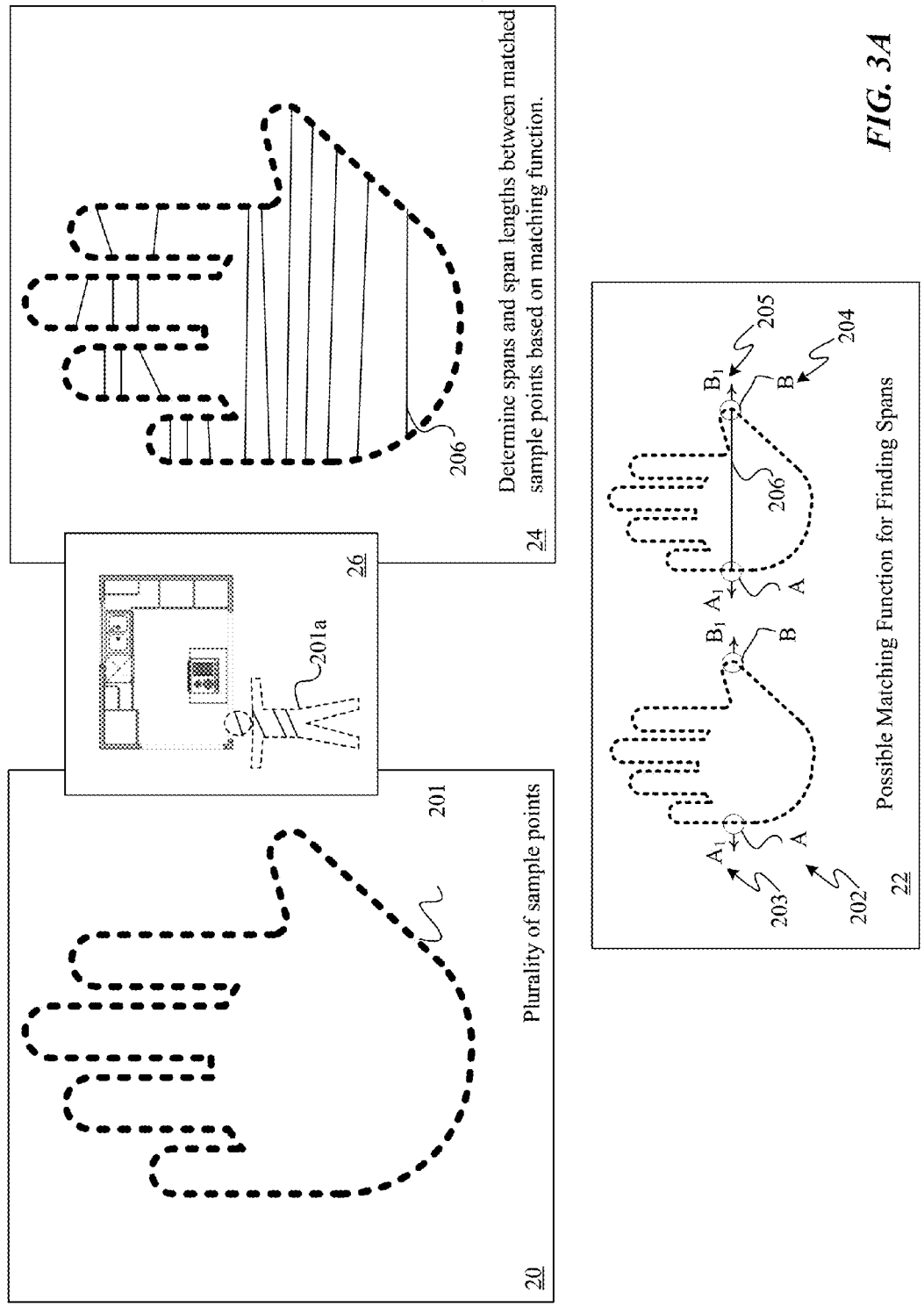
FIGS. 3A, 3B, 3C, 3D, 3E, 3F, 3G, and 3H illustrate one implementation of initializing capsule representation of predictive information.
Figure 3B:
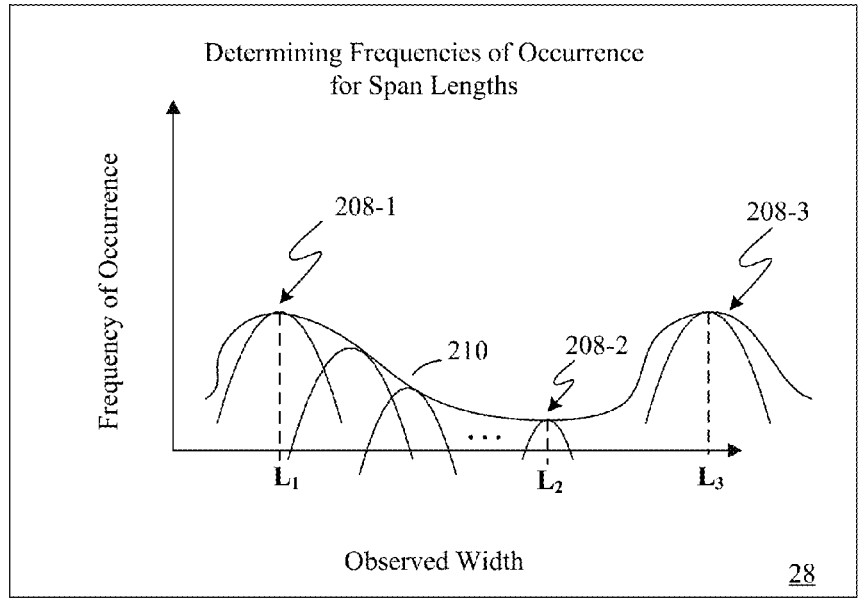
Figure 3B:
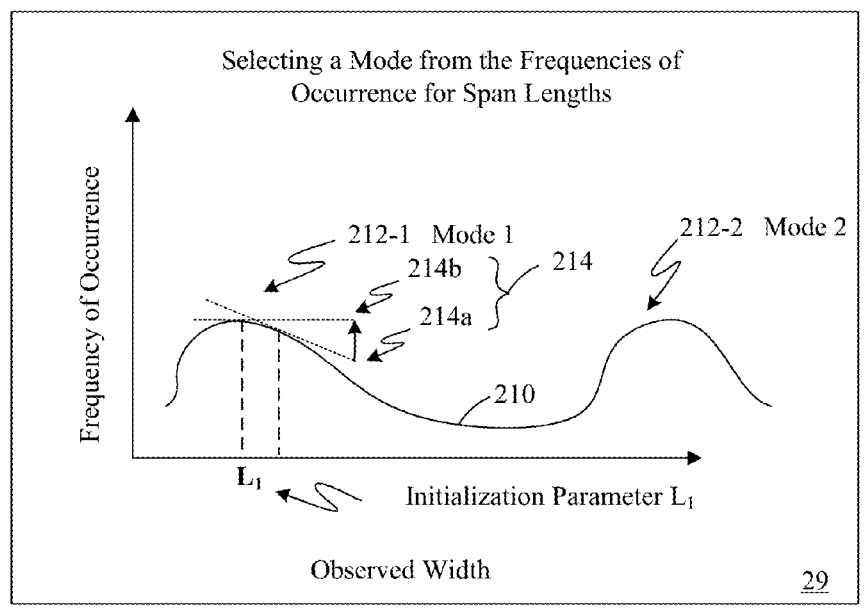
Figure 3C:
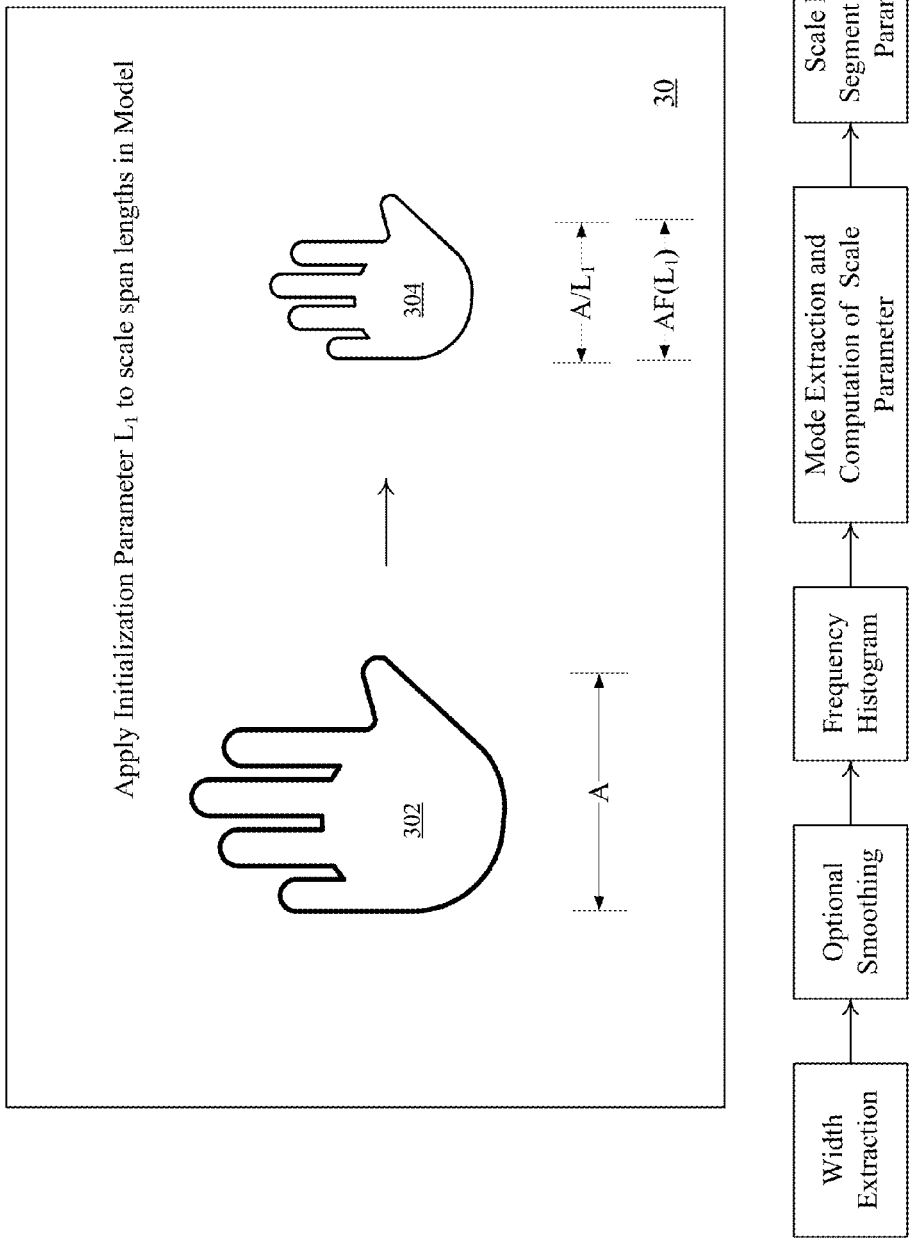

In one implementation, initialization includes scaling a model by an appropriate initialization parameter. FIG. 3A depicts determining spans and span lengths in the observed information in which one or more point pairings are selected from a surface portion as represented in the observed information. As illustrated by block 20 of FIG. 3A, an observed surface portion 201 (i.e., of observed information) can comprise a plurality of sample points from which one or more point pairings can be selected. In a block 22 of FIG. 3A, a point pairing between point A and point B of observed surface portion 201 is selected by application of a matching function, such as for example the matching function. One method for determining a point pairing using a matching function is also illustrated by FIG. 3A, in which a first unmatched (arbitrary) point A on a contour (of block 22 of FIG. 3A) representing a surface portion of interest in the observed information is selected as a starting point 202. A normal $A_1$ 203 (of block 22 of FIG. 3A) is determined for point A. A wide variety of techniques for determining a normal can be used in implementations, but in one example implementation, a set of points proximate to the first unmatched point, at least two of which are not co-linear, is determined. Then, a normal for the first unmatched point can be determined using the other points in the set by determining a normal perpendicular to the plane. For example, given points $P_1$, $P_2$, $P_3$, the normal n can be given by the cross product:

$$n=(p_2-p_1)\times(p_3-p_1)$$

Another technique can be to: (i) start with the set of points; (ii) form a first vector from $P_2-P_1$; and (iii) apply rotation matrix to rotate the first vector 90 degrees away from the center of mass of the set of points. (The center of mass of the set of points can be determined by an average of the points). A yet further technique can be to: (i) determine a first vector tangent to a point on a contour in a first image; (ii) determine from the point on the contour a second vector from that point to a virtual camera object in space; and (iii) determine a cross product of the first vector and the second vector. The cross product is a normal vector to the contour.

Again with reference to FIG. 3A, the closest second unmatched point B 204 (of block 22 of FIG. 3A) reachable by a convex curve (line 206) and having the most opposite normal $B_1$ 205 is found. Accordingly, points A and B form a point pairing. As illustrated by block 26 of FIG. 3A, the object need not be a hand (nor for that matter, even a portion of a human being).

Again with reference to FIG. 3A, a span length is determined for at least one of the one or more point pairings selected. Now with reference to block 24 of FIG. 3A, one or more spans and span lengths are determined for the one or more point pairings. In a representative implementation, a span can be found by determining a shortest convex curve for the point pairings A and B. It is determined whether the convex curve passes through any other points of the model. If so, then another convex curve 206 is determined for paired points A and B. Otherwise, the span comprises the shortest continuous segment found through paired points A and B that only intersects the model surface at paired points A and B. In an implementation, the span can comprise a convex geodesic segment that only intersects the model at two points. A span can be determined from any two points using the equation of a line fitted to the paired points A and B for example.

Again with reference to FIG. 3A, a check is made to determine whether there are any further points to process. If there are further point pairs to process, then the flow continues to process the next pair. Otherwise, frequencies of occurrence are determined for the various span lengths. One way that is used to determine frequency of occurrence is illustrated by block 28 of FIG. 3B. Block 28 shows fitting of one or more radial basis functions 208-1, 208-2, and 208-3 to the observed span lengths L1, L2 and L3. For example, a radial basis function (Gaussian or approximation thereof) can be selected for one or more observed span length values using techniques described below. A function appropriate to the implementation is applied to the radial basis functions to provide a frequency of occurrence for the span lengths. For example, in block 28 of FIG. 3B, the radial basis functions 208-1, 208-2, and 208-3 are summed to arrive at a frequency of occurrence wave 210 for the observed span lengths. (A "wave" denoting a continuous function.) Of course, in implementations, other functions (multiplication, averaging, interpolation, and so forth, and/or combinations thereof depending upon the implementation specific requirements or desirability) can be applied to the radial basis functions to arrive at a frequency of occurrence. Now, the result of applying the function to the one or more radial basis functions is provided. In an implementation, smoothing techniques (interpolation, Gaussian, bucketing, rounding, others, combinations thereof) can be applied to a discrete relationship comprising discrete point pairings to form a continuous curve.

Parameters for the radial basis functions, i.e., width of the function for example, can be selected using a variety of techniques. One technique for determining a width of a radial basis function includes selecting a radial basis function for one or more observed span length values, having one or more properties, which can be determined. For example, a variance of the dataset including the observed span lengths is determined. The variance is divided by an expectation value. Expectation values can be determined from an expected number of modes in the dataset determined from the span lengths in the observed information. For example, using horizontally disposed spans, as illustrated by FIG. 3A, observed span lengths of a hand and arm can be sorted into approximately four expected expectation values: one value corresponding to an approximate cross finger diameter length; one value corresponding to a cross the palm length; one value corresponding to a span across the palm to the thumb; and one value corresponding to a span cross the wrist length. A face can be sorted into one value. An automobile (observed from its side) can be sorted into three values: one for the cabin, windshield to rear window; one from the front bumper to the rear bumper; and one from the front of the tire to the rear of the tire. The variance divided by the expectation value is provided as a width of the radial basis function.

Other techniques for determining frequencies of occurrence for the various span lengths that can be used in implementations include bucketing—in which buckets of fixed or variable width are assigned to one or more discrete points representing span length occurrences within some range corresponding to the bucket width. The frequency of occurrences for each bucket can be combined (e.g., interpolation, summed, weighted, smoothed or other combinations, and/or combinations thereof) to produce a frequency of occurrence function.

A span length can be selected as the initialization parameter based upon the frequency of occurrences of observed span lengths. Using one or a different technique described above, an initialization parameter can be determined using a technique for performing mode selection on the frequencies of occurrence for the bucketed span lengths. One technique is mode selection, illustrated with reference to FIG. 3B, that includes determining one or more modes from the frequencies of occurrence of observed span lengths. For example, in one technique illustrated with reference to block 29 of FIG. 3B, mode 1 (212-1) and mode 2 (212-2) are defined by locations on the frequency occurrence wave 210 in which there exists a local minima or maxima. Accordingly, one technique for determining modes from the frequencies of occurrence comprises finding minima or maxima of the frequency of occurrence wave 210. A mode of interest, e.g., a mode having a most frequently occurring span length, can be selected.

One technique for determining minima or maxima indicating modes comprises employing a gradient descent technique. With reference to block 29 of FIG. 3B, a gradient can be determined (i.e., by taking a derivative 214 of a function representing a frequency of occurrence (for example frequency occurrence wave 210 determined above)). One or more minima 214b of the derivative 214 of the function can be determined to indicate a mode of interest. For example, one technique applies Rolle's Theorem to determine a minima (or maxima) at a point in the frequency occurrence wave 210 along some closed interval demarcated by two points on the curve having the same function value. An initialization parameter is determined from the mode of interest. For example, again with reference to block 29 of FIG. 3B, a span length $L_1$ corresponding to mode 1 (212-1) is selected as the initialization parameter.

In a yet further technique, properties of the frequency of occurrence other than mode can be used to determine an initialization parameter. For example, expected value of frequency of occurrence, appearance of the number of modes, spacing between modes, other properties, and/or combinations thereof can be used to determine initialization parameters. Accordingly, a most frequently occurring span length can be used as an initialization parameter. In an alternative implementation, a least frequently occurring span length ($L_2$ in block 28 of FIG. 3B) can be returned as the initialization parameter.

In some implementations, an initialization parameter is applied to at least a portion of a model within the predictive information. Application of the initialization parameter can be used to initialize the model portion using a variety of techniques—scaling, weighting, specifying (or computing) confidence factors, selecting model portions, and mode selection (child's hand, cat's paw, tool tip, and so forth). For example and with reference to block 30 of FIG. 3C, span length(s) of one or more portion of a model 302 in the predictive information can be scaled using the initialization parameter $L_1$ as a scaling factor to produce an initialized model 304. In implementations, scaling can include multiplying (or dividing) the span length(s) by the scaling factor. In other implementations, the scaling factor can be applied according to a function based on the scaling factor, for example, a function $F(L_1)$ that determines based at least in part upon the initialization parameter that a model portion is too large (or small) and can be used to exclude (or alter the weighting or confidence factor) for that portion in the model. In yet further implementations, the span length(s) can be scaled according to the scaling factor and one or more quantifiable characteristics can be determined from imaging the object (i.e., brightness, frequencies, and so forth). In a further implementation, a model portion is selected based at least in part upon the initialization parameter. For example, an initialization parameter can be used to select from models of adult hands, children's hands, animal paws, tool tips, and so forth. In yet further implementations, initialization parameters can be used to communicate control information to the sensory device, for example, changing power consumption profiles based on size of observed object(s), changing frame rates, selecting user modes in software (tool, hand, face discrimination), background elimination, noise elimination; see, e.g., U.S. Ser. No. 61/911,975, filed Dec. 4, 2013.

Orientation

Figure 3D:
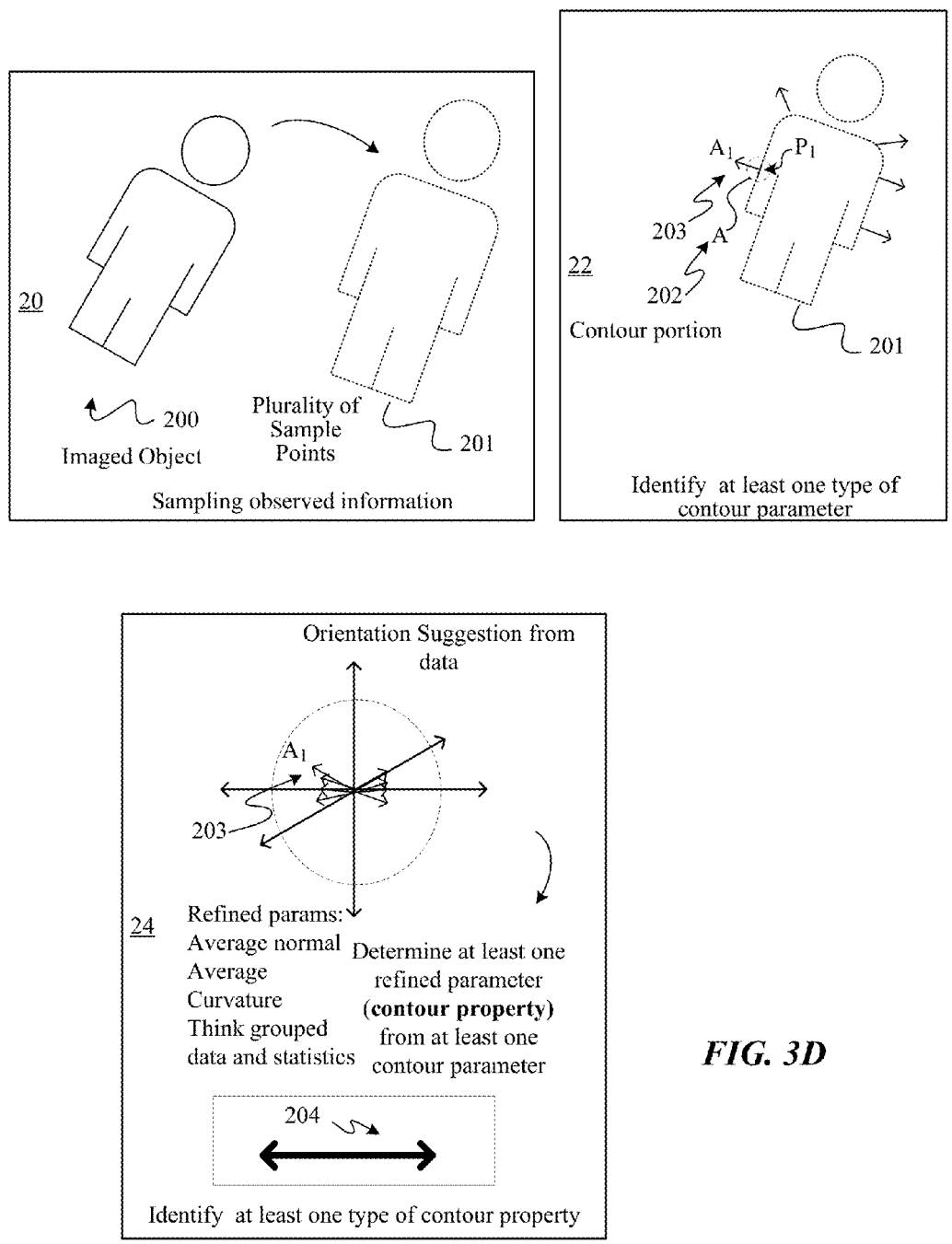
Figure 3E:
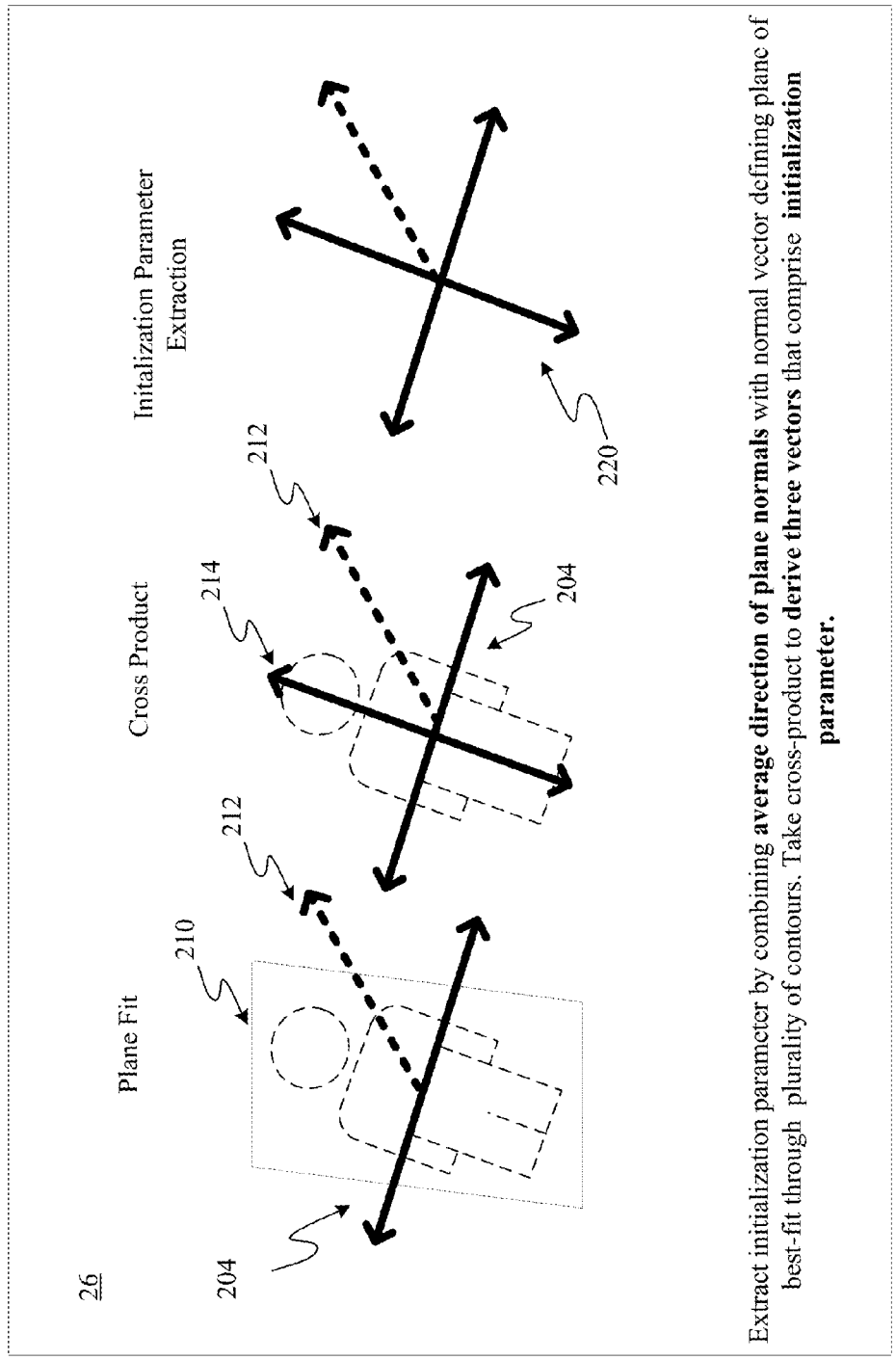
Figure 3F:
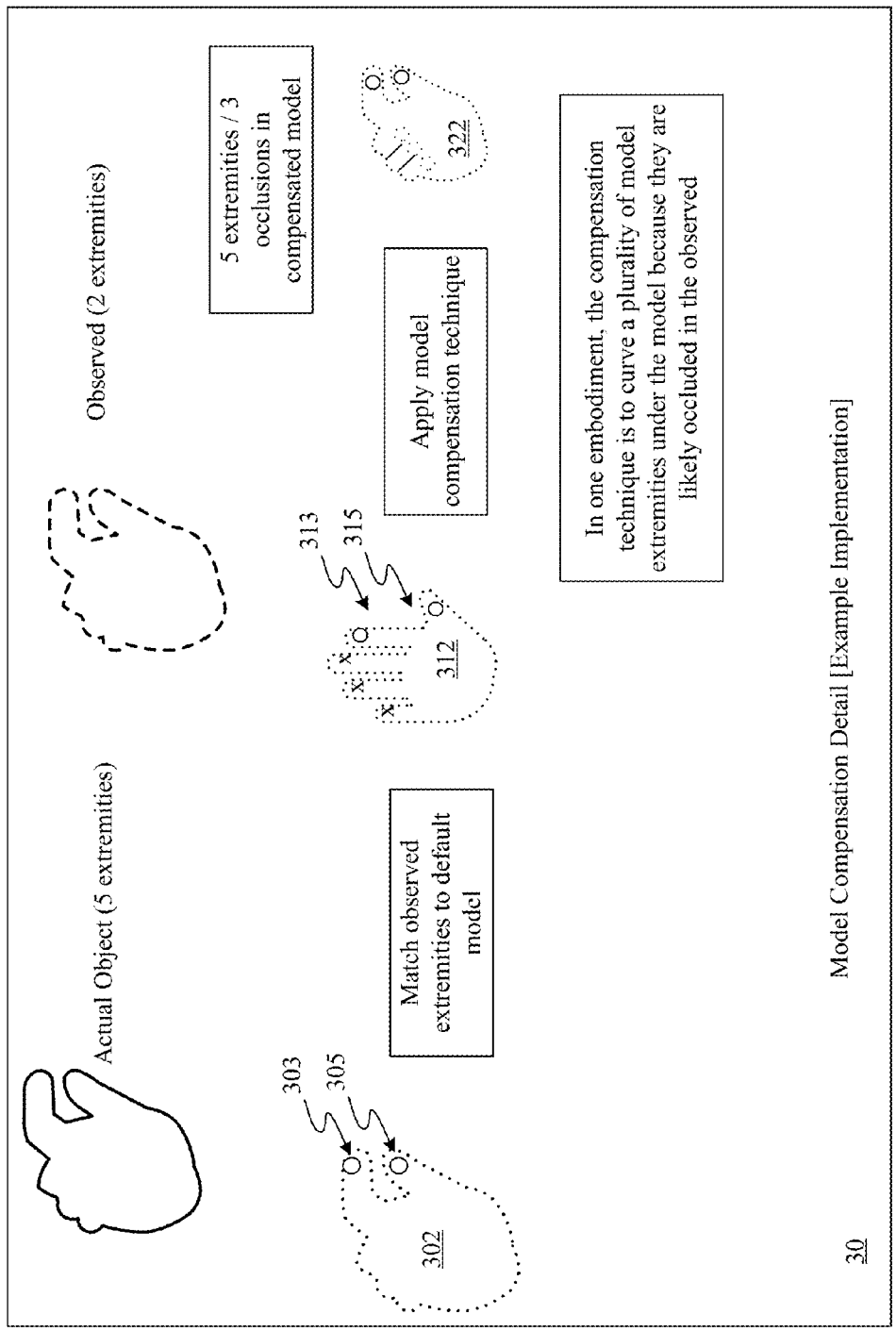

In one implementation, initialization includes orienting a model by an appropriate initialization parameter. Now with reference to FIG. 3D, FIG. 3D illustrates one or more contours that are extracted from a surface portion as represented in the observed information. As illustrated by block 20 of FIG. 3D, a surface portion of an imaged object 200 (e.g., image of real object(s), computer generated input, or combinations thereof) within the observed information can comprise a plurality of surfaces that can be sampled to provide points 201, from which one or more contours 202 can be extracted.

One method of determining a contour portion is illustrated by block 22 of FIG. 3D, in which the observed information can be sampled to determine a set of points. In some implementations, the observed information can comprise an image or images of the imaged object 200 to be sampled. In other implementations, the observed information comprises instead of, a set of points or a set of contours determined from an imaged object 200. From a set of points 201, one or more contours 202 can be determined using any of a variety of techniques, such as for example determining a gradient for points determined from the imaged object. When a relatively larger value of the gradient is determined, points along the relatively larger value of the gradient can comprise a contour. As shown by block 22 of FIG. 3D, a contour portion A 202 can be determined from a plurality of points 201 of block 20.

Now again with reference to FIG. 3D, one or more contour parameters are identified for at least one extracted contour. As shown by block 22 of FIG. 3D, a contour parameter comprising normal A1 203 can be determined from contour portion A 202. A first (arbitrary) point P1 on a contour portion representing a surface portion of interest in the observed information is selected as a starting point. A normal is identified at the point P1. One method of determining a normal is illustrated by block 22 of FIG. 3D, in which a set of points proximate to the first point P1, at least two of which are not co-linear, is determined. Then a normal for the first unmatched point can be determined using the other points in the set by determining a normal perpendicular to the plane. For example, given points P1, P2, P3, the normal n is given by the cross product:

$$n = (p_2 - p_1) \times (p_3 - p_1)$$

Another technique can be to: (i) start with the set of points; (ii) form a first vector from P2–P1; and (iii) apply rotation matrix to rotate the first vector 90 degrees away from the center of mass of the set of points. (The center of mass of the set of points can be determined by an average of the points). A yet further technique can be to: (i) determine a first vector tangent to a point on a contour in a first image; (ii) determine from the point on the contour a second vector from that point to a virtual camera object in space; and (iii) determine a cross product of the first vector and the second vector. The cross product is a normal vector to the contour.

In implementations, other instances of the contour parameter, i.e., other normal(s), can be determined for other contour portions determined from the sample points 201 corresponding to the imaged object 200. Furthermore, instances of different types of contour parameters, e.g., center(s) of mass, (e.g., a weighted average of the points within a set), a curvature(s), and so forth, can be determined for the contour portions determined from the sample points 201 corresponding to the imaged object 200.

A check is made to determine whether there are any further parameters to process. If there are further parameters to process, then the flow continues to process the next parameter. Otherwise, at least one contour property is determined for the various contour parameters. One way to determine a contour property is illustrated by block 24 of FIG. 3D in which one or more contour parameters 203 are combined to produce a contour property 204 by applying a function. For example, one or more normal(s) 203 can be combined to form an average normal 204. A function appropriate to the implementation is applied to the contour parameters to provide grouping of information from the contour parameters into a contour property. For example, in block 24 of FIG. 3D, the average function can be applied to the set of normal(s) determined in block 22 to create an average normal 204. Of course, in implementations, other functions (mean, mode, variance, interpolation, and so forth and/or combinations thereof depending upon the implementation specific requirements or desirability) can be applied to the contour parameters to arrive at a contour property. The result of applying the function to the one or more contour parameters is provided as the contour property 204.

An initialization parameter is determined based at least in part upon the at least one contour property determined above. An initialization parameter can be determined in a variety of ways, such as using one technique illustrated with reference to block 26 of FIG. 3E, in which a plane 210 (FIG. 3E) of best fit is determined through contours in the observed information. A number of techniques are available for determining a plane of best fit illustrated with reference to block 26 of FIG. 3E, one example being multi-linear regression. A third vector 214 is determined by combining a contour property 204 (e.g., average direction of plane normal vectors) with a normal vector 212 defining the plane 210 to derive a third vector 214. One technique employs a cross product to combine contour property 204 with normal vector 212, however other techniques can be used in some implementations.

An initialization parameter 220 determined from the three vectors is provided to the system to initialize orientation of the model. For example, again with reference to block 26 of FIG. 3E, normal vector 212, contour property 204, and cross product 214 can be provided as the initialization parameter 220. In an implementation, the procedure completes and returns a set of vectors as an initialization parameter. In an alternative implementation, a least one of the vectors (214 in block 26 of FIG. 3E) can be returned as the initialization parameter 220.

Orientation of the model portion is initialized by applying the initialization parameter to at least a portion of a model within the predictive information. Application of the initialization parameter can be used to initialize orientation of the model portion using a variety of techniques—aligning, weighting, specifying (or computing) confidence factors, selecting model portions, and mode selection (child's hand, cat's paw, tool tip, and so forth). For example, one or more portions of a model in the predictive information can be aligned using the initialization parameter 220 as an initial alignment in which a portion(s) of the object is placed to produce an initialized model. In implementations, aligning can include rotational alignment of the model along one or more axes to correspond to the initialization parameter. In other implementations, the rotational alignment can be applied to portion(s) of the model according to a function F, that determines, based at least in part upon the initialization parameter, that a model portion is too far removed from alignment in one or more directions for example to be used. Function F can exclude (or alter the weighting or confidence factor) for that portion in the model based at least in part upon the initialization parameter. In yet further implementations, the model can be aligned according to the initialization parameter and one or more quantifiable characteristics determined from imaging the object (i.e., brightness, frequencies, and so forth). In a further implementation, a model portion can be selected based at least in part upon a degree to which the model portion(s) align to the initialization parameter. For example, an initialization parameter can be used to select from models for adult hands, children's hands, animal paws, tool tips, and so forth based upon alignment. In yet further implementations, initialization parameters can be used to communicate control information to the sensory device, for example, changing power consumption profiles based on quality of alignment of observed object(s), changing frame rates, selecting user modes in software (tool, hand, face discrimination), background elimination, noise elimination.

In some implementations, a compensation can be applied to a model within the observed information. Now with reference to FIG. 3F, one of a variety of techniques for fitting models to observed information in which one or more elements is missing, either due to differences in the object being observed and/or the viewing environment (e.g., noise, occlusions, poor contrast, and so forth) comprises fitting model portion(s) to extremity portion(s) of an observed object and/or fitting model portion(s) to contour segments and properties. One technique for fitting a model are illustrated by block 30 of FIG. 3F which includes determining observed extremities 303, 305 of an object portion(s) 302 in the observed information corresponding to model extremities 313, 315 in a default model 312. A first quality of fit is determined between the observed information and the default model. A model compensation technique is applied to the default model 312 to form a compensated model 322. In one implementation, the compensation technique is to curve a plurality of model extremities under the model because they are likely occluded in the observed information. A second quality of fit is determined between the observed information and the compensated model. A determination is made whether the quality of fit to the compensated model is superior to the quality of fit to the default model. If so, the compensated model is adopted. Otherwise, in the event that the observed information fit the default model better than the compensated model, processing returns to try another compensation technique if available. In some implementations, more than one compensation can be applied to the model to refine the model for various different occlusions, or the like. Other techniques for determining occlusions for the various model portions that can be used in implementations include best fit analysis of the observed against a set of possible compensated models. Further, techniques can be readily created using variations, combinations, or additions of other techniques to the foregoing teachings within the scope of the technology disclosed; see, e.g., U.S. Ser. No. 61/924,193, filed Jan. 6, 2014.

Figure 3G:
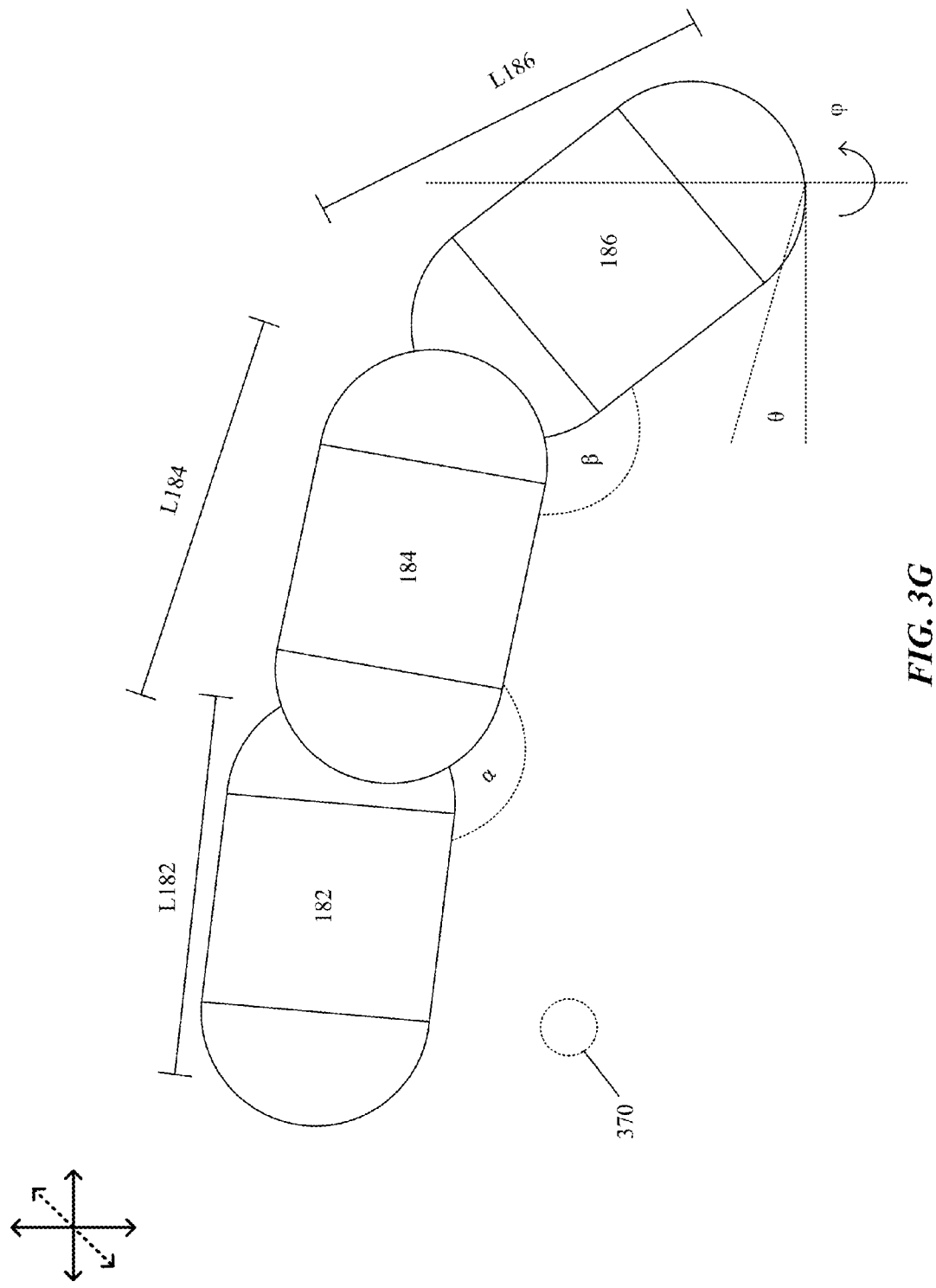
Figure 3H:
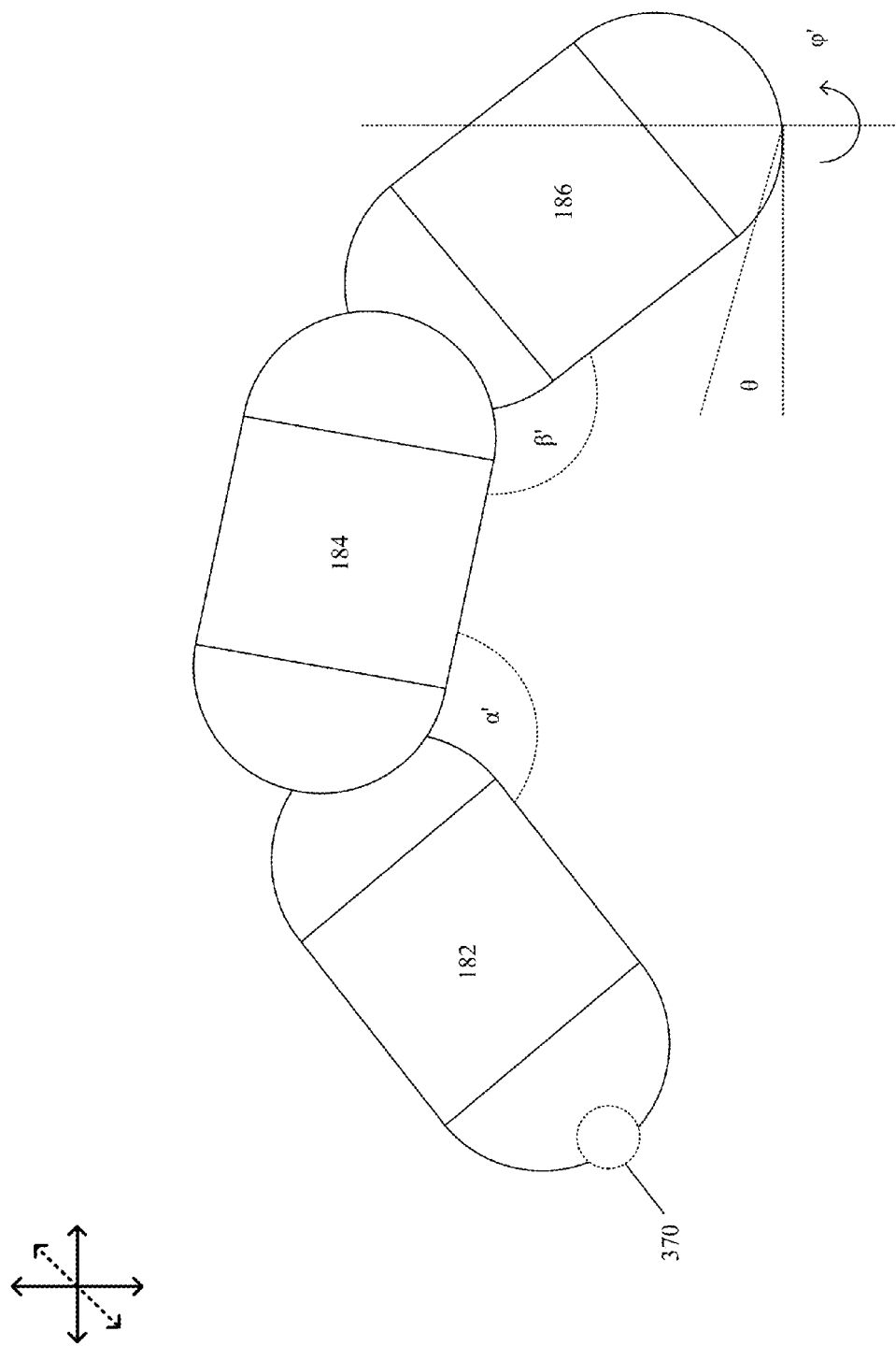

In one implementation, as illustrated by FIGS. 3G and 3H, a fingertip position can be determined from the image and reconstructed in 3D as illustrated. In FIG. 3G, a point 370 is an observed fingertip. Model capsules 182, 184, 186 are aligned such that the tip of capsule 182 is coincident with the location in space of point 370 determined from the observed information. In one technique, angle α and angle β are allowed to be set equal, which enables a closed form solution for θ and φ as well as angle α and angle β.

$$s^2 = 2ac(-2a^2 - 2c^2 + b^2 - 2a - 2b - 2c + 4ac) + -2b^2(a^2 + c^2)$$

$$\alpha = \beta = \tan 2^{-1} s - (a+c)b$$

$$\varphi = x_1/\text{norm}(x)$$

$$\theta = x_2/\text{norm}(x)$$

Wherein norm(x) is described as the norm of a 3D point x (370 in FIG. 3G) and a, b and c are capsule lengths L182, L184, L186 in FIG. 3G.

Association

Figure 4:
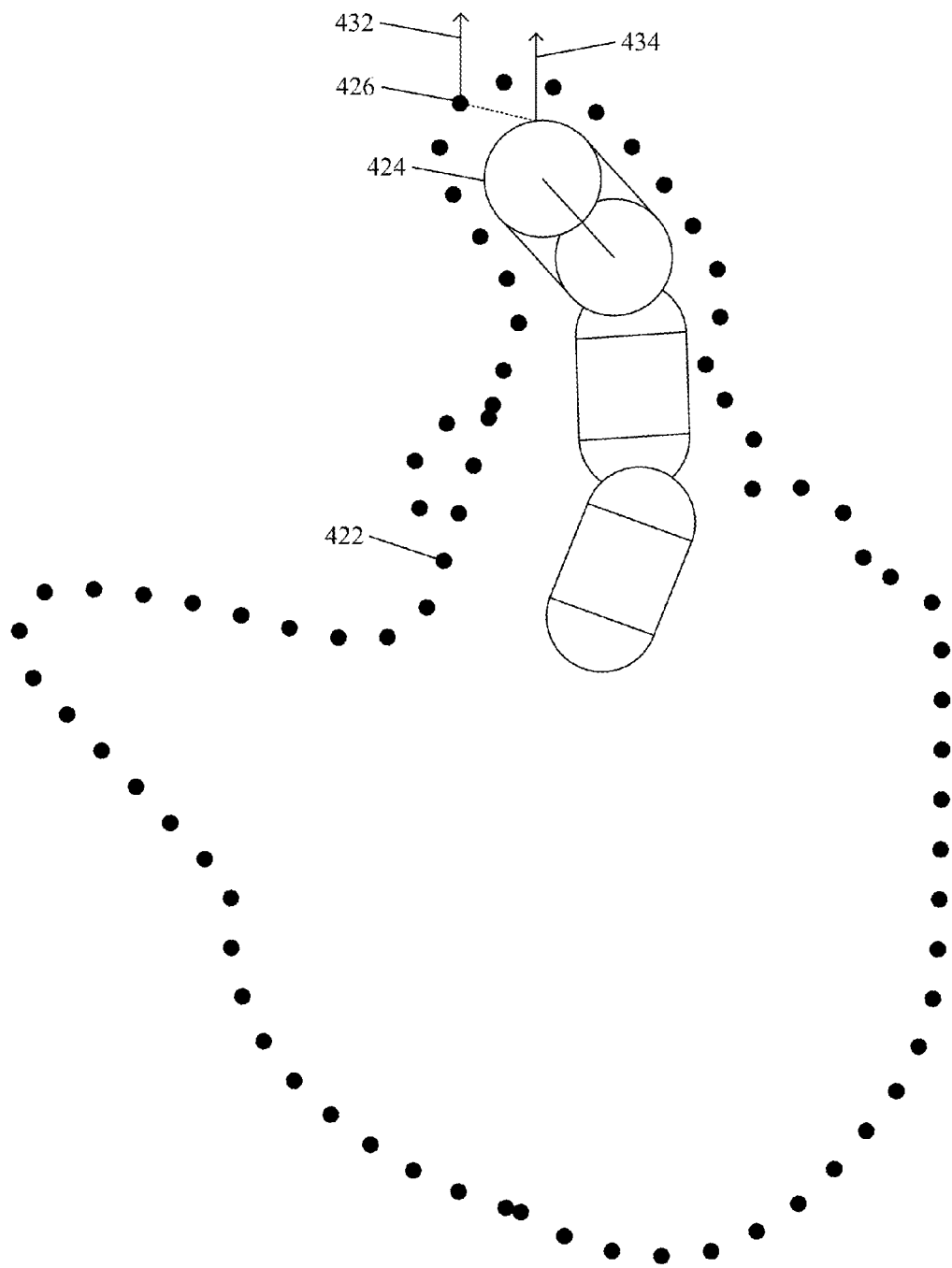
FIG. 4 illustrates one implementation of improving capsule representation of predictive information.

FIG. 4 illustrates one implementation of improving capsule representation of predictive information. In an implementation, observation information 422 including observation of the control object can be compared against the model at one or more of periodically, randomly or substantially continuously (i.e., in real time). Observational information 422 can include, without limitation, observed values of attributes of the control object corresponding to the attributes of one or more model subcomponents in the predictive information for the control object. In an implementation, comparison of the model 424 with the observation information 422 provides an error indication 426 (also referred to as "variance"). In an implementation, an error indication 426 can be computed by first associating a set A of three dimensional points with a corresponding normal direction 432 to a set B of three dimensional points with a corresponding normal direction 434 on the subcomponents surface. The association is done in a manner that assures that each paired point in set A and B has the same associated normal. An error can then be computed by summing the distances between each point in set A and B. This error is here on referred to the association error; see, e.g., U.S. Ser. No. 61/873,758, filed Sep. 4, 2013.

Alignment

Predictive information of the model can be aligned to the observed information using any of a variety of techniques. Aligning techniques bring model portions (e.g., capsules, capsuloids, capsoodles) into alignment with the information from the image source (e.g., edge samples, edge rays, interior points, 3D depth maps, and so forth). In one implementation, the model is rigidly aligned to the observed information using iterative closest point (ICP) technique. The model can be non-rigidly aligned to the observed information by sampling techniques.

One ICP implementation includes finding an optimal rotation R and translation T from one set of points A to another set of points B. First each point from A is matched to a point in set B. A mean square error is computed by adding the error of each match:

$$\text{MSE} = \text{sqrt}(\Sigma(R^*x_i + T - y_i)^{1*}(R^*x_i + T - y_i))$$

An optimal R and T are computed and applied to the set of points A or B, according to some implementations.

In order to enable the ICP to match points to points on the model, a capsule matching technique is employed. One implementation of the capsule matching includes a class that "grabs" the set of data and computes the closest point on each tracked hand (using information like the normal). Then, the minimum of those closest points is associated to the corresponding hand and saved in a structure called Hand Data. Other points that don't meet a minimal distance threshold are marked as unmatched.

In an implementation, rigid transformations and/or non-rigid transformations can be composed. One example composition implementation includes applying a rigid transformation to predictive information. Then an error indication can be determined, and an error minimization technique such as described herein can be applied. In an implementation, determining a transformation can include calculating a rotation matrix that provides a reduced RMSD (root mean squared deviation) between two paired sets of points. One implementation can include using Kabsch Algorithm to produce a rotation matrix. The Kabsch algorithm is used to find an optimal rotation R and translation T that minimizes the error using the following formula:

$$\text{RMS} = \text{sqrt}(\Sigma(R^*xi + T - yi)t^*(R^*xi + T - yi))wi$$

The transformation (both R and T) are applied rigidly to the model. The capsule matching and rigid alignment is repeated until convergence is achieved between model 424 with observation information 422. In one implementation, the Kabsch is extended to ray or covariances by minimizing the error using the following formula:

$$\Sigma R^*xi + T - yi)t^*Mi^*(R^*xi + T - yi)$$

In the formula above, $M_i$ is a positive definite symmetric matrix. In an implementation and by way of example, one or more force lines can be determined from one or more portions of a virtual surface.

One implementation applies non-rigid alignment to the observed information by sampling the parameters of each finger. A finger is represented by a 3D vector where the entry of each vector is a pitch, yaw and bend of the finger. The Pitch and Yaw can be defined trivially. The bend is the angle between the first and second capsule and the second and third capsule which are set to be equal. The mean of the samples weighted by the RMS is taken to be the new finger parameter, according to one implementation.

After rigid alignment, all data that has not been assigned to a hand, can be used to initialize a new object (hand or tool).

In an implementation, predictive information can include collision information concerning two or more capsoloids. By means of illustration, several possible fits of predicted information to observed information can be removed from consideration based upon a determination that these potential solutions would result in collisions of capsoloids.

In an implementation, a relationship between neighboring capsoloids, each having one or more attributes (e.g., determined minima and/or maxima of intersection angles between capsoloids) can be determined. In an implementation, determining a relationship between a first capsoloid having a first set of attributes and a second capsoloid having a second set of attributes includes detecting and resolving conflicts between first attribute and second attributes. For example, a conflict can include a capsoloid having one type of angle value with a neighbor having a second type of angle value incompatible with the first type of angle value. Attempts to attach a capsoloid with a neighboring capsoloid having attributes such that the combination will exceed what is allowed in the observed—or to pair incompatible angles, lengths, shapes, or other such attributes—can be removed from the predicted information without further consideration.

Correction

In one implementation, given a position, raw image information and fast lookup table can be used to find a look up region that gives constant time of computation of the closest point on the contour. Fingertip positions are used to compute point(s) on the contour which can be then used to determine whether the finger is extended or non-extended. A signed distance function can be used to determine whether points lie outside or inside a hand region. An implementation checks to see if points are inside or outside the hand region.

Abstracting

In one implementation, information can be abstracted from the model. For example, velocities of a portion of a hand (e.g., velocity of one or more fingers, and a relative motion of a portion of the hand), state (e.g., position, an orientation, and a location of a portion of the hand), pose (e.g., whether one or more fingers are extended or non-extended, one or more angles of bend for one or more fingers, a direction to which one or more fingers point, a configuration indicating a pinch, a grab, an outside pinch, and a pointing finger), and whether a tool or object is present in the hand can be abstracted in various implementations.

Determining and Interpreting Command Identification

Figure 5:
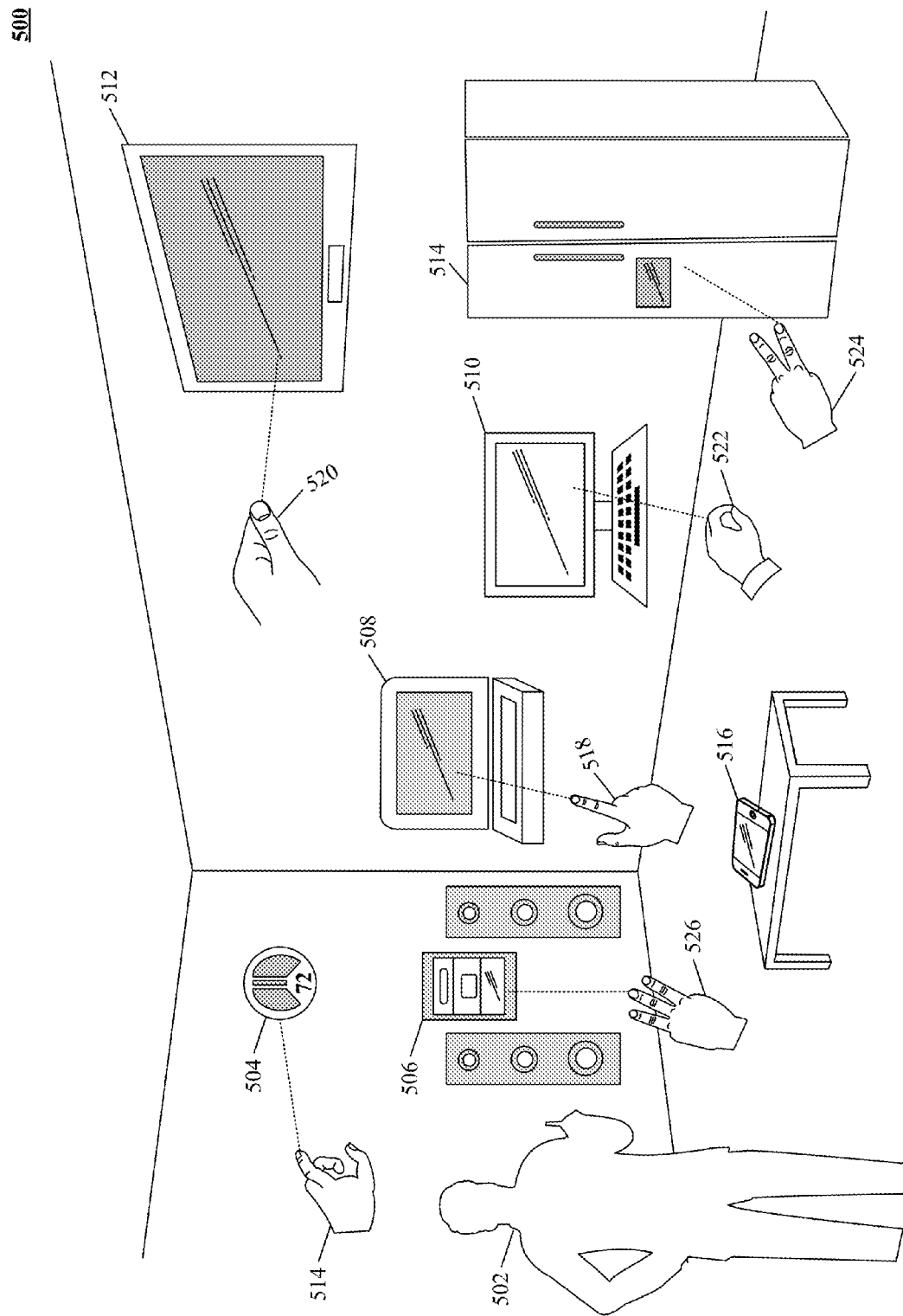
FIG. 5 shows one implementation of a pervasive computing environment in which a machine sensory device can be used.

In one implementation, a method of providing command input to a machine under control by tracking hands (or other body portions, alone or in conjunction with tools) using a sensory machine control system includes capturing sensory information for a human body portion within a field of interest. A tracking model and biometric model are determined from the sensory information by analyzing images, alone or in conjunction with non-imaging sensory information, to yield 3D information suitable for defining a capsule model of the subject being imaged. The 3D information is associated to one or more capsules in a model. The capsule model is aligned (rigidly, non-rigidly, or combinations thereof) with the 3D information. Information from the model is abstracted to detect a variance and/or a state of the subject being imaged. From the variance and/or state, it is determined whether the subject being imaged has made a gesture in the 3D sensory space and the gesture is interpreted to provide command input to a machine under control. FIG. 5 shows one implementation of a pervasive computing environment 500 in which a machine sensory device might be used. In one implementation, pervasive computing environment 500 can include various home automation systems such as lighting systems, in-home monitoring systems, security systems, appliance systems, VoIP phone systems, other phone systems, other home automation systems, or any combination thereof. In a particular implementation, smart phone 516 equipped with a motion sensory control device is adapted to control each of the home automation systems, including but not limited to entertainment unit 506, thermostat and HVAC control 504, laptop computer 508, desktop computer 510, television 512, and refrigerator 514.

In other implementations, smart phone 516 can include one or more sensors to, e.g., detect acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), WiFi, or other electromagnetic signals or fields. Thus, for example, smart phone 516 can include temperature sensor(s), humidity sensor(s), hazard-related sensor(s) or other environmental sensor(s), accelerometer(s), microphone(s), optical sensors up to and including camera(s) (e.g., charged-coupled-device or video cameras), active or passive radiation sensors, GPS receiver(s) or radio-frequency identification detector(s). While FIG. 5 illustrates an implementation with a motion sensory control device, many implementations can include multiple sensors. In some instances, smart phone 516 includes one or more primary sensors and one or more secondary sensors. The primary sensor(s) can sense data central to the core operation of the device (e.g., interpreting gestures performed in the environment 500). The secondary sensor(s) can sense other types of data (e.g., light, acceleration, or sound).

In other implementations, one or more user-interface components 138 in smart phone 516 can be used to present information to a user 502 via a visual display (e.g., a thin-film-transistor display or organic light-emitting-diode display) and/or an audio speaker. In one implementation, user-interface components 138 can receive information from the user 502 through a touchscreen, buttons, scroll component (e.g., a movable or virtual ring component), microphone, and/or camera (e.g., to detect gestures).

As shown in FIG. 5, user 502 can select a device from among the different devices in the environment 500 by performing a gesture and/or and other body movements. In one implementation, pure gestures, or gestures in combination with voice recognition, and/or a virtual or real keyboard in combination with the gestures can be used to select a device. In another implementation, a control console that recognizes gestures can be used to control an entire home, school, university, factory floor, office or other place of business.

In some implementations, user 502 can raise an arm, utter a verbal command, perform an optical command, or make different poses using hands and fingers (e.g., 'one finger point', 'one finger click', 'two finger point', 'two finger click', 'prone one finger point', 'prone one finger click', 'prone two finger point', 'prone two finger click', 'medial one finger point', 'medial two finger point') to indicate an intent to interact with a particular device in the environment

500. In other implementations, a point and grasp gesture can be used to move a cursor on a display of a device in the environment 500, verbal commands can be used to select a function, eye movements can be used to move a cursor, and blinking can indicate a selection.

In yet other implementations, the gestures can control the different devices in environment 500 using a graphical display or other feedback device, a set of menu elements, selection elements, and pan and zoom capabilities. Navigation through the devices can be consistent from high-level selection of target device down to manipulation of individual selection elements. In one example, with a particular device selected following a detection of a vertical, thumb-up, one-finger point, a pointing cursor and contextual menu elements for the current device are activated. The cursor position is driven by the movement and/or aim of the index finger. Basic selection and control over button, slider, and menu elements is accomplished by positioning the pointer within an element and moving the thumb to the down/click (aligned with index finger) position. Moving the cursor off the screen to the medial side brings up a high-level menu list, with cursor movement constrained to two dimensions (up and down). Selecting an option from the high-level menu acts to change devices (e.g., from the television to the refrigerator).

In some other implementations, the gestures or body movements can also be used to switch a device on or off. After selecting a device, user 502 performs a subsequent gesture such as a downward or upward swipe of hand and/or finger(s) to power on or off a device. For instance, a finger flip up or down can be used to turn lights, television, or refrigerator on or off Other examples of ambient services performed using gestural interaction in environment 500 can involve the filling of baths, pools and spas and the maintenance of a desired temperature in those facilities, as well as the control of any pumps associated with those facilities. They can also control individual devices and appliances such as kitchen appliances, exhaust fans, humidifiers, and dehumidifiers. In some implementations, they can control motorized devices such as skylights, draperies, furniture, walls, screens, ceilings, awnings, physical security barriers, door locks, and others. In other implementations, they can also control answering machines, voice mail systems, and provide maintenance reminders and perform functions such as telephone answering, controlling fountains or in-ground sprinkler systems, controlling kitchen and other appliances, controlling motorized drapes, windows and skylights, opening of locked doors and the scheduling of these functions. In yet other implementations, these ambient services can be applied to other pervasive environments such as boats, aircraft, office suites, conference rooms, auditoriums, classrooms, theaters, hotels, hospitals, and retirement homes. Again with reference to FIG. 5, one implementation includes different paradigm-setting gestures (514, 526, 518, 520, 522, 524, 526) that set device-specific control paradigms to control responsiveness of various devices in a pervasive computing environment 500. As shown in FIG. 5, different gestures such as a grip-and-extend-again motion of two fingers of a hand, grip-and-extend-again motion of a finger of a hand, or holding a first finger down and extending a second finger can be used to determine a context for interpreting subsequent gestures and controlling a selected device. For example, a vertical finger swipe can indicate a user intent to increase volume of a television or increase brightness of the television display. However, paradigm-setting gestures (514, 526, 518, 520, 522, 524, 526) define how various gestures cause on-screen actions on the different devices and/or control their manual responsiveness. In another example relating to a pervasive augmented environment, paradigm-setting gestures (514, 526, 518, 520, 522, 524, 526) can define interaction modes to interact with different virtual screens or objects. For instance, when the user is interacting with a virtual newspaper active on a virtual screen, a forehand sweep can result in an increment change of an electronic page in the virtual newspaper, whereas the same gesture can result in collision of virtual cars in a virtual gaming environment generated by the same virtual screen. In a particular implementation, smart phone 516 equipped with a motion sensory control device is adapted to control each of the home automation systems, including but not limited to entertainment unit 506, thermostat and HVAC control 504, laptop computer 508, desktop computer 510, television 512, and refrigerator 514.

Figure 6:
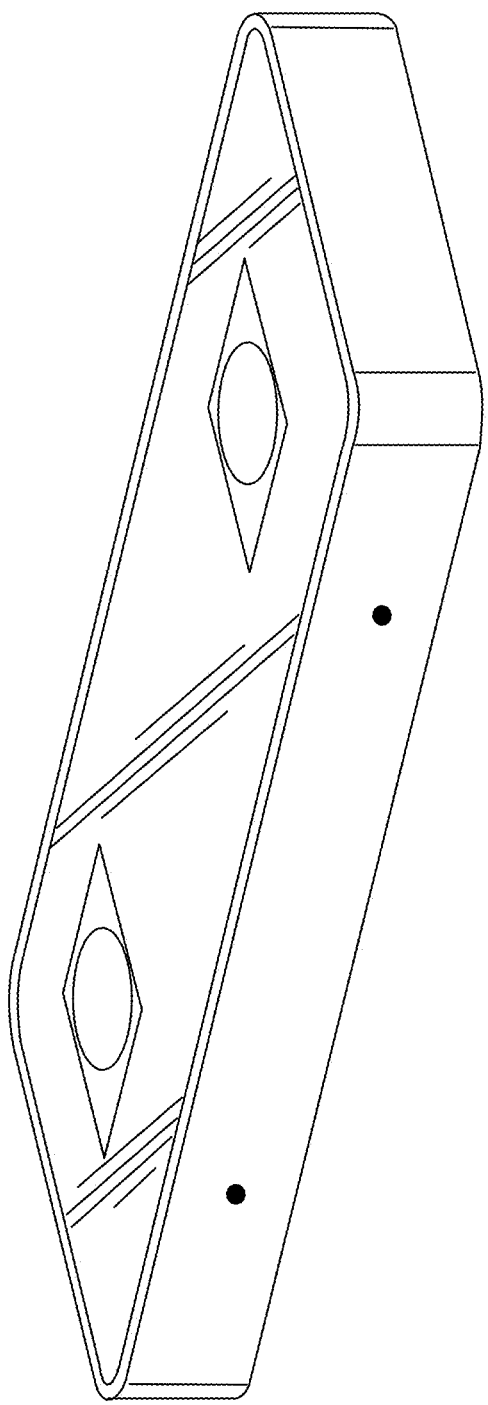
FIG. 6 is one implementation of a motion sensory control device that detects gestures in a three dimensional (3D) sensory space.
Figure 7A:
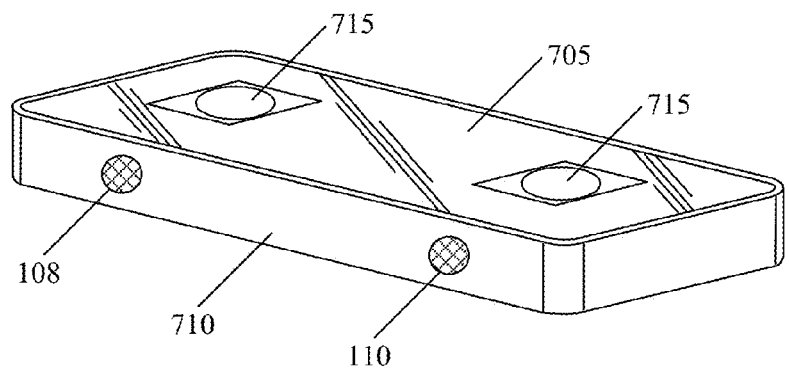
FIG. 7A is a perspective view from the top of a motion sensory control device in accordance with the technology disclosed, with motion sensors along an edge surface thereof.
Figure 7B:
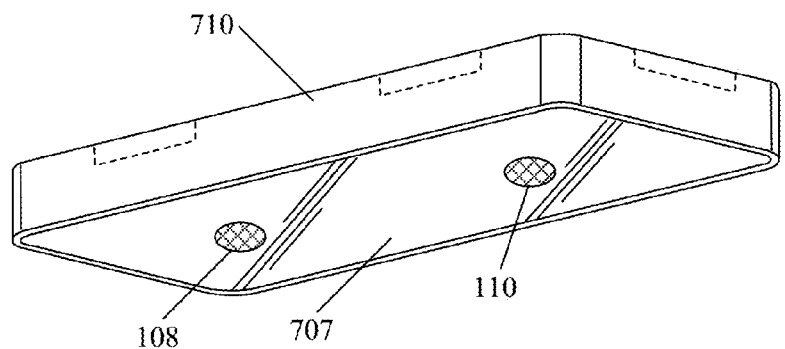
FIG. 7B is a perspective view from the bottom of a motion sensory control device in accordance with the technology disclosed, with motion sensors along the bottom surface thereof
Figure 7C:
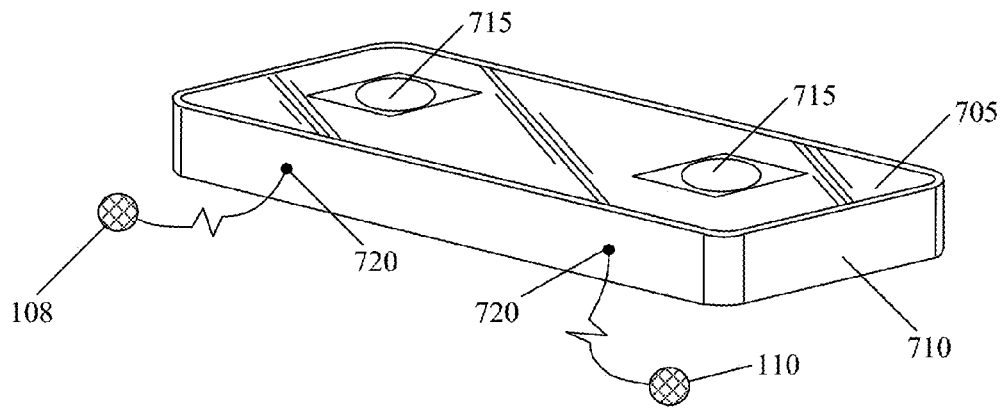
FIG. 7C is a perspective view from the top of a motion sensory control device in accordance with the technology disclosed, with detachable motion sensors configured for placement on a surface.

FIG. 6 is one implementation of a motion sensory control device 600 that detects gestures in a three dimensional (3D) sensory space. FIGS. 7A, 7B, and 7C illustrate three different configurations of a motion sensory control device 700A, 700B, 700C, with reference to example implementations packaged within a single housing as an integrated sensor. In all cases, motion sensory control device 700A, 700B, 700C includes a top surface 705, a bottom surface 707, and a side wall 710 spanning the top and bottom surfaces 705, 707. With reference also to FIG. 7A, the top surface 705 of motion sensory control device 700A contains a pair of windows 715 for admitting light to the cameras 102, 104, one of which is optically aligned with each of the windows 715. If the system includes light sources 108, 110, surface 705 may contain additional windows for passing light to the object(s) being tracked. In motion sensory control device 700A, sources 108, 110 are located on the side wall 710. Desirably, the motion sensors (not shown in the figure for clarity sake) are flush with the surface of side wall 710 so that, the motion sensors are disposed to sense motions about a longitudinal axis of motion sensory control device 700A. Of course, the motion sensors can be recessed from side wall 710 internal to the device in order to accommodate sensor operation and placement within available packaging space so long as coupling with the external housing of motion sensory control device 700A remains adequate. In sensor 700B, sources 108, 110 are located proximate to the bottom surface 707, once again in a flush or recessed configuration. The top surface of the motion sensory control device 700B (not shown in the figure for clarity sake) contains camera windows 715 as shown in FIG. 7A. In FIG. 7C, sources 108, 110 are external contact transducers that connect to motion sensory control device 700C via jacks 720. This configuration permits the motion sensors to be located away from the motion sensory control device 700C, e.g., if the motion sensors are desirably spaced further apart than the packaging of motion sensory control device 700C allows.

Figure 8A:
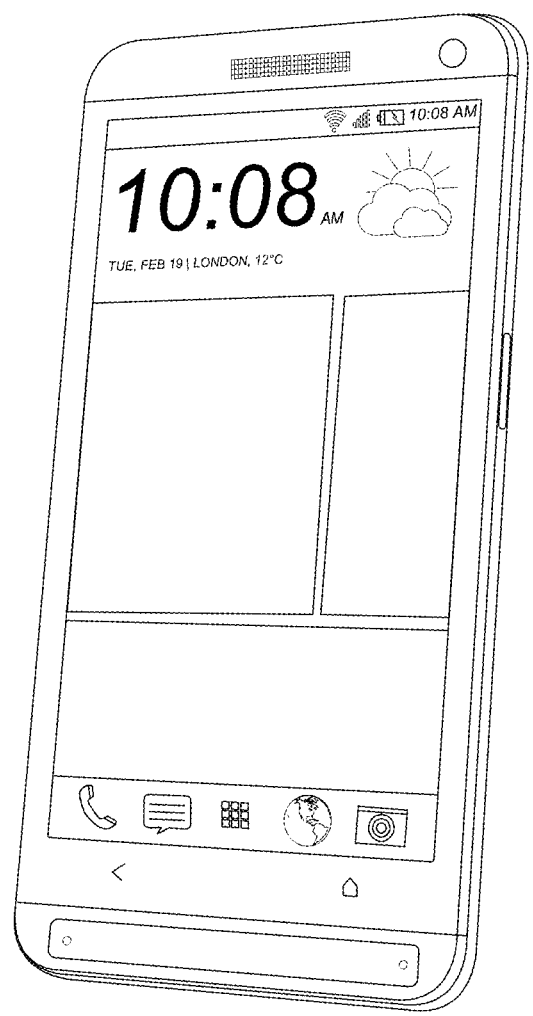
FIG. 8A illustrates one implementation of a smart phone equipped with a motion sensory control device.
Figure 8B:
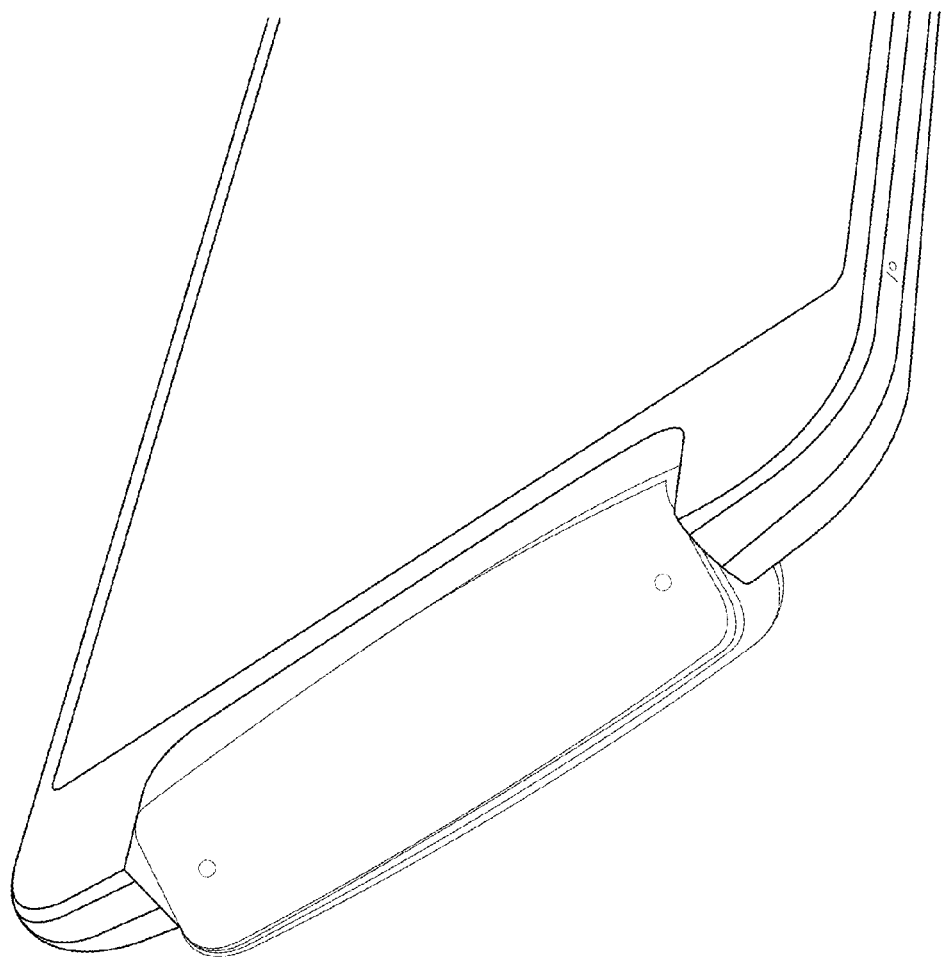
FIG. 8B illustrates one implementation of a motion sensory control device embedded in a swivel camera of a smart phone.
Figure 8C:
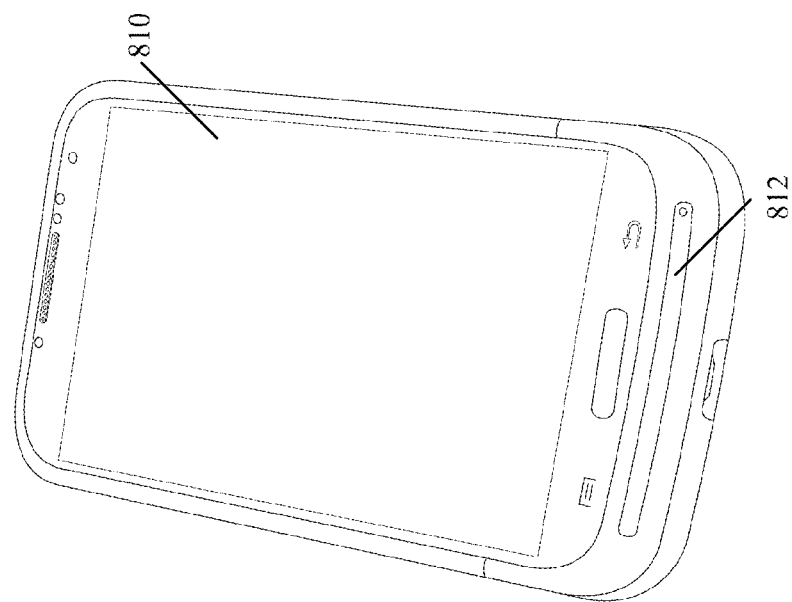
FIG. 8C illustrates one implementation of a motion sensory control device embedded in a mobile case of a smart phone.
Figure 8C:
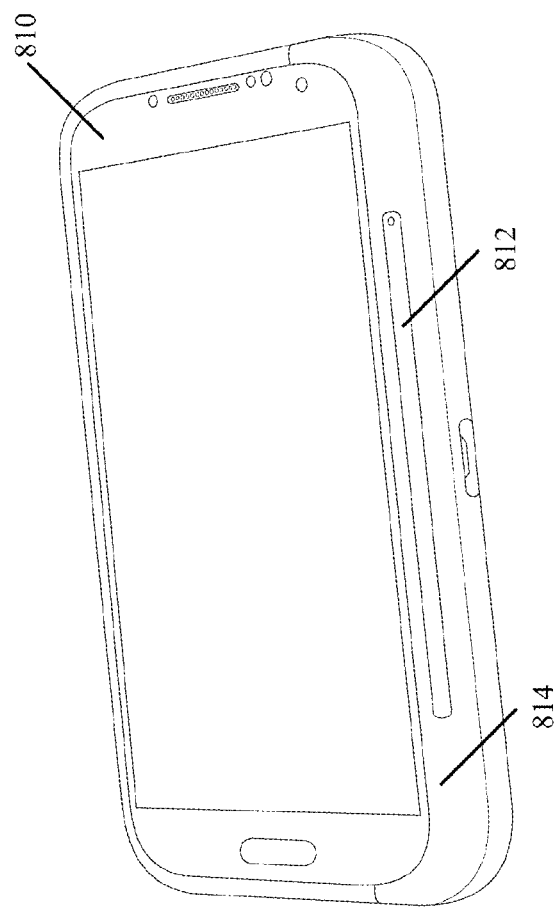
Figure 8D:
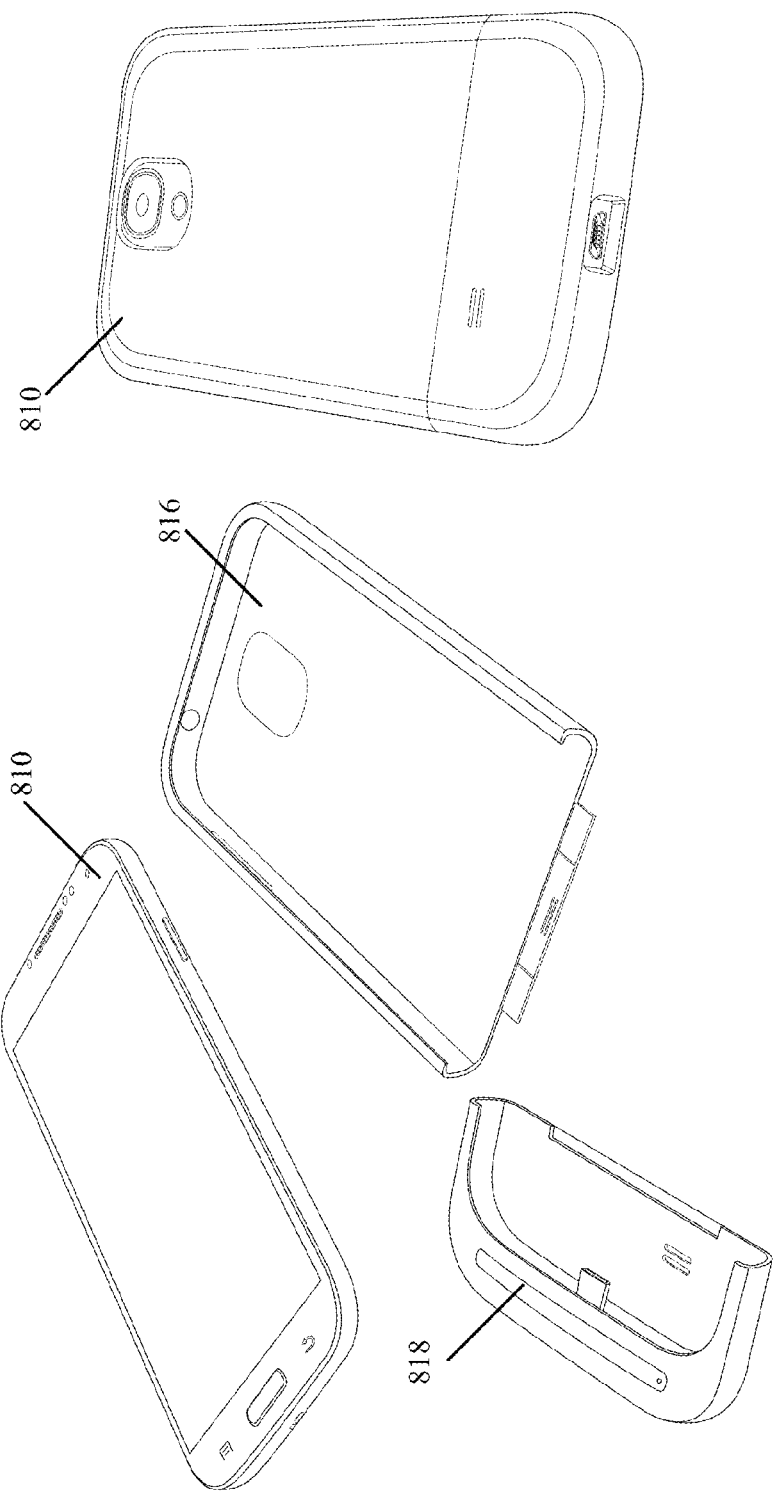
FIG. 8D illustrates one implementation of a motion sensory control device embedded in a portrait mobile case of a smart phone.
Figure 8E:
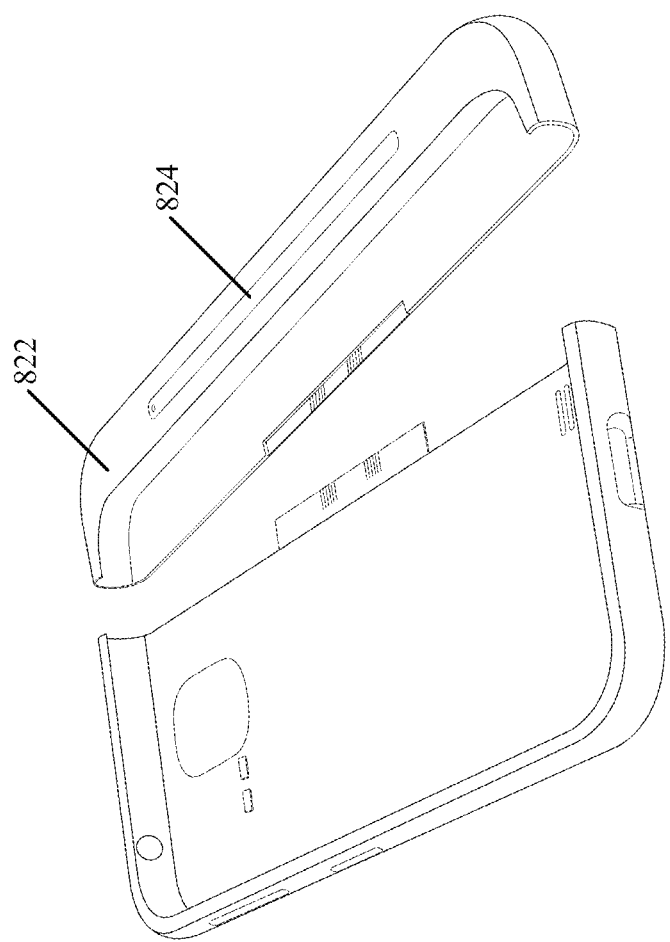
FIG. 8E illustrates one implementation of a motion sensory control device embedded in a landscape mobile case of a smart phone.
Figure 8E:
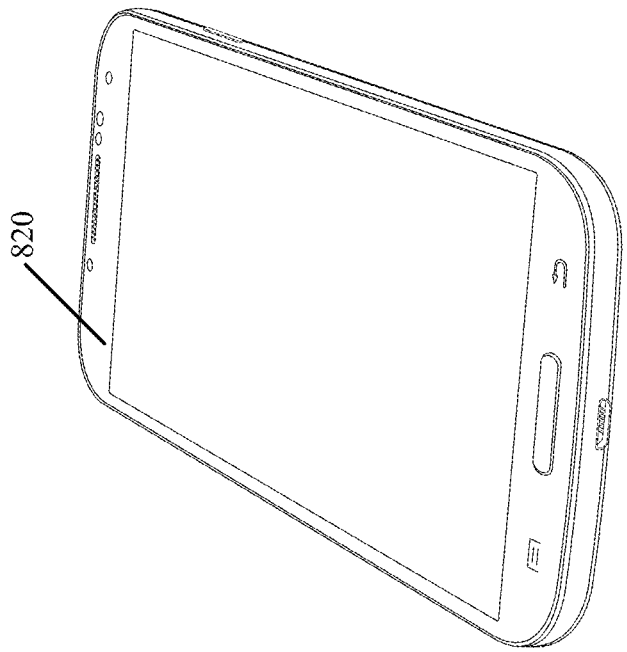
Figure 8F:
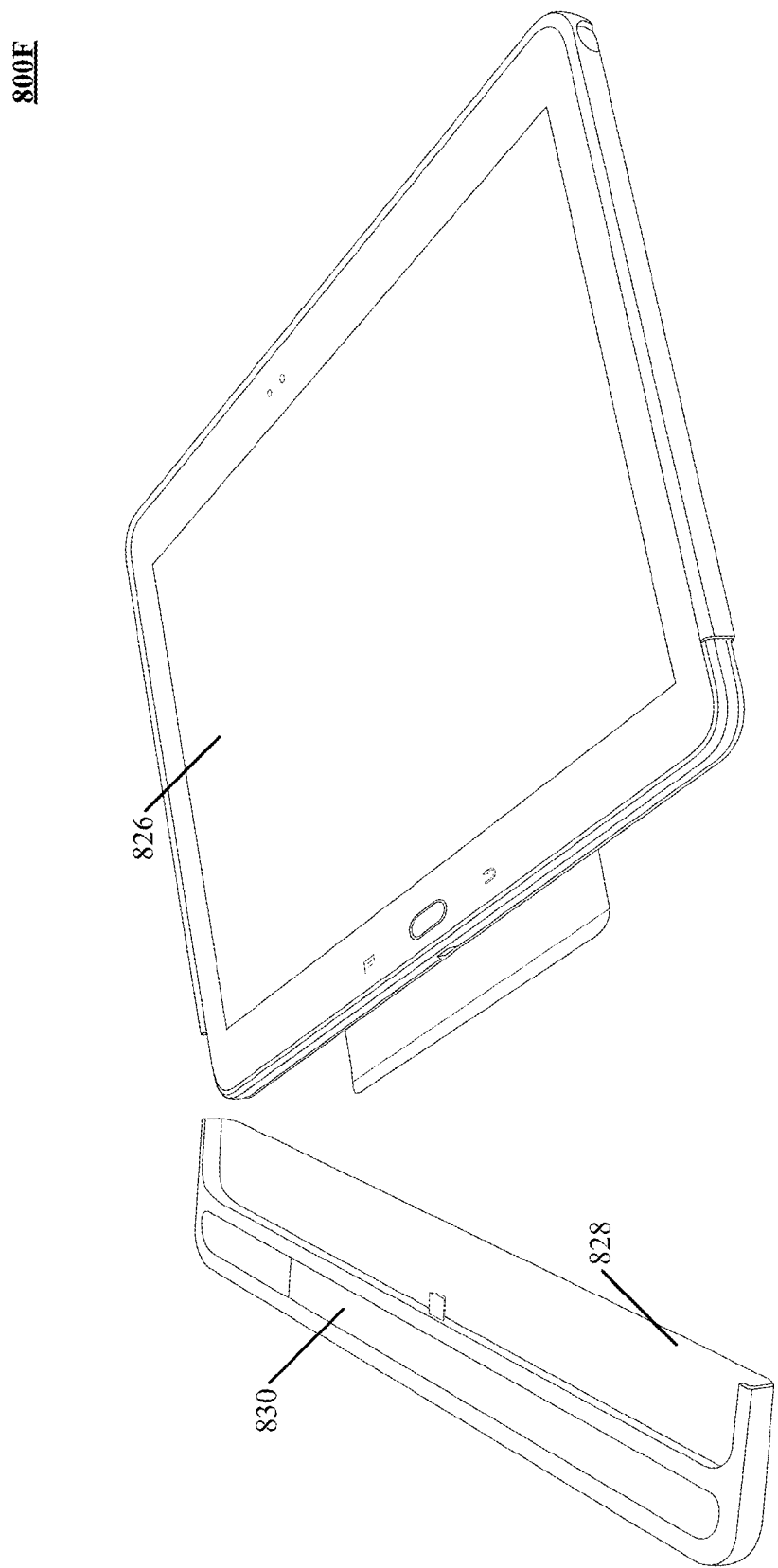
FIG. 8F illustrates one implementation of a motion sensory control device embedded in a keyboard-less tablet case of a computer tablet.
Figure 8G:
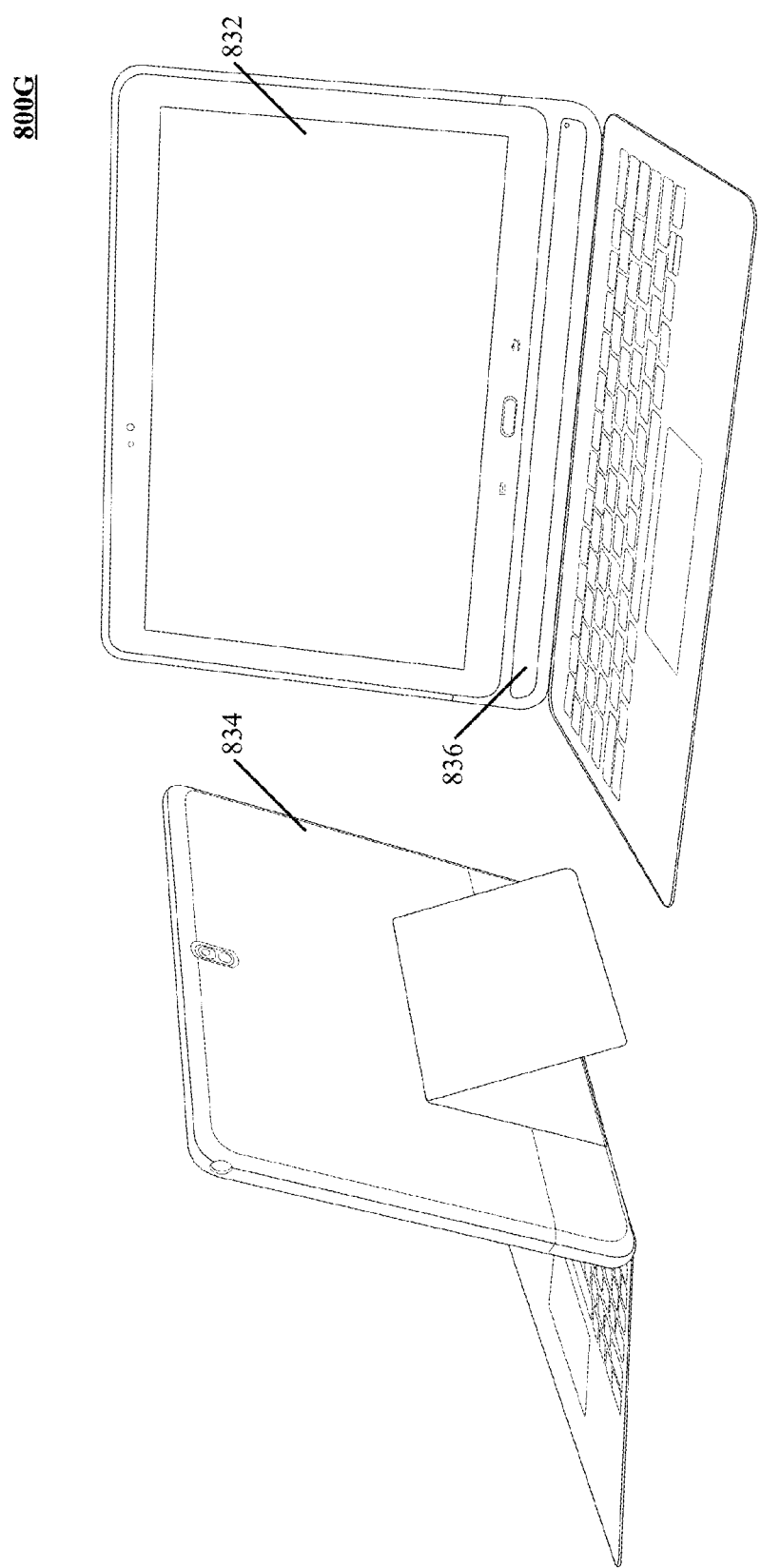
FIG. 8G illustrates one implementation of a motion sensory control device embedded in a tablet case of a computer tablet.

In other implementations, movable sensor components of FIG. 1B can be imbedded in portable (e.g., head mounted devices (HIVIDs), wearable goggles, watch computers, smartphones, and so forth) or movable (e.g., autonomous robots, material transports, automobiles (human or machine driven)) devices. FIG. 8A illustrates one implementation of a smart phone 800A equipped with a motion sensory control device. FIG. 8B illustrates one implementation of a motion sensory control device embedded in a swivel camera 800B of a smart phone. FIG. 8C illustrates one implementation 800C of a motion sensory control device 812 embedded in a mobile case 814 of a smart phone 810. FIG. 8D illustrates one implementation 800D of a motion sensory control device embedded 818 in a portrait mobile case 816 of a smart phone 810. FIG. 8E illustrates one implementation 800E of a motion sensory control device 824 embedded in a landscape mobile case 822 of a smart phone 820. FIG. 8F illustrates one implementation 800F of a motion sensory control device embedded 830 in a keyboard-less tablet case 828 of a computer tablet 826. FIG. 8G illustrates one implementation 800G of a motion sensory control device 836 embedded in a tablet case 834 of a computer tablet 832.

Figure 9:
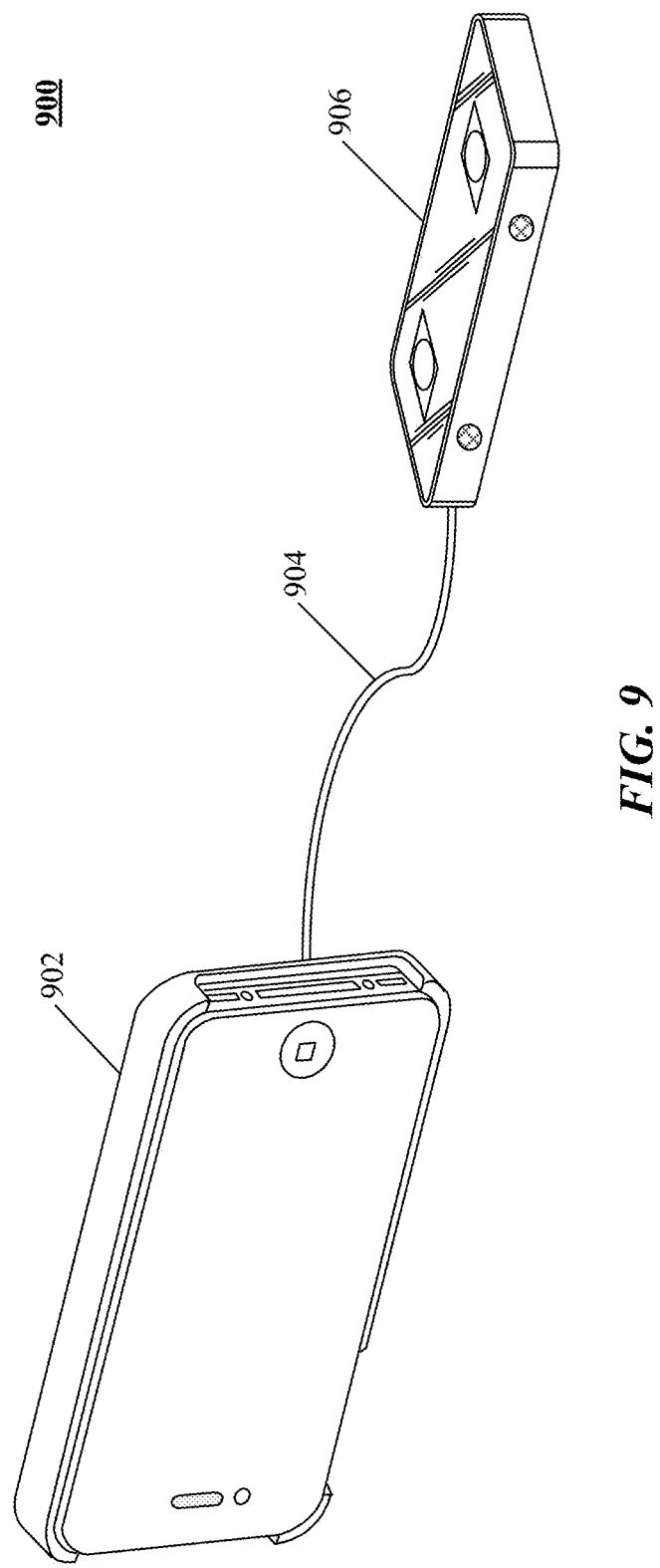
FIG. 9 illustrates one implementation of a motion sensory control device peripherally connected to a smart phone.

FIG. 9 illustrates one implementation 900 of a motion sensory control device 906 peripherally connected to a smart phone 902 through a data cable 904. In one implementation, motion and sensory information collected by the motion sensory control device 906 are transferred to the smart phone 902 thought the data cable 904. In another implementation, gestures detected by the motion sensory control device 906 are preprocessed to reduce required bandwidth and the preprocessed gestures are sent to the smart phone 902 via the communication channel.

A motion-capture system captures movement of a user, a portion of the user's body (often one or more of the user's hands) and/or object in three dimensional ("3D") space using a computing device connected to one or more cameras. Once movement is captured, the computing device can interpret the movement as a user-input command and update a computer display accordingly. For example, the computer display can illustrate a virtual representation of the user's hands and update that representation as the user moves his hands. In another example, the computer display can illustrate a virtual object that is manipulated (e.g., rotated or resized) as the user's hands move.

Processing a sequence of captured images quickly enough to detect and characterize objects therein (e.g., in terms of their contours), and track their motions through the image sequence in real time, requires substantial computational resources, which is of special concern when the motion sensory control device is embedded in smart phones that have power limitations. In order to accurately track motion in real or near-real time, the camera(s) of motion-capture systems typically operate at a frame rate of at least 15 image frames per second. Image acquisition at such high rates entails significant power requirements; in general, there is a trade-off between the frame-rate-dependent accuracy and responsiveness of motion-capture systems on the one hand and power consumption on the other hand. Power requirements, however, can pose a practical limit to the range of applications of motion-capture systems like smart phones equipped with motion sensory control devices, as excessive power consumption can render their employment impractical or economically infeasible. It would therefore be desirable to reduce power consumption of smart phones equipped with motion sensory control devices, preferably in a manner that does not affect motion-tracking performance.

This is achieved by monitoring at least one physical and/or environmental parameter of a smart phone equipped with a motion sensory control device and in response to detection of a change in the physical and/or environment parameter exceeding a specified threshold, automatically switching the smart phone from one operation mode to another such as a high-power consumption mode to a low-power consumption mode.

Hand-Held Mode

Figure 10:
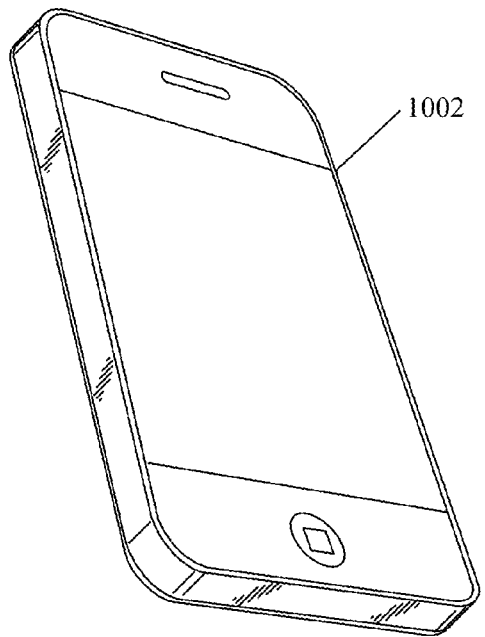
FIG. 10 is one implementation of switching a smart phone to a hand-held mode of operation when the embedded motion sensory control device is upright and moving.

FIG. 10 is one implementation of switching a smart phone 1002 to a hand-held mode of operation 1000 when the embedded motion sensory control device is upright and moving. In one implementation, the smart phone 1002 includes at least one of gyroscopes, accelerometers, tilt-sensors, and/or other such devices. These orientation and acceleration measuring devices when embed in the smart phone 1002 can generate one or more output signals like tri-axis signals for orthogonal x-, y-, and z-axes that indicate physical orientation of the smart phone 1002. In such an implementation, when a user holds the smart phone 1002 such that its face is proximate to the user's ear at the side of the head, as with a customary telephone handset, and its orientation and acceleration cross a certain threshold, the motion sensory control device embedded in the smart phone 1002 is switched to the hand-held mode of operation 1000.

Wide-Area Mode

Figure 11:
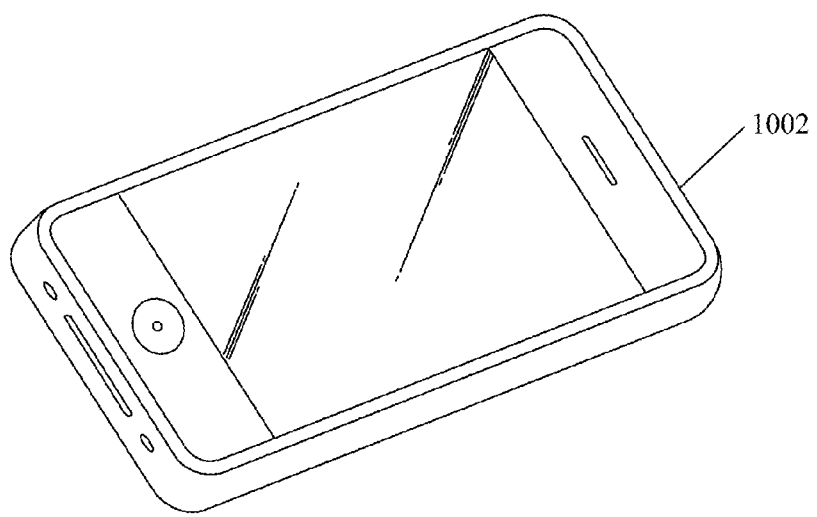
FIG. 11 shows one implementation of switching a smart phone to a wide-area mode of operation when the embedded motion sensory control device is laid flat and stationary.

FIG. 11 shows one implementation of switching a smart phone to a wide-area mode of operation 1100 when the embedded motion sensory control device is laid flat and stationary. As described above, orientation and acceleration of the smart phone 1002 can be measured using at least one of gyroscopes, accelerometers, tilt-sensors, and/or other such devices embedded in the smart phone 1002 and switch the smart phone 1002 to the wide-area mode of operation 1100.

Across-the-Room Mode

Figure 12A:
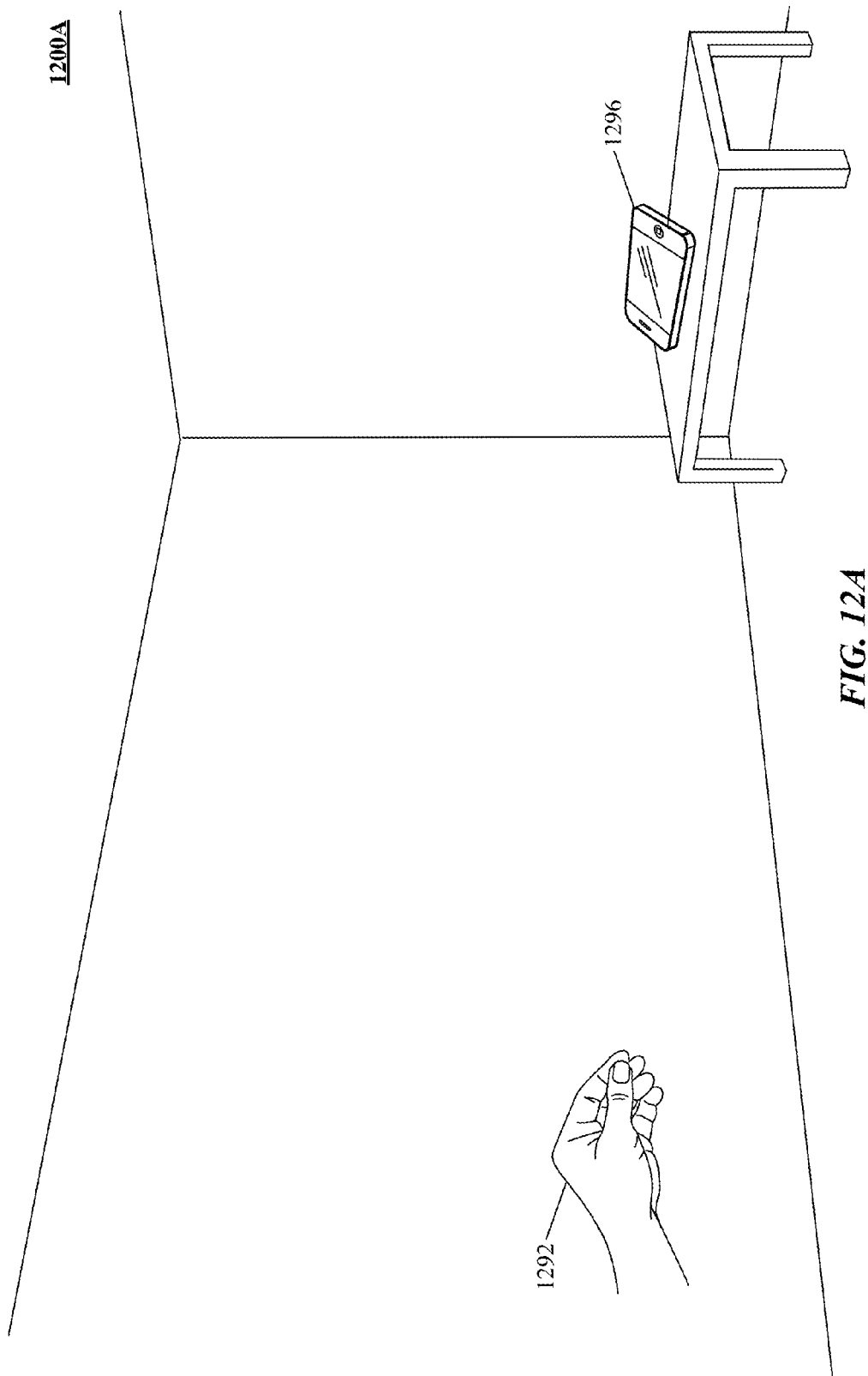
FIG. 12A depicts one implementation of switching a smart phone to an across-the-room mode of operation.

FIG. 12A depicts one implementation of switching a smart phone to an across-the-room mode 1200A of operation. In one implementation, when the smart phone 1296 is in a wide-area mode of operation 1100 and its embedded motion sensory control device detects a gesture 1292, the smart phone 1296 is switched to an across-the-room mode of operation.

Inter-Mode Operation

In one implementation, conserving power on a smart phone equipped with motion sensory control devices includes identifying a mode of operation of the smartphones. In one example, when the mode of operation is "hand-held," it is inferred that the user is in a telephonic conversation and does not intend to use the gesture recognition and interpretation capabilities of the embedded motion sensory control device. Thus, in the hand-held mode of operation, the recognition and interpretation capabilities of the embedded motion sensory control device can be lowered or de-activated to save power. In contrast, when the phone is "wide-area" or "across-the-room" mode of operations, such capabilities can be increased or activated. This is achieved by adjusting one or more image acquisition parameters and/or image-analysis parameters embedded motion sensory control device. Once adjusted, acquisition and/or analysis of image data by the motion sensory control device or other sensors of the smart phones are made compliant with the adjusted image acquisition parameters and/or image-analysis parameters. In some implementations, image acquisition parameters include frame resolution and frame capture rate and image-analysis parameters include analysis algorithm and analysis density.

In some other implementations, a "hand-held" mode of operation can initiate the gesture recognition and interpretation capabilities along with an "anti-jittering" effect or "drift-compensation" mode as described later in this application. In yet other implementations, power to illumination sources incorporated with the motion sensory device can be tailored for long distance operation, e.g., illumination sources can be "strobed" (e.g., pulsed) to provide intense bursts of illumination over a shorter period of time, effectively providing greater illumination at reduced power consumption.

In various implementations, operation of an embedded motion sensory control device is tailored and ideally tuned to one or more modes of operation of a smart phone. In general, images are captured by one or more cameras of the smart phone and stored in "frame buffers" i.e., partitions or dedicated segments of computer memory that store digital images as ordered arrays of image points or "pixels." A motion sensory control device can include a set of image-analysis algorithms that locate, in an image, groups or regions of pixels that correspond to an object in the recorded scene—e.g., a user's moving hand. A digital image has a size (in pixels) and a resolution, and the image-analysis algorithm takes image input and processes it into an output defining objects in the image and their movements from image to image. Once a mode of operations of the smart phone is determined, a suitable (and ideally well suited) combination of parameters is selected, specifying, for example, characteristics of the images, their rate of acquisition and how the image-analysis algorithm processes them so that adequate overall performance is provided.

Figure 12B:
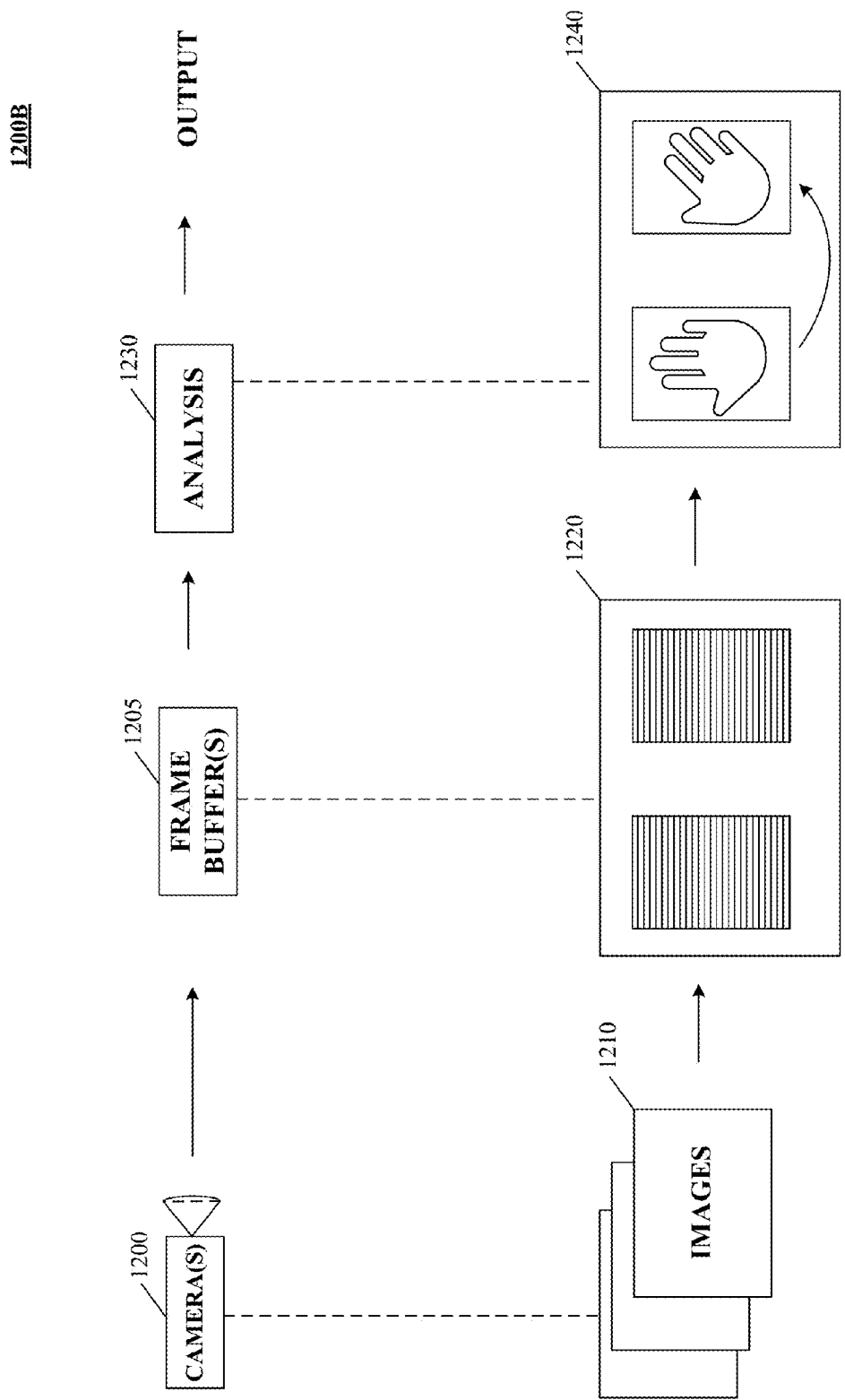
FIG. 12B depicts the basic operations and functional units involved in motion capture and image analysis in accordance with implementations of the technology disclosed.

FIG. 12B depicts the basic operations and functional units 1200B involved in motion capture and image analysis in accordance with implementations of the technology disclosed. As shown in FIG. 12B, the camera(s) 1200 record digital images 1210 of a scene. Each digital image is captured as an array of pixel values by the associated camera's image sensor, and the digital images are transferred—either in "raw" format or following conventional preprocessing to one or more frame buffers 1205. A frame buffer is a partition or dedicated segment of volatile memory that stores a "bitmapped" image frame 1220 corresponding to the pixel values of an image as output by the camera 1200 that recorded it. The bitmap is generally organized conceptually as a grid, with each pixel mapped one-to-one or otherwise to output elements of a display. It should be stressed, however, that the topology of how memory cells are physically organized within the frame buffers 1205 does not matter and need not conform directly to the conceptual organization.

The number of frame buffers included in a system generally reflects the number of images simultaneously analyzed by the analysis system or module 1230, which is described in greater detail below. Briefly, analysis module 1230 analyzes the pixel data in each of a sequence of image frames 1220 to locate objects therein and track their movement over time (as indicated at 1240). This analysis can take various forms, and the algorithm performing the analysis dictates how pixels in the image frames 1220 are handled. For example, the algorithm implemented by analysis module 1230 can process the pixels of each frame buffer on a line-by-line basis—i.e., each row of the pixel grid is successively analyzed. Other algorithms can analyze pixels in columns, tiled areas, or other organizational formats.

These operations are necessarily computationally intensive; the approach of the technology disclosed is to determine the capacity of the overall smart phone in terms of the responsible components, and to tailor the image analysis to accommodate phone limitations while respecting minimum performance requirements. This approach is best understood with reference to representative implementations of a smart phone (which establishes the computational capacity) and an image-analysis algorithm (execution of which can be altered in response to system capacity limitations).

In various implementations, the motion captured in a series of camera images is used to compute a corresponding series of output images for display on the display 138. For example, camera images of a moving hand can be translated into a wire-frame or other graphic depiction of the hand by the processor 132. Alternatively, hand gestures can be interpreted as input used to control a separate visual output; by way of illustration, a user can be able to use upward or downward swiping gestures to "scroll" a webpage or other document currently displayed, or open and close their hand to zoom in and out of the page. In any case, the output images are generally stored in the form of pixel data in a frame buffer, e.g., one of the frame buffers 1205. A video display controller reads out the frame buffer to generate a data stream and associated control signals to output the images to the display 138. The video display controller can be provided along with the processor 132 and memory 134 on-board the motherboard of the computer 100B, and can be integrated with the processor 132 or implemented as a co-processor that manipulates a separate video memory. As noted, the computer 100B can be equipped with a separate graphics or video card that aids with generating the feed of output images for the display 138. The video card generally includes a graphics processing unit (GPU) and video memory, and is useful, in particular, for complex and computationally expensive image processing and rendering. The graphics card can include the frame buffer and the functionality of the video display controller (and the on-board video display controller can be disabled). In general, the image-processing and motion-capture functionality of the system can be distributed between the GPU and the main processor 132 in various ways.

Suitable algorithms for motion-capture program 144 are described below as well as, in more detail, in U.S. patent application Ser No. 13/414,485, filed on Mar. 7, 2012 and Ser. No. 13/742,953, filed on Jan. 16, 2013, and U.S. Provisional Patent Application No. 61/724,091, filed on Nov. 8, 2012, which are hereby incorporated herein by reference in their entirety. The various modules can be programmed in any suitable programming language, including, without limitation high-level languages such as C, C++, C#, OpenGL, Ada, Basic, Cobra, FORTRAN, Java, Lisp, Perl, Python, Ruby, or Object Pascal, or low-level assembly languages.

In one implementation, cameras 102, 104 are operated to collect a sequence of images of the object 114. The images are time correlated such that an image from camera 102 can be paired with an image from camera 104 that was captured at the same time (or within a few milliseconds). These images are then analyzed by an image-analysis module 1230; in particular, an object-detection routine detects the presence of one or more objects in the image, and the object-analysis routine analyzes detected objects to determine their positions and shape in 3D space. In some implementations, the analysis routine considers a stack of 2D cross-sections through the 3D spatial field of view of the cameras. These cross-sections are referred to herein as "slices." A slice can be any plane at least part of which is in the field of view of cameras 102, 104. For purposes of motion-capture analysis, slices can be selected at regular intervals in the field of view. For example, if the received images include a fixed number of rows of pixels (e.g., 1080 rows), each row can be associated with a slice, or a subset of the rows can be used for faster processing. Where a subset of the rows is used, image data from adjacent rows can be averaged together, e.g., in groups of two or three.

Figure 12C:
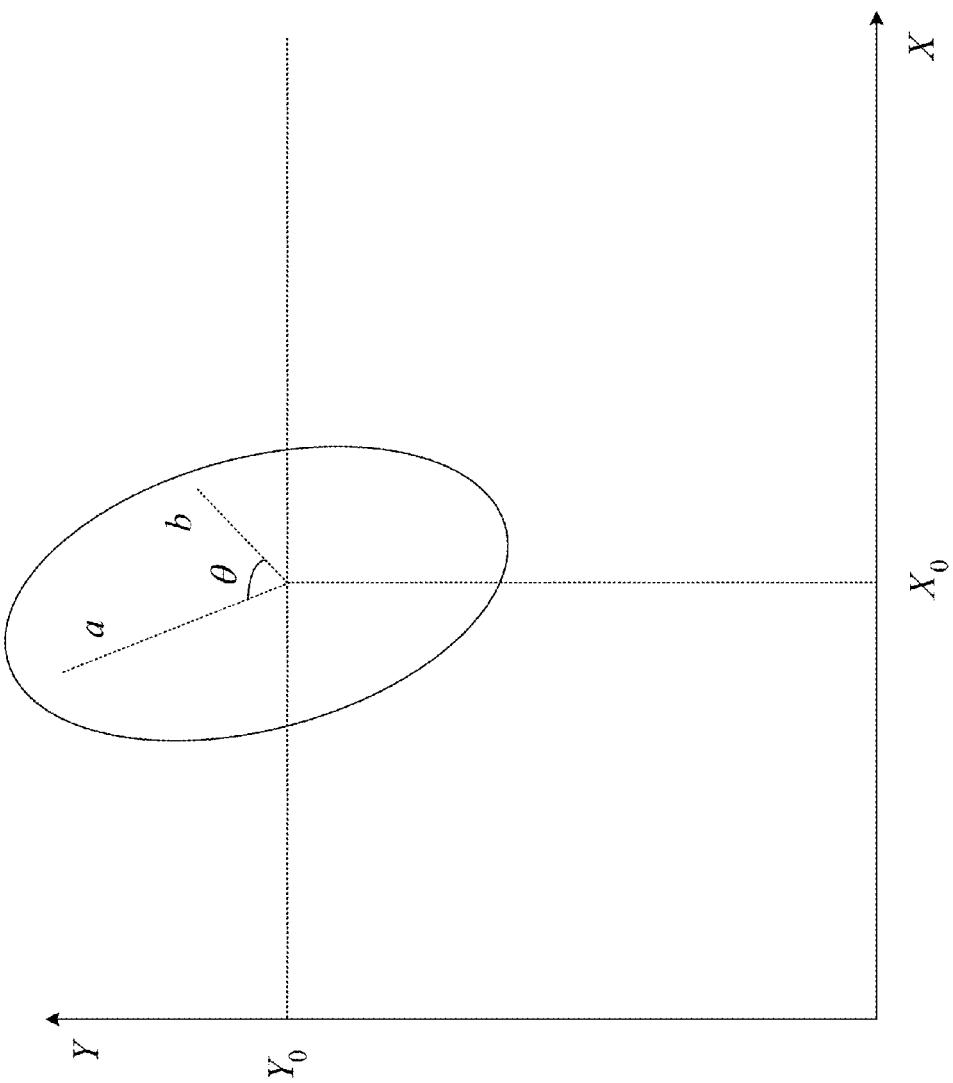
FIG. 12C is a characterization of an ellipse into different parameters across a xy plane.

In general, as shown in one implementation 1200C of FIG. 12C, an ellipse in the xy plane can be characterized by five parameters: the x and y coordinates of the center ($x_C$, $y_C$), the semi-major axis (a), the semi-minor axis (b), and a rotation angle (θ) (e.g., the angle of the semi-major axis relative to the x axis). With only four tangents, the ellipse is underdetermined. However, an efficient process for estimating the ellipse in spite of this has been developed. In various implementations as described below, this involves making an initial working assumption (or "guess") as to one of the parameters and revisiting the assumption as additional information is gathered during the analysis. This additional information can include, for example, physical constraints based on properties of the cameras and/or the object.

In some implementations, one, two, three, four or more than four tangents to an object can be available for some or all of the slices, e.g., because more than two vantage points are available. A cross-section can still be determined, and the process in some instances is somewhat simplified as there is no need to assume a parameter value. In some instances, additional tangents can create additional complexity. In some implementations, fewer than four tangents to an object can be available for some or all of the slices, e.g., because an edge of the object is out of range of the field of view of one camera or because an edge was not detected. A slice with three tangents can be analyzed. For example, using two parameters from an ellipse fit to an adjacent slice (e.g., a slice that had at least four tangents), the system of equations for the ellipse and three tangents is sufficiently determined that it can be solved. As another option, a circle can be fit to the three tangents; defining a circle in a plane requires only three parameters (the center coordinates and the radius), so three tangents suffice to fit a circle. Slices with fewer than three tangents can be discarded or combined with adjacent slices.

In some implementations, each of a number of slices is analyzed separately to determine the size and location of an elliptical cross-section of the object in that slice. This provides an initial 3D model (specifically, a stack of elliptical cross-sections), which can be refined by correlating the cross-sections across different slices. For example, it is expected that an object's surface will have continuity, and discontinuous ellipses can accordingly be discounted. Further refinement can be obtained by correlating the 3D model with itself across time, e.g., based on expectations related to continuity in motion and deformation.

The modes of operation of the smart phone equipped with a motion sensory control device can determine the coarseness of the data provided to the image-analysis module 1230, the coarseness of its analysis, or both in accordance with entries in a performance database. For example, during a wide-area mode of operation 1100, the image-analysis module 1230 can operate on every image frame and on all data within a frame, capacity limitations can dictate analysis of a reduced amount of image data per frame (i.e., resolution) or discarding of some frames altogether. If the data in each of the frame buffers 1205 are organized as a sequence of data lines. The manner in which data is dropped from the analysis can depend on the image-analysis algorithm or the uses to which the motion-capture output is put. In some implementations, data is dropped in a symmetric or uniform fashion—e.g., every other line, every third line, etc. is discarded up to a tolerance limit of the image-analysis algorithm or an application utilizing its output. In other implementations, the frequency of line dropping can increase toward the edges of the frame. Still other image-acquisition parameters that can be varied include the frame size, the frame resolution, and the number of frames acquired per second. In particular, the frame size can be reduced by, e.g., discarding edge pixels or by resampling to a lower resolution (and utilizing only a portion of the frame buffer capacity). Parameters relevant to acquisition of image data (e.g., size and frame rate and characteristics) are collectively referred to as "acquisition parameters," while parameters relevant to operation of the image-analysis module 1230 (e.g., in defining the contour of an object) are collectively referred to as "image-analysis parameters." The foregoing examples of acquisition parameters and image-analysis parameters are representative only, and not limiting.

Acquisition parameters can be applied to the camera 1200 and/or to the frame buffers 1205. The camera 1200, for example, can be responsive to acquisition parameters in operating the cameras 102, 104 to acquire images at a commanded rate, or can instead limit the number of acquired frames passed (per unit time) to the frame buffers 1205. Image-analysis parameters can be applied to the image-analysis module 1230 as numerical quantities that affect the operation of the contour-defining algorithm.

The desirable values for acquisition parameters and image-analysis parameters appropriate to a given level of available resources can depend, for example, on the characteristics of the image-analysis module 1230, the nature of the application utilizing the mocap output, and design preferences. Whereas some image-processing algorithms can be able to trade off a resolution of contour approximation against input frame resolution over a wide range, other algorithms may not exhibit much tolerance at all—requiring, for example, a minimal image resolution below which the algorithm fails altogether.

Pairing Mode

Figure 13:
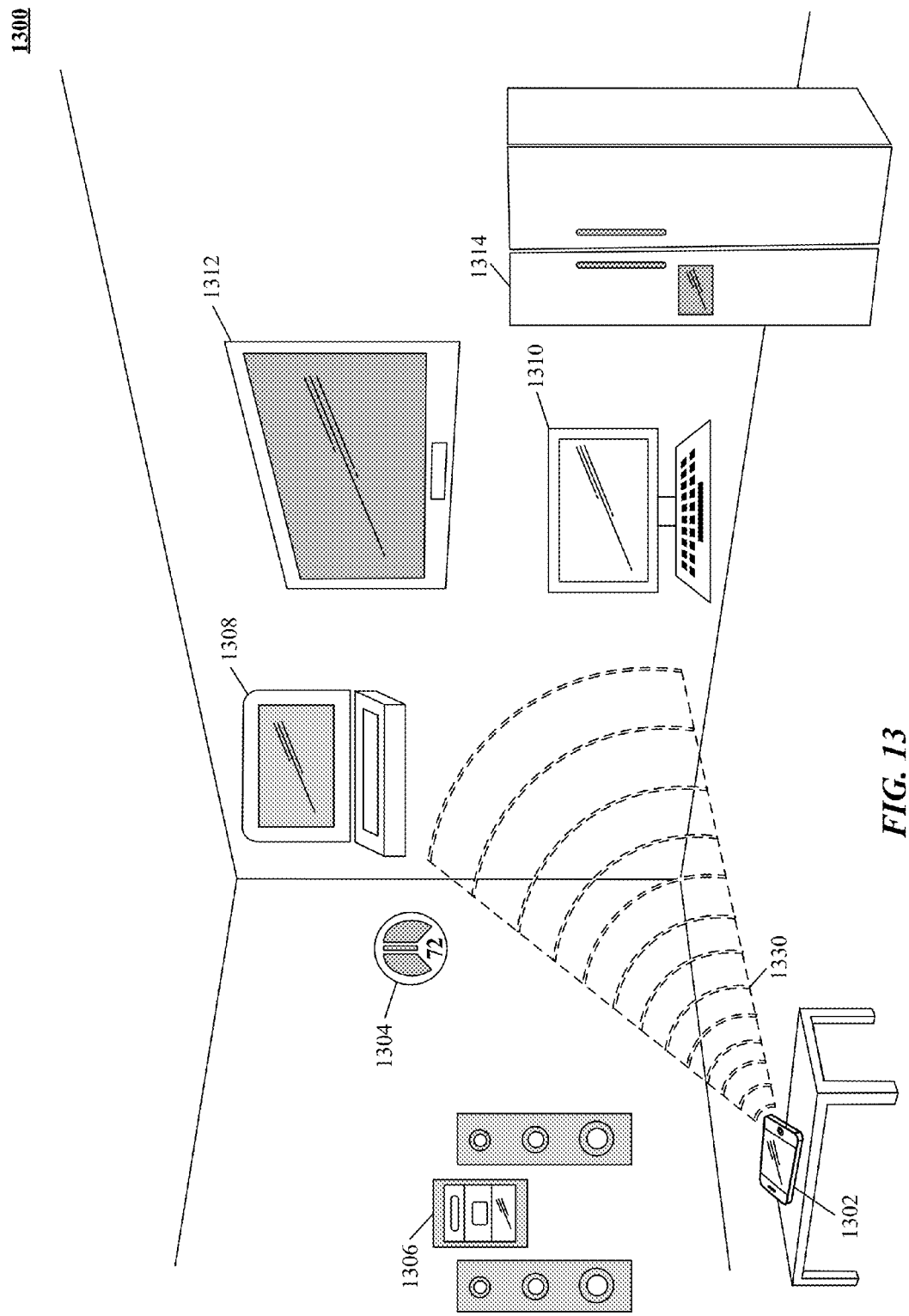
FIG. 13 illustrates one implementation of switching a smart phone to a pairing mode of operation.

FIG. 13 illustrates one implementation of switching a smart phone 1302 to a pairing mode of operation 1300. In such an implementation, devices (1304, 1306, 1308, 1310, 1312, 1314) and smart phone 1302 can use Bluetooth or other communications technology to establish a communication channel between the smart phone 1302 and selected one of the discovered devices, when the smart phone 1302 is laid flat and stationary or hand held in other positions (not shown in FIG. 13 for clarity sake). This is achieved by exchanging device identity tokens that include data payloads in their respective discovery beacons like the one shown in FIG. 13 as 1330. In some implementations, the Bluetooth technology can include an identification phase and a pairing phase. During the identification phase, the smart phone 1302 can set a frequency-hopping pattern, to which the devices (1304, 1306, 1308, 1310, 1312, 1314) can synchronize their signals. In the pairing phase, devices (1304, 1306, 1308, 1310, 1312, 1314) and smart phone 1302 can transmit low power short-range RF signals and broadcast device identity tokens. Alternatively, device identity tokens can be received and processed without pairing in a connectionless mode.

Monitoring

Implementations of the technology disclosed can be applied to determine the path of an object traveling in relation to a movable or moving frame of reference associated with one or more optical, acoustic or vibrational sensors. Advantageously, some implementations can enable gesture recognition for use in smart phones. This capability allows the user to execute intuitive gestures with virtualized or real world contact with a real world or virtual object using a smart phone while compensating for jittery motion of the smart phone by distinguishing motion of objects from motions of the smart phone itself in order to facilitate proper gesture recognition.

Figure 14A:
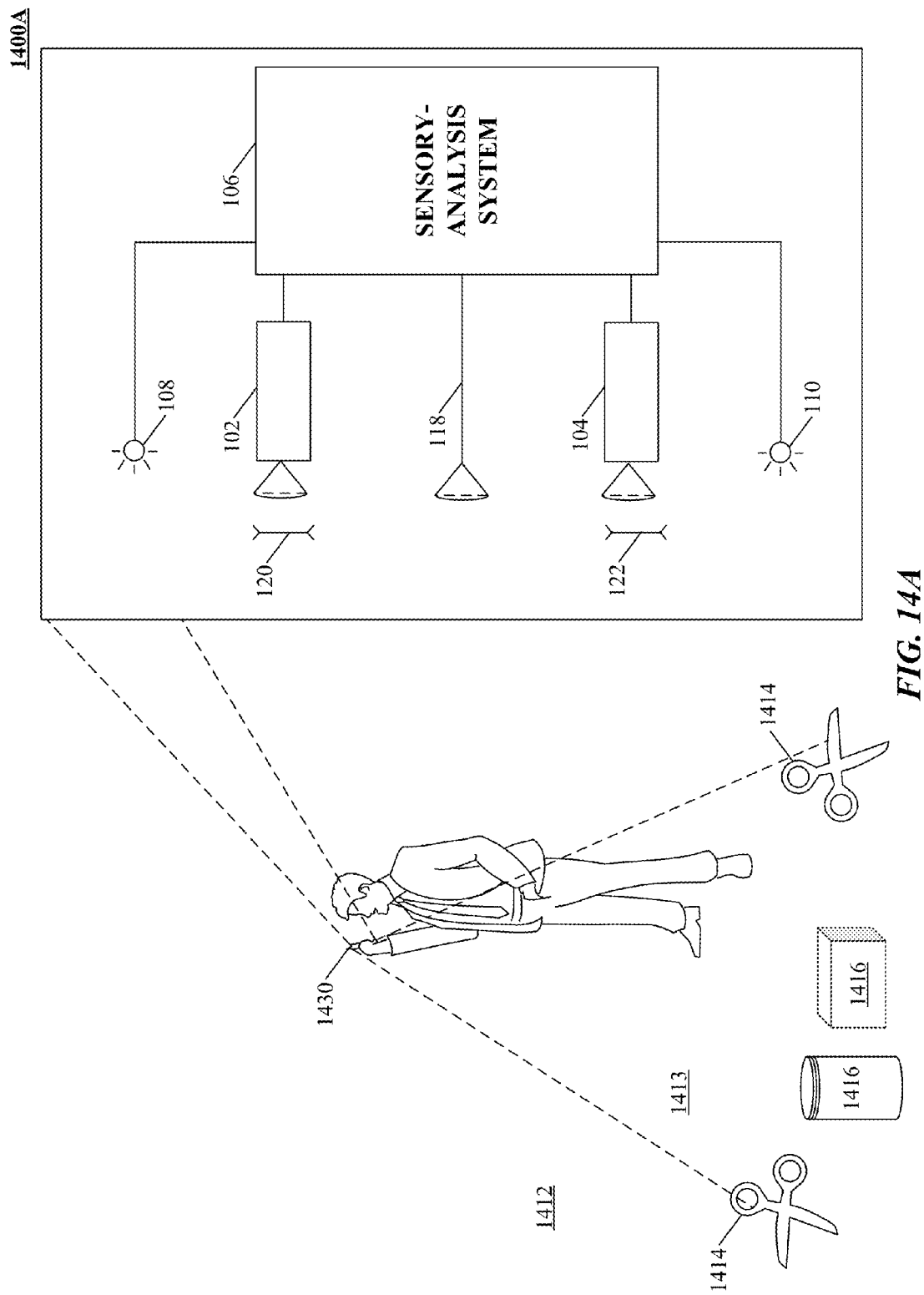
FIG. 14A illustrates a system for capturing image data according to one implementation of the technology disclosed.

FIG. 14A illustrates one implementation of switching a smart phone to a drift-compensation mode of operation 1400A. In particular, FIG. 14A illustrates a system 1400A for capturing image data according to one implementation of the technology disclosed. In one implementation, gesture-recognition system 100A is preferably incorporated into a smart phone camera 1430, or other type of portable device.

Figure 14B:
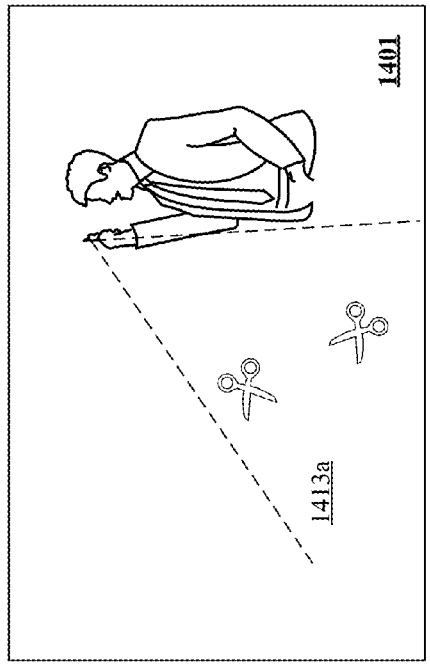
FIG. 14B illustrates apparent movement of objects from the perspective of a surveillance viewer of an environment in accordance with the technology disclosed.
Figure 14B:
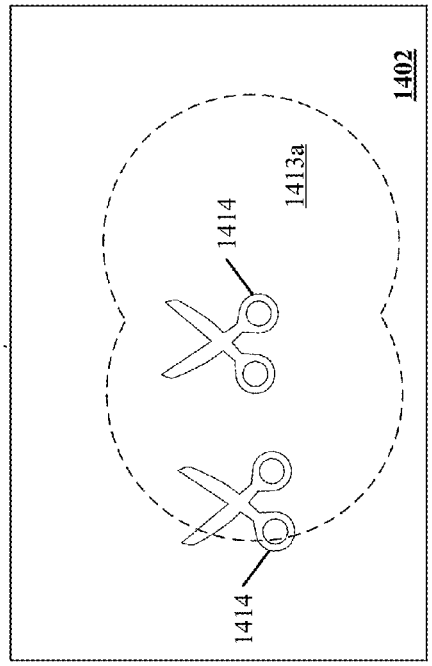
Figure 14B:
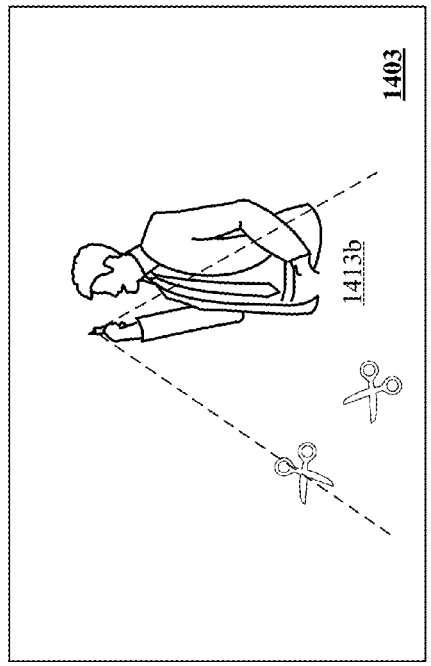
Figure 14B:
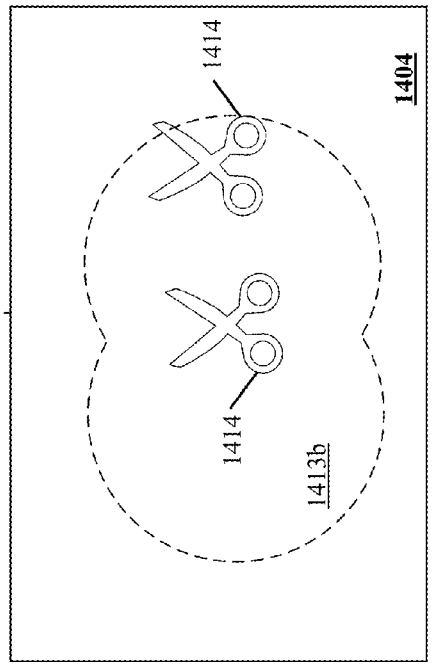

FIG. 14B illustrates apparent movement of objects from the perspective of the user of a virtual environment 1400B enabled apparatus in accordance with the technology disclosed. FIG. 14B shows two views of a user of a device 1430 viewing a field of view 1413 at two different times. As shown in block 1401, at an initial time t$_0$, user is viewing field of view 1413a using device 1430 in a particular initial position to view an area 1413a. As shown in block 1402, device 1430 presents to user a display of the device field of view 1413a that includes objects 1414 (scissors) in a particular pose (e.g., position and/or orientation in space). As shown in block 1403, subsequently at time t$_1$, the user has repositioned device 1430. Accordingly, the apparent position of objects 1414 in the field of view 1413b shown in block scissors 1404 has changed from the apparent position of the objects 1414 in field of view 1413b. Even in the case where the scissors 1414 did not move in space, the user sees an apparent movement of the scissors 1414 due to the change in position of the device.

Figure 15:
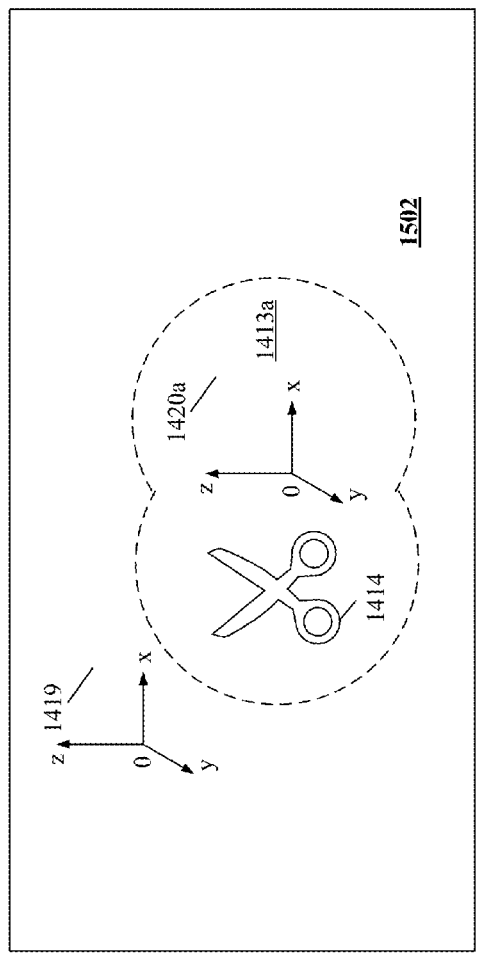
FIG. 15 illustrates apparent movement of objects from the perspective of a user of a virtual environment enabled apparatus in accordance with the technology disclosed.
Figure 15:
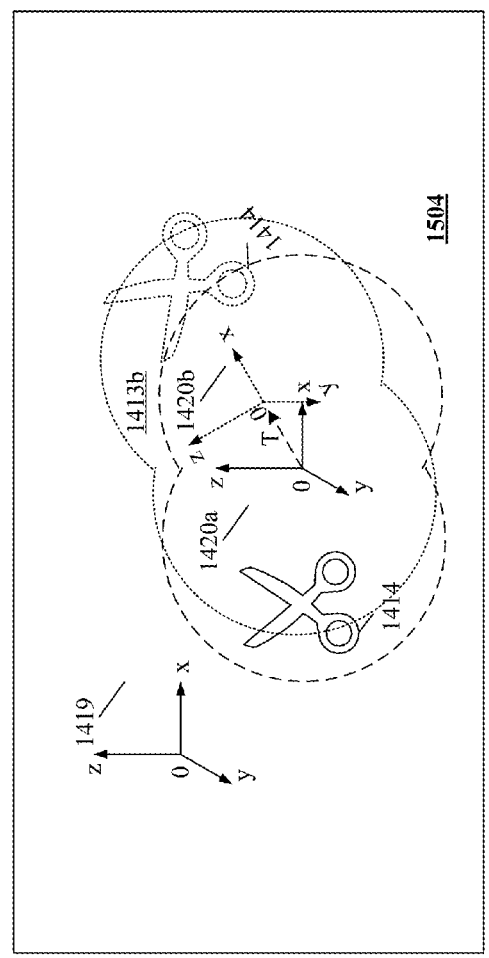

FIG. 15 illustrates apparent movement of objects from the perspective of the user of a virtual environment 1500 enabled apparatus in accordance with the technology disclosed. As shown by block scissors 1502, field of view 1413a presented by device 1430 at time t$_0$ includes an object 1414. At time t$_0$, the position and orientation of tracked object 1414 is known with respect to device reference frame 1420a, again at time t$_0$. As shown by block 1504, at time t$_1$, the position and orientation of both device reference frame 1420b and tracked object 1414 have changed. As shown by block 1504, field of view 1413b presented by device 1430 at time t$_1$ includes object 1414 in a new apparent position. Because the device 1430 has moved, the device reference frame 1420 has moved from an original or starting device reference frame 1420a to a current or final reference frame 1420b as indicated by transformation T. It is noteworthy that the device 1430 can rotate as well as translate. Implementations can provide sensing the position and rotation of reference frame 1420b with respect to reference frame 1420a and sensing the position and rotation of tracked object 1414 with respect to 1420b, at time t$_1$. Implementations can determine the position and rotation of tracked object 1414 with respect to 1420a from the sensed position and rotation of reference frame 1420b with respect to reference frame 1420a and the sensed position and rotation of tracked object 1414 with respect to 1420b.

In an implementation, a transformation R$^T$ is determined that moves dashed-line reference frame 1420a to dotted-line reference frame 1420b. Applying the reverse transformation −R$^T$ makes the dotted-line reference frame 1420b lie on top of dashed-line reference frame 1420a. Then the tracked object 1414 will be in the right place from the point of view of dashed-line reference frame 1420a. In determining the motion of object 1414, system 100A can determine its location and direction by computationally analyzing images captured by cameras 102, 104 and motion information captured by motion sensory control device 600. For example, an apparent position of any point on the object (in 3D space) at time $$t = t_1 : \begin{bmatrix} x \\ y \\ z \\ 1 \end{bmatrix},$$

can be converted to a real position of the point on the object at time $$t = t_1 : \begin{bmatrix} x' \\ y' \\ z' \\ 1 \end{bmatrix}$$

using an affine transform $$\begin{bmatrix} R_{ref} & T_{ref} \\ 0 & 1 \end{bmatrix}.$$

The correct location at time t=t$_1$ of a point on the tracked object with respect to device reference frame 1420a is given by equation (1):

$$\begin{bmatrix} R_{ref}^T & (-R_{ref}^T) * T_{ref} \\ 0 & 1 \end{bmatrix} * \begin{bmatrix} x \\ y \\ z \\ 1 \end{bmatrix} = \begin{bmatrix} x' \\ y' \\ z' \\ 1 \end{bmatrix} \quad (1)$$

Where:

R$_{ref}$—Represents an affine transform describing the transformation from the device reference frame 1420a to the device reference frame 1420b.

T$_{ref}$—Represents translation of the device reference frame 1420a to the device reference frame 1420b.

One conventional approach to obtaining the Affine transform R (from axis unit vector u=(u$_x$, u$_y$, u$_z$), rotation angle θ) method. Wikipedia, at http://en.wikipedia.org/wiki/Rotation_matrix, Rotation matrix from axis and angle, on Jan. 30, 2014, 20:12 UTC, upon which the computations equation (2) are at least in part inspired:

$$R = \begin{bmatrix} \cos\theta + u_x^2(1-\cos\theta) & u_x u_y(1-\cos\theta) - u_z\sin\theta & u_x u_z(1-\cos\theta) + u_y\sin\theta \\ u_y u_x(1-\cos\theta) + u_z\sin\theta & \cos\theta + u_y^2(1-\cos\theta) & u_y u_z(1-\cos\theta) - u_x\sin\theta \\ u_z u_x(1-\cos\theta) - u_y\sin\theta & u_z u_y(1-\cos\theta) + u_x\sin\theta & \cos\theta + u_z^2(1-\cos\theta) \end{bmatrix} \quad (2)$$

-continued $$R^T = \begin{bmatrix} \cos\theta + u_x^2(1-\cos\theta) & u_y u_x(1-\cos\theta) + u_z\sin\theta & u_z u_x(1-\cos\theta) - u_y\sin\theta \\ u_x u_y(1-\cos\theta) - u_z\sin\theta & \cos\theta + u_y^2(1-\cos\theta) & u_z u_y(1-\cos\theta) + u_x\sin\theta \\ u_x u_z(1-\cos\theta) + u_y\sin\theta & u_y u_z(1-\cos\theta) - u_x\sin\theta & \cos\theta + u_z^2(1-\cos\theta) \end{bmatrix}$$

$$-R^T = \begin{bmatrix} -\cos\theta - u_x^2(1-\cos\theta) & -u_y u_x(1-\cos\theta) - u_z\sin\theta & -u_z u_x(1-\cos\theta) + u_y\sin\theta \\ -u_x u_y(1-\cos\theta) + u_z\sin\theta & -\cos\theta - u_y^2(1-\cos\theta) & -u_z u_y(1-\cos\theta) - u_x\sin\theta \\ -u_x u_z(1-\cos\theta) - u_y\sin\theta & -u_y u_z(1-\cos\theta) + u_x\sin\theta & -\cos\theta - u_z^2(1-\cos\theta) \end{bmatrix}$$

$$T = \begin{bmatrix} a \\ b \\ c \end{bmatrix}$$

is a vector representing a translation of the object with respect to origin of the coordinate system of the translated frame $$-R^T * T = \begin{bmatrix} (-\cos\theta - u_x^2(1-\cos\theta))(a) + (-\cos\theta - u_y^2(1-\cos\theta))(b) + (-u_z u_x(1-\cos\theta) + u_y\sin\theta)(c) \\ (-u_x u_y(1-\cos\theta) + u_z\sin\theta)(a) + (-\cos\theta - u_y^2(1-\cos\theta))(b) + (-u_z u_y(1-\cos\theta) - u_x\sin\theta)(c) \\ (-u_x u_z(1-\cos\theta) - u_y\sin\theta)(a) + (-u_y u_z(1-\cos\theta) + u_x\sin\theta)(b) + (-\cos\theta - u_z^2(1-\cos\theta))(c) \end{bmatrix}$$

In another example, an apparent orientation and position of the object at time $t=t_1$: affine transform $$\begin{bmatrix} R_{obj} & T_{obj} \\ 0 & 1 \end{bmatrix},$$

can be converted to a real orientation and position of the object at time $$t = t_1 : \begin{bmatrix} R'_{obj} & T'_{obj} \\ 0 & 1 \end{bmatrix}$$

using a affine transform $$\begin{bmatrix} R_{ref} & T_{ref} \\ 0 & 1 \end{bmatrix}.$$

The correct orientation and position of the tracked object with respect to device reference frame at time $t=t_0$ (1420a) is given by equation (3):

$$\begin{bmatrix} R_{ref}^T & (-R_{ref}^T)*T_{ref} \\ 0 & 1 \end{bmatrix} * \begin{bmatrix} R_{obj} & T_{obj} \\ 0 & 1 \end{bmatrix} = \begin{bmatrix} R'_{obj} & T'_{obj} \\ 0 & 1 \end{bmatrix} \quad (3)$$

Where:
$R_{ref}$—Represents an affine transform describing the transformation from the device reference frame 1420a to the device reference frame 1420b.
$R_{obj}$—Represents an affine transform describing the rotation of the object with respect to the device reference frame 1420b.
$R'_{obj}$—Represents an affine transform describing the rotation of the object with respect to the device reference frame 1420a.
$T_{ref}$—Represents translation of the device reference frame 1420a to the device reference frame 1420b.
$T_{obj}$—Represents translation of the object with respect to the device reference frame 1420b.
$T'_{obj}$—Represents translation of the object with respect to the device reference frame 1420a.

In a yet further example, an apparent orientation and position of the object at time $t=t_1$: affine transform $$\begin{bmatrix} R_{obj} & T_{obj} \\ 0 & 1 \end{bmatrix},$$

can be converted to a real orientation and position of the object at time $$t = t_1 : \begin{bmatrix} R'_{obj} & T'_{obj} \\ 0 & 1 \end{bmatrix}$$

using an affine transform $$\begin{bmatrix} R_{ref} & T_{ref} \\ 0 & 1 \end{bmatrix}.$$

Furthermore, the position and orientation of the initial reference frame with respect to a (typically) fixed reference point in space can be determined using an affine transform $$\begin{bmatrix} R_{init} & T_{init} \\ 0 & 1 \end{bmatrix}.$$

The correct orientation and position of the tracked object with respect to device reference frame at time $t=t_0$ (1420a) is given by equation (4):

$$\begin{bmatrix} R_{init}^T & (-R_{init}^T)*T_{init} \\ 0 & 1 \end{bmatrix} \begin{bmatrix} R_{ref}^T & (-R_{ref}^T)*T_{ref} \\ 0 & 1 \end{bmatrix} * \begin{bmatrix} R_{obj} & T_{obj} \\ 0 & 1 \end{bmatrix} = \quad (4)$$

$$\begin{bmatrix} R'_{obj} & T'_{obj} \\ 0 & 1 \end{bmatrix}$$

Where:

$R_{init}$—Represents an affine transform describing the transformation from the world reference frame 1419 to the device reference frame 1420a.

$R_{ref}$—Represents an affine transform describing the transformation from the device reference frame 1420a to the device reference frame 1420b.

$R_{obj}$—Represents an affine transform describing the rotation of the object with respect to the device reference frame 1420b.

$R'_{obj}$—Represents an affine transform describing the rotation of the object with respect to the device reference frame 1420a.

$T_{init}$—Represents translation of the world reference frame 1419 to the device reference frame 1420a.

$T_{ref}$—Represents translation of the device reference frame 1420a to the device reference frame 1420b.

$T_{obj}$—Represents translation of the object with respect to the device reference frame 1420b.

$T'_{obj}$—Represents translation of the object with respect to the device reference frame 1420a.

Near-Field Communication

Figure 16:
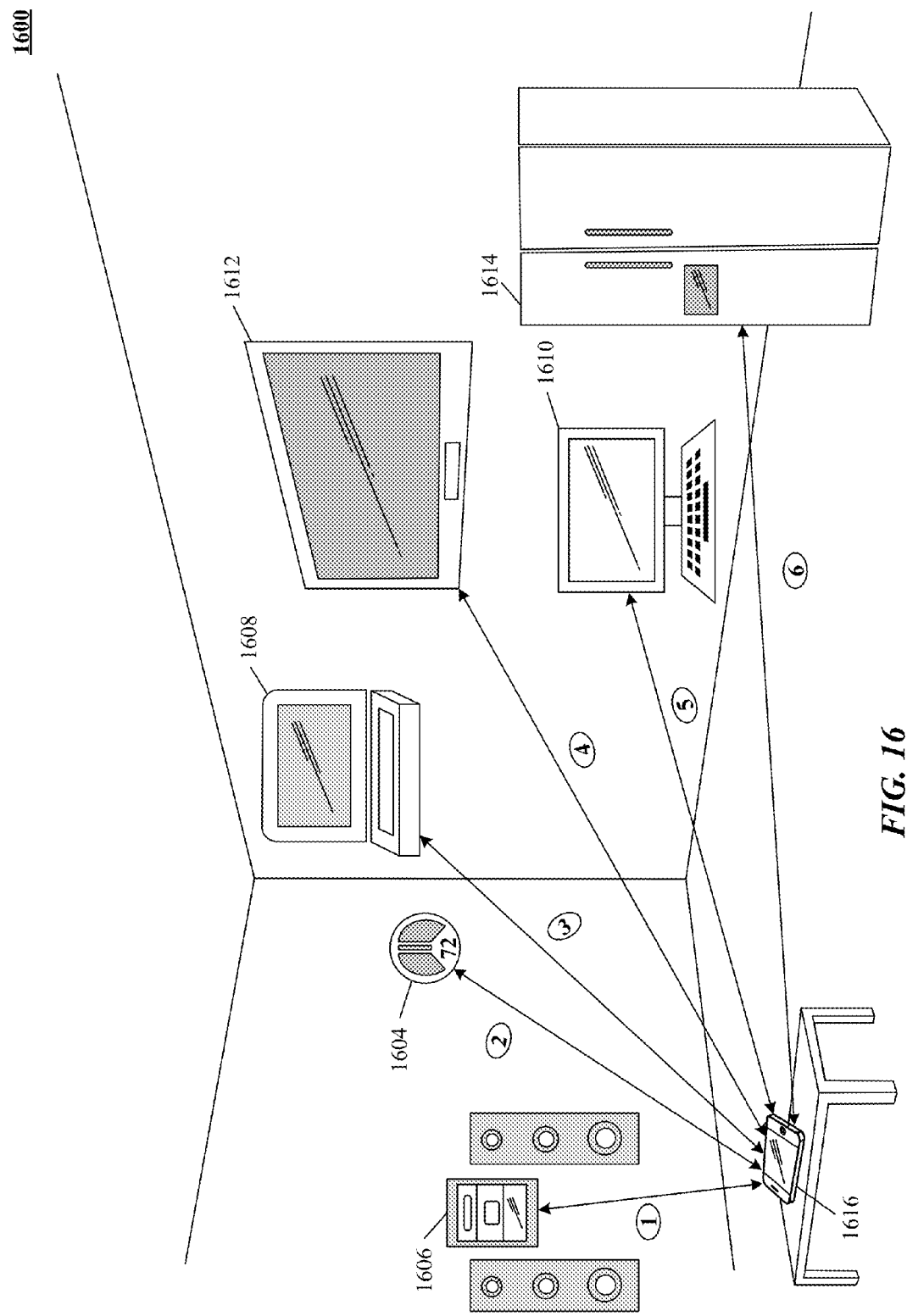
FIG. 16 shows one implementation of broadcasting device identity tokens from a plurality of heterogeneous appliances over an ultra-short-range communication channel in a pervasive computing environment.

FIG. 16 shows one implementation 1600 of broadcasting device identity tokens from the heterogeneous appliances over an ultra-short-range communication channel in a pervasive computing environment. In some implementations, the devices (1604, 1606, 1608, 1610, 1612, 1614) and smart phone 1616 can use near field communication (NFC) for ultra-short-range communication and replace the identification phase of the Bluetooth technology with a simple tap between the devices (1604, 1606, 1608, 1610, 1612, 1614) and smart phone 1616. In case of NFC, the devices (1604, 1606, 1608, 1610, 1612, 1614) and smart phone 1616 can include antennas that function as windings of a transformer to generate high power ultra-short-range RF signals for broadcasting device identity tokens (1, 2, 3, 4, 5, 6). In other implementations, a radio frequency identifier (RFID) or NFC identifier can be included in the device identity tokens (1, 2, 3, 4, 5, 6), which are transmitted by the devices (1604, 1606, 1608, 1610, 1612, 1614) to the smart phone 1616. The RFID or NFC identifier can be received or read by an RFID or NFC reader integrated in the smart phone 1616.

In some implementations, the devices (1604, 1606, 1608, 1610, 1612, 1614) and smart phone 1616 can participate in wireless local area network (WLAN) through Wi-Fi, via an access point (AP) that broadcasts a Wi-Fi signal usable over a medium-range area. In response to a media access control (MAC) address based address resolution protocol (ARP) scan initiated by devices (1604, 1606, 1608, 1610, 1612, 1614) and smart phone 1616, the AP can generate a list of devices connected to it along with their MAC address, names, format, Internet Protocol (IP), etc.

In some implementations, device identify tokens can be generated in the form of a barcode such as quick response (QR) code. The QR code can be stored in the smart phone 1616 in an electronic form and/or further printed/labeled/affixed. The QR code then can be scanned on a RFID reader or scanner appended to the devices (1604, 1606, 1608, 1610, 1612, 1614). In other implementations, the QR code can be a scan-able URL directing to a website or webpage address including information about the user-customized beverage formulation.

Short-range communication systems such as Bluetooth, Near Field Communication (NFC), RFID, Z-Wave, ZigBee, etc. can establish peer-to-peer (P2P) connection between the devices (1604, 1606, 1608, 1610, 1612, 1614) and the smart phone 1616 when they are in close physical proximity to each other. During a P2P connection, devices (1604, 1606, 1608, 1610, 1612, 1614) and smart phone 1616, when within transmission range of each other, broadcast device identity tokens. In P2P passive or connectionless mode, one of the devices can initiate the broadcast, and other can behave as a receiver without pairing. In P2P active mode, in which the devices are paired or have built a connection, both devices (1604, 1606, 1608, 1610, 1612, 1614) and smart phone 1616 can transmit and receive identity device identity tokens (1, 2, 3, 4, 5, 6).

WLAN, such as Wi-Fi, can connect the devices (1604, 1606, 1608, 1610, 1612, 1614) and smart phone 1616 to AP using medium range signals. During WLAN connection, devices (1604, 1606, 1608, 1610, 1612, 1614) and smart phone 1616 can operate in broadcast (connectionless) or connected modes. In a broadcast mode, broadcasting devices (1604, 1606, 1608, 1610, 1612, 1614) and smart phone 1616 connected to a shared AP can be presumed to be in close proximity. Tokens can, for instance, be broadcast to MAC address or to another MAC or IP address of a defined network segment scope. Broadcasting to a MAC address is supported by IPv4 and IEEE 802.11. In IPv6, multicasting takes the place of broadcasting. Tokens can be embedded in recognized broadcast message types. One example of a broadcast protocol is Internet Control Message Protocol, which is implemented in both IPv4 and IPv6. ICMP messages of various types could be used or a new type chosen from the reserved range of type codes. Another example of a broadcast protocol supported by IPv4 is the address resolution protocol (ARP). Query messages can be used to scan a WLAN segment. From responses to a query, a list of unique media access control (MAC) addresses of connected devices can be compiled. In IPv6, the neighborhood discovery protocol (NDP) specifies a variety of multicast message types that could be adapted for transmitting identity token information. When the devices (1604, 1606, 1608, 1610, 1612, 1614) and smart phone 1616 can broadcast ARP messages or device identity tokens (1, 2, 3, 4, 5, 6), the AP can forward the broadcasts to other connected devices. In some implementations, multiple APs covering a single location, such as a large meeting room, can be relay broadcasts as a group or can be treated as a single AP.

Figure 17:
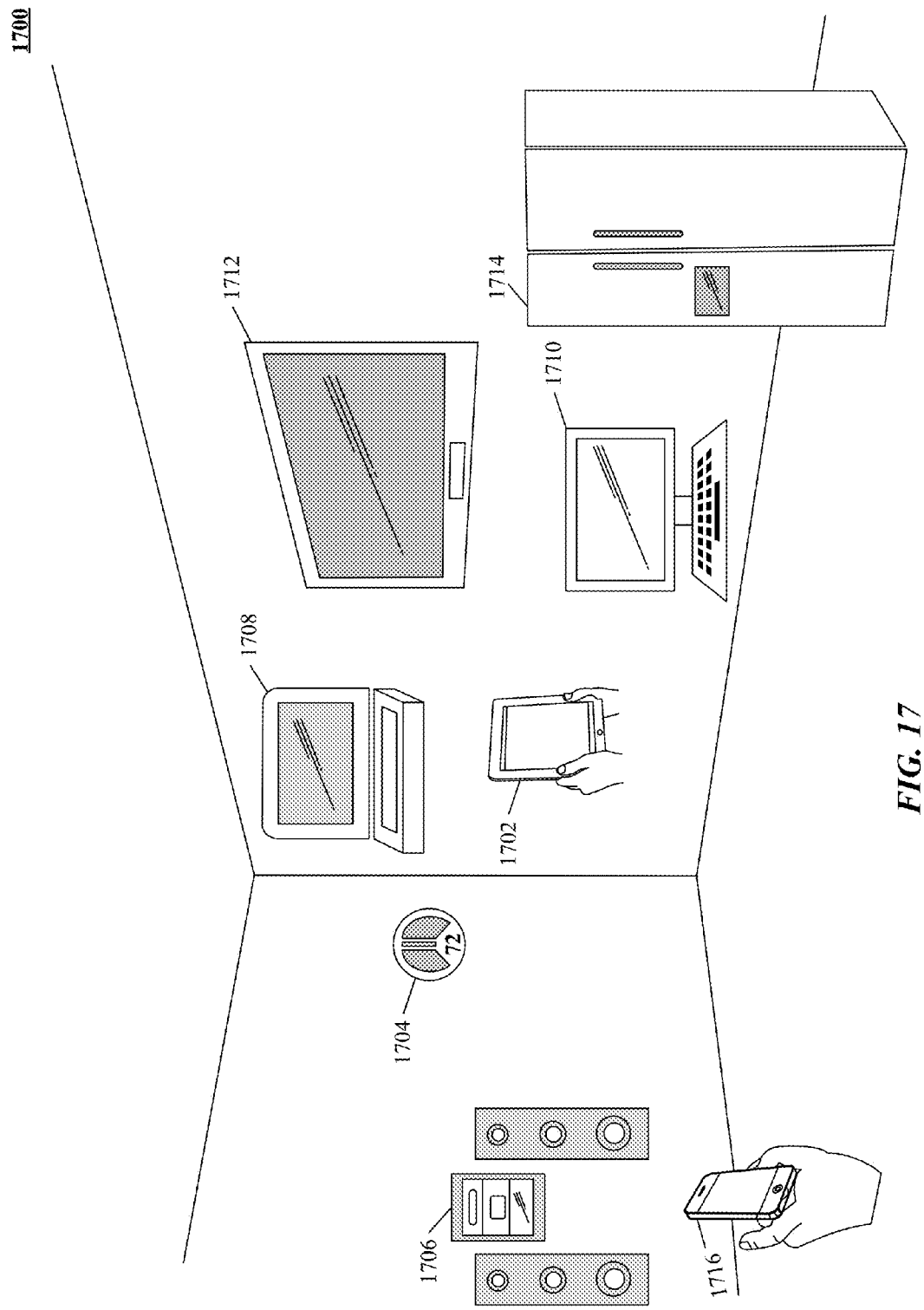
FIG. 17 illustrates one implementation of selection-by-pointing technique in a pervasive computing environment.

FIG. 17 illustrates one implementation of selection-by-pointing technique in a pervasive computing environment 1700. In one implementation, a device is automatically selected from among the heterogeneous devices (1702,

1704, 1706, 1708, 1710, 1712, 1714) by bringing a device in the field of view of a camera of smart phone 1716 or in line of sight of a user computing device like a tablet 1702.

Proximity-Based Selection

Figure 18:
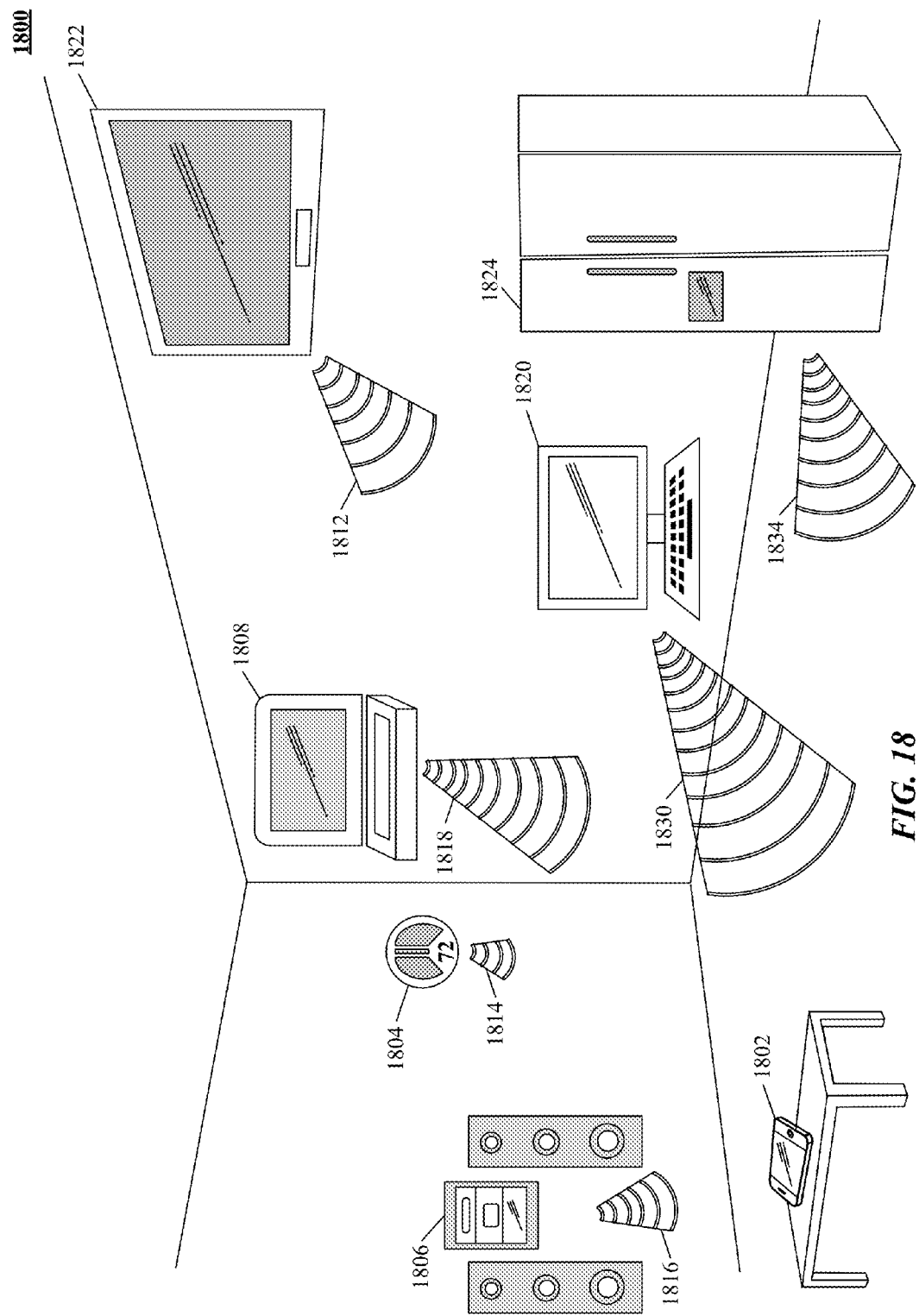
FIG. 18 shows one implementation of selecting a device from a plurality of devices in a pervasive computing environment based on level of proximity of the devices.

FIG. 18 shows one implementation of selecting a device in a pervasive computing environment 1800 based on level of proximity of the devices. In some implementations, a threshold or timeout limit can be set to help smart phone 1802 aggregate connection events resulting from successive reception of the same device identity token. In aggregated connection events resulting from reception of multiple device identity tokens, device identity tokens with higher counts, lengthier timestamps readings, or greater received signal strengths indications (RSSI) can indicate sustained and close proximity of two devices.

RSSI

In one implementation, the level of proximity is calculated based RSSI (1814, 1816, 1818, 1830, 1812, 1834) of the devices (1804, 1806, 1808, 1820, 1822, 1824). In some implementations, RSSI is measured based on the duration of transmission between the smart phone 1802 and devices (1804, 1806, 1808, 1820, 1822, 1824). In aggregated connection events resulting from reception of multiple device identity tokens, device identity tokens with higher counts or lengthier timestamps readings can indicate sustained and close proximity of two devices.

Aggregation can be performed on the smart phone 1802 and devices (1804, 1806, 1808, 1820, 1822, 1824), or both. For instance, the smart phone 1802 and devices (1804, 1806, 1808, 1820, 1822, 1824) can aggregate received device identity tokens to determine timestamp duration. In some implementations, failure to receive a device identity token from a broadcasting device within a pre-set time window can cause the receiving device to close and summarize a connection event. After a timeout duration without receiving further device identity tokens, the smart phone 1802 and devices (1804, 1806, 1808, 1820, 1822, 1824) can store in memory the batch of collected device identity tokens and associated metadata including timestamp durations and RSSI value. The smart phone 1802 and devices (1804, 1806, 1808, 1820, 1822, 1824) can indicate the quality of a transmission as "strong" or "average" based on the number of collected device identity tokens and the associated metadata values. The quality of a broadcast can indicate close proximity of the broadcasting device and be used to calculate a level of proximity.

Positional Information

Figure 19:
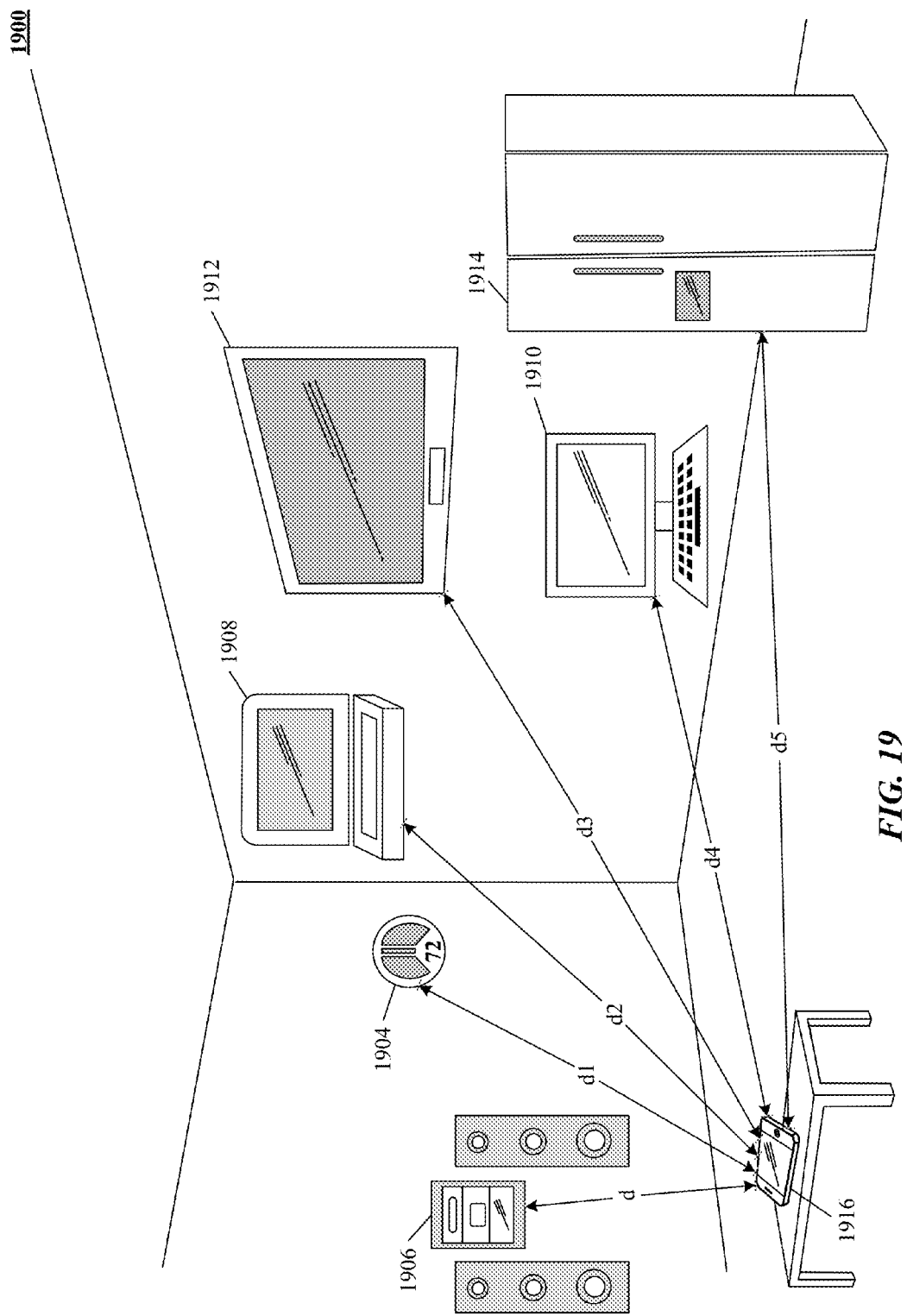
FIG. 19 depicts one implementation of selecting a device from a plurality of devices in a pervasive computing environment based on positional information of the devices.

FIG. 19 depicts one implementation of selecting a device in a pervasive computing environment 1900 based on positional information of the devices. The location information of smart phone 1916 and devices (1904, 1906, 1908, 1912, 1910, 1914) can be used to determine a level of proximity between them, according to some implementations. In some implementations, a location data transceiver and a network adapter, coupled to a respective processors running on the smart phone 1916 and devices (1904, 1906, 1908, 1912, 1910, 1914), can generate the corresponding location data (d, d1, d2, d3, d4, d5). In some implementations, this location data can be calculated using real-time GPS or GNSS reporting.

In some implementations, when the smart phone 1916 is within the transmission range of the devices (1904, 1906, 1908, 1912, 1910, 1914), a physical proximity event can be automatically created and stored in the memory unit of smart phone 1916. The creation of the physical proximity event can trigger when the location of smart phone 1916 matches the location of the devices (1904, 1906, 1908, 1912, 1910, 1914). In other implementations, it can be created upon initiation of peer-to-peer communication between the smart phone 1916 and devices (1904, 1906, 1908, 1912, 1910, 1914).

In one implementation, positional information of the devices (1904, 1906, 1908, 1912, 1910, 1914) is determined by conducting scanning of the pervasive computing environment 1900 with an emission from a transmission area according to an ordered scan pattern. Scans may be continuous or discontiguous. The emission can be received to form a signal based upon at least one salient property (e.g., intensity, amplitude, frequency, polarization, phase, or other detectable feature) of the emission varying with time at the devices (1904, 1906, 1908, 1912, 1910, 1914). Synchronization information (e.g., a particular angle of a sum emission at a known point in space at a known time as seen from the emitter) about the ordered scan pattern can be derived from a source (e.g., the emission itself, a component of the emission (i.e., sub-channel, etc.), a second signal broadcast separately, social media share, others, or and/or combinations thereof). A correspondence between at least one characteristic of the signal and the synchronization information can be established. Positional information can be determined based at least in part upon the correspondence.

In one implementation, the correspondence is established by determining that some signal characteristic (e.g., a double peak in an Intensity vs. time signal) corresponds to a synch "chirp" (i.e., a nearest synch max to nearest synch chirp gives some number between 0-360 degrees)).

In another implementation, positional information is derived by translating the correspondence (e.g., some degrees from 0-360) into an angular position about the emitter.

In some implementations, one or more emitters in the pervasive computing environment 1900 can be selectively powered on (e.g. one-at-a-time, in groups, sequentially or according to some pattern), pulsed, cross-faded, or any combination thereof to advantageously "scan" the pervasive computing environment 1900. A scan may comprise a digital pulsing, a continuous variation of amplitude or intensity, or any combination thereof. A scan can include an ordering such that different areas in the field of interest receive characteristic emission from the transmission area corresponding to the ordering of the scan pattern. In one implementation, an ordering of emissions in an ordered scan pattern reflects "timing", which may comprise but is not necessarily limited to the time in which certain emissions take place. Receivers in proximity to the object of interest capture the emission (e.g. radio antennas, microphones, photodiodes, CCD array and/or CMOS array and/or other types of devices capable of converting a salient feature of the received emission over time into current or voltage and/or combinations thereof) as a signal over time. A synchronization method can be used to obtain information about the timing of the ordered scan pattern. A mechanism in hardware or software can be used to compare the timing information to the signal over time and extract positional information.

Converting Gesturally Unresponsive Devices to be Gesturally Responsive

Traditionally, users have interacted with electronic devices (such as a computer or a television) or computing applications (such as computer games, multimedia applications, or office applications) via indirect input devices, including, for example, keyboards, joysticks, or remote controllers. The user manipulates the input devices to perform a particular operation, such as selecting a specific entry from a menu of operations. Modern input devices, however, include multiple buttons, often in a complex configuration, to facilitate communication of user commands to the electronic devices or computing applications; correct operation of these input devices is often challenging to the user. Additionally, actions performed on an input device generally do not correspond in any intuitive sense to the resulting changes on, for example, a screen display controlled by the device. Input devices can also be lost, and the frequent experience of searching for misplaced devices has become a frustrating staple of modern life.

Touch screens implemented directly on user-controlled devices have obviated the need for separate input devices. A touch screen detects the presence and location of a "touch" performed by a user's finger or other object on the display screen, enabling the user to enter a desired input by simply touching the proper area of a screen. While suitable for small display devices such as tablets and wireless phones, touch screens are impractical for large entertainment devices that the user views from a distance. Particularly for games implemented on such devices, electronics manufacturers have developed systems that detect a user's movements or gestures and cause the display to respond in a contextually relevant manner. The user's gestures can be detected using an optical imaging system, and are characterized and interpreted by suitable computational resources. For example, a user near a TV can perform a sliding hand gesture, which is detected by the gesture-recognition system; in response to the detected gesture, the TV can activate and display a control panel on the screen, allowing the user to make selections thereon using subsequent gestures; for example, the user can move her hand in an "up" or "down" direction, which, again, is detected and interpreted to facilitate channel selection.

While these gesture-recognition systems have generated substantial consumer excitement, the user accustomed to traditional input devices must forgo familiar patterns of interactivity in favor of a new mode with its own "vocabulary" of command and response. Indeed, gesture vocabularies can vary from system to system. Particularly for traditional applications—such as web browsers and word processors, whose operation depends heavily on familiar controllers—consumer resistance to adopting gesture-based control can be substantial.

Consequently, there is a need for a gesture-recognition system that responds in ways similar to the behavior of conventional control devices, and ideally which is responsive to user perceptions of what constitutes similarity.

The technology disclosed relates to gesturally interacting with devices that lack gestural responsiveness using a smart phone equipped with a motion sensory control device. It also relates to controlling a display using gestures. In particular, it relates to detecting a standard input device that causes on-screen actions on a display in response to control manipulations performed using the standard input device. Further, a library of analogous gestures is identified, which includes gestures that are analogous to the control manipulations and also cause the on-screen actions responsive to the control manipulations. Thus, when a gesture from the library of analogous gestures is detected, a signal is generated that mimics a standard signal from the standard input device and causes at least one on-screen action.

Implementations of the technology disclosed also relate to methods and systems that recognize gestures and cause on-screen behaviors that mimic, at an intuitive level, the behavior of a traditional input device. Recognizing that different individuals can equate different gestures to traditional input-device manipulations, implementations of the technology disclosed ideally (although not necessarily) permit the user to define these gestures and the associated actions taken. Implementations in accordance herewith can detect the presence of a conventional input device either visually, through object recognition, or by querying the operating system to determine what devices are connected. This determination drives the gestural control paradigm—i.e., the actions taken or rule(s) responsively followed based on observed motion within a monitored space, and which generally relates gestures to manipulation of displayed screen contents. The gestural control paradigm can also be based on the currently active application. For example, if the user is playing a game developed specifically for gestural interactivity, the presence of a mouse will be ignored; but if the user is browsing the web, a mouse-like control paradigm can be followed.

Thus, implementations of the technology disclosed can, in effect, "get between" a device driver and the display. A user working with a word-processing program, for example, would expect to see a cursor and a control arrow on the screen. Implementations of the technology disclosed, sensing the presence of a mouse and use of the word processor, can load a gesture control paradigm that retains the on-screen presence of the cursor and the control arrow and relates user gestures to mouse operations. In some implementations, the user can define the gesture vocabulary—selecting, for example, the gesture that will correspond to a mouse left-click, right-click, etc. The system can also permit the user to turn off gesture recognition and release control back to the mouse driver. Similarly, the system can respond to an intentional gesture to override an input-device driver with gesture recognition.

In some implementations, a replica or other representation of (or based on) the user's hand can be inserted into the display, either as a substitute for conventional control graphics or to augment them. For example, a replica of the user's hand can substitute for the traditional hand icon used in ADOBE and other applications, and behave (in terms of on-screen actions caused by grabbing, moving, etc.) in a similar way. Alternatively, the hand replica can "stick" to a traditional icon, such as an arrow or cursor, which is moved on the screen to follow the user's hand movements in space—in effect, the user's spatial hand movements replace corresponding movements of a conventional mouse. In some implementations, the replica hand displayed on the screen conforms and/or moves in real time to track the conformations and/or movements of the user's hand detected by the sensory device.

In another example, in a pervasive computing environment that includes traditional devices that lack gestural responsiveness like a presentation television in a conference room, a smart phone equipped with a motion sensory control device can be used to receive gestural commands from a user and forward the motion and sensory data from the smart phone to the presentation television, as described below.

Figure 20:
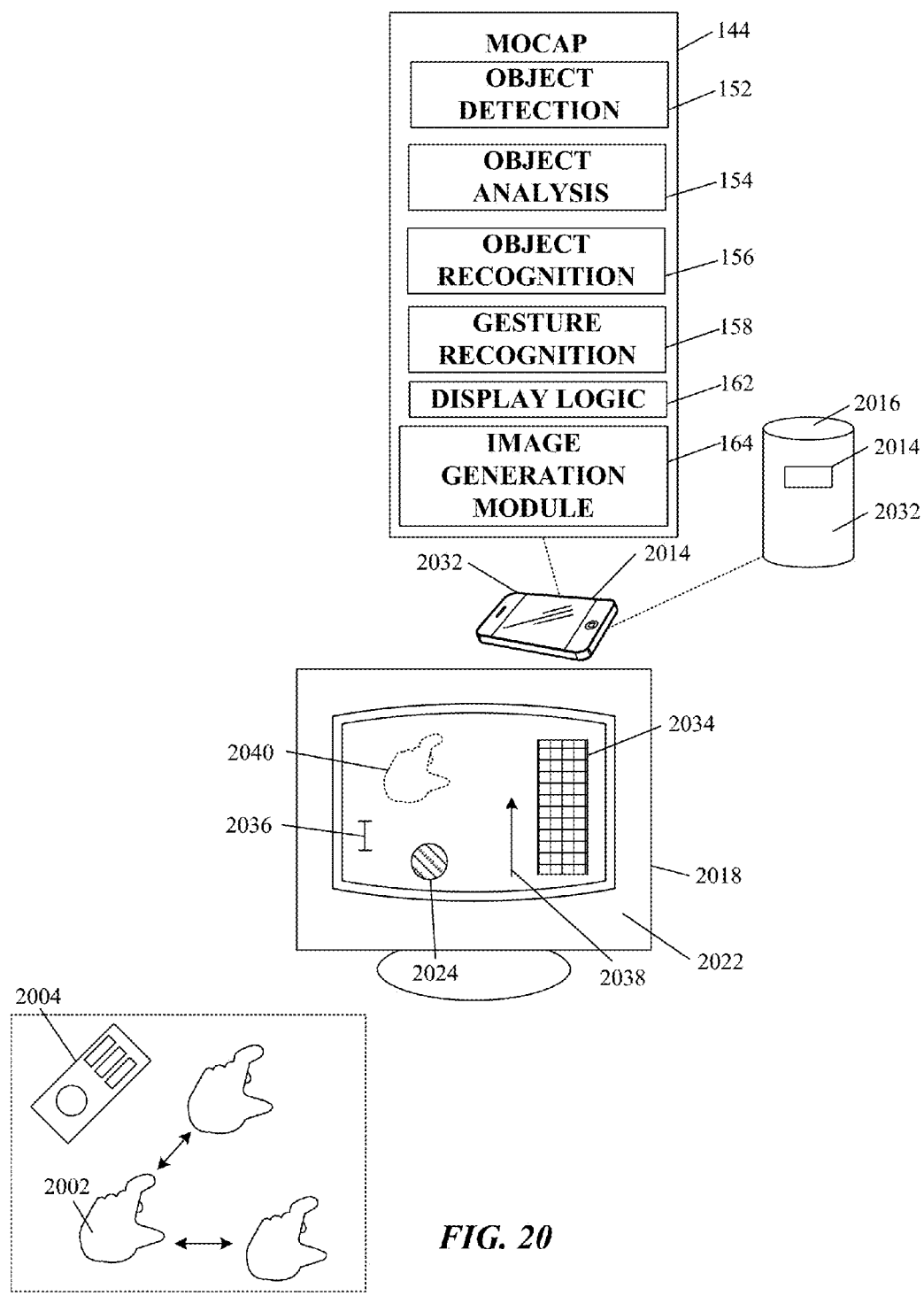
FIG. 20 illustrates one implementation of gesturally interacting with devices that lack gestural responsiveness.

FIG. 20 illustrates one implementation 2000 of gesturally interacting with devices that lack gestural responsiveness. Referring to FIG. 20, in operation, the sensory-analysis system 106 operates cameras 102, 104 to capture at least one image in the field of view 112. The image can contain the object 114, which can be a user's body part 2002 and/or an input device 2004 (such as a remote controller, a keyboard, or a PC mouse). In some implementations, the object detection module 152 analyzes the captured image to detect edges of an object therein and/or other information about the object's location; subsequently, the object/path analysis module 154 analyzes the object information provided by the object detection module 152 to determine the 3D shape, size and/or position of the object. The object/gesture-recognition module 156 can compare the detected object 114 to reference images or object templates electronically stored in an object database 2014 using conventional comparison algorithms (such as database lookup). (As used herein, the term "electronically stored" includes storage in volatile or non-volatile storage, the latter including disks, Flash memory, etc., and extends to any computationally addressable storage media (including, for example, optical storage).) The object database 2014 can be implemented, for example, in the memory 134, a mass-storage device of the system 100B or on an external storage system 2016.

In one implementation, upon matching the detected object 114 to an object template in the database 2014, the object/gesture-recognition module 156 reports the match to display logic 162. An initial task performed by a display logic is obtaining an inventory of input devices associated with the system to be controlled—either system 100B or, if system 100B is itself used to provide input to a separate device 2018, such as a game console, a "smart" television or a computer, then to that device; hereafter the device that will respond to user gestures is generically referred to as the "controlled device." Display logic obtains this inventory this by querying operating system to determine what input devices are currently connected to the controlled system; by determining whether any of the objects identified and reported by object/gesture-recognition module 156 is an input device; or both. For example, if an input device connected to the controlled system is outside the field of view 112, display logic can ignore it.

Object/gesture-recognition module 156 can be responsive to object detection module 152 and evaluate movements only of objects whose movements are likely to be intended as gestures—e.g., the dominant object within the field of view 112, the first detected object to move, an object recognized as a user's hand 2002, finger, etc. Once a gesture-producing object is identified, it can be followed by object/gesture-recognition module 156 through a series of temporally sequential images captured by the cameras 102, 104 in order to recognize gestures. As discussed in greater detail below, detected gestures are used to control an application running on the controlled system. The object/gesture-recognition module 156 can be utilized in conjunction with algorithms based on 3D models (i.e., volumetric or skeletal models), simplified skeletal models that use a simplified representation of the human body or gesture-relevant body parts, or image-based models based on, for example, deformable templates of gesture-relevant body parts. For additional background information regarding visual hand gesture recognition, reference can be made to, e.g., Wu et al., "Vision-Based Gesture Recognition: A Review," in Gesture-Based Communication in Human-Computer Interaction (Springer 1999); Pavlovic et al., "Visual Interpretation of Hand Gestures for Human-Computer Interaction: A Review," IEEE Trans. Pattern Analysis and Machine Intelligence (19(7):677-695, July 1997). Image analysis, including object detection, object analysis, and object recognition in 3D space and in real time can be performed using a conventional approach or an approach specialized to the application (see, e.g., U.S. Ser. No. 13/742,953, filed on Jan. 16, 2013, the entire disclosure of which is hereby incorporated by reference).

Thus, object/gesture-recognition module 156 identifies the user's gesture by comparing the detected gesture to a library of gestures in database 2032, which, again, can be implemented in the sensory-analysis system 106, the electronic device 2018, or on an external storage system 2016. For example, gestures can be stored as vectors, i.e., mathematically specified spatial trajectories, and the gesture record can have a field specifying the relevant part of the user's body making the gesture; thus, similar trajectories executed by a user's hand and head can be stored in the database 2032 as different gestures, so that an application can interpret them differently. Typically, the trajectory of a sensed gesture is mathematically compared against the stored trajectories to find a best match, and the gesture is recognized as corresponding to the located database entry only if the degree of match exceeds a threshold. The vector can be scaled so that, for example, large and small arcs traced by a user's hand will be recognized as the same gesture (i.e., corresponding to the same database record) but the gesture recognition module will return both the identity and a value, reflecting the scaling, for the gesture. The scale can correspond to an actual gesture distance traversed in performance of the gesture, or can be normalized to some canonical distance.

Although gestures can be used for many control and rendering purposes, the present discussion is concerned primarily with their use in controlling actions taken on the screen 2022 of, e.g., a controlled device 2018. In particular, object/gesture-recognition module 156 contains records relating template gestures to actions performed by all active input devices identified by display logic (or at least the display devices within the field of view 112). For example, suppose that an identified object 2004 is a conventional PC mouse connected to the controlled system 2018. The driver associated with the mouse 2004 supports right-click, right-double-click, and left-click commands, among others. Accordingly, object/gesture-recognition module 156 ensures that database 2032 contains stored records corresponding to these commands—i.e., for each command, a record containing (i) a gesture template corresponding to the command and (ii) bits encoding an output signal (e.g., a pulse sequence) duplicating the command signal that the mouse 2004 would produce. If such records are found, display logic can determine whether these gestures will override the mouse driver, as discussed below. If no corresponding records are found, then the user will be prompted to perform gestures and relate them to mouse functions. In particular, object/gesture-recognition module 156 can cause a control panel 2034 to be rendered on the screen 2022. The control panel 2034 shows a table listing the commands associated with the mouse driver. The user sequentially selects one of the entries and assigns a gesture to it. In one implementation, the user makes the selection by gesture—e.g., moving her hand vertically in the monitored space 112 until the desired entry in the (vertical) list is highlighted, and then gesturing as if pressing a button. Object/gesture-recognition module 156 correlates the height of the user's hand to one of the displayed entries, which it highlights on screen 2022 and further recognizes the selection gesture. Alternatively, the user can make the selection using mouse 2004 or a keyboard.

Once an entry is selected, the user signals the system 100B that she is about to perform the gesture she wishes to associate with the selected command. This signal can be, for example, a voice command ("Start") or a keystroke. Alternatively, object/gesture-recognition module 156 can cause the screen 2022 to display a countdown graphic ("3 . . . 2 . . . 1 . . . GO!"). Following the user's signal or at the end of the countdown, the user's gesture is recorded by the cameras 102, 104 and the image frames corresponding thereto are stored frame buffers (in sensor interface 136 or in memory 134). The user can signal completion of the gesture by voice command ("Done") or simply by momentarily freezing her action, which is sensed by object/gesture-recognition module 156, or by any other suitable action. The frame buffers captured during the time period of gesture performance are analyzed by object/gesture-recognition module 156 and converted to a gesture template for storage in the gesture database 2032. In some implementations, the gesture is vectorized as discussed above and stored as a vector in (or linked to) the associated record in database 2032.

It should be stressed that, although the process of defining gestures and associating them with commands has been discussed with respect to input-device commands, the approach is applicable to any type of gesture used for any purpose. For example, if the object/gesture-recognition module 156 is implemented as part of a specific application (such as a game or controller logic for a television), the database gesture record can inherit attributes (such as a scaling value or mapping parameters) specific to that application. Otherwise, when an application invokes the object/gesture-recognition module 156, it interprets the identified gesture in accordance with its own programming, and can permit the user to modify the default library of gestures as outlined above.

In some implementations, the conventional control icons (e.g., a cursor 2036 and/or an arrow 2038, and/or a circle 2024) are retained on the screen in the usual fashion. In other implementations, image generation module 164 generates an image 2040 (e.g., of the user's hand) that will either supplement or replace the conventional icons as described below. Image generation module 164 can be a conventional rendering program that utilizes the gesturing object directly or indirectly as the basis for the image 2040. For example, image generation module 164 can utilize the hand 2002 detected by object detection module 152 and simply extract the corresponding pixels from the associated image frames, resampling the pixels so the hand image is appropriately sized for display—e.g., so that the size of the rendered image 2040 is comparable to the size of the conventional icon. Indeed, the rendered hand can exactly match in size the conventional on-screen hand icon, so that the squeezing and dragging commands already associated with the hand icon (and typically affected with a mouse) can be gestured by the user.

Alternatively, an image generation module can utilize more complex mappings in rendering an image based on the user's gestures. A detected object or body part can be mapped to virtually any image in accordance with conventional graphics techniques, e.g., affine mapping. A user's hand, in other words, can be rendered as an animal's paw, a cartoon character or other image whose on-screen appearance varies in response to the changing orientation and configuration of the user's hand in accordance with the mapping.

Individual Identification

In one implementation, a method of providing biometric information about an individual being identified by tracking hands (or other body portions, alone or in conjunction with tools) using a sensory machine control system includes capturing sensory information for a human body portion within a field of interest. A tracking model and biometric model are determined from the sensory information by analyzing images, alone or in conjunction with non-imaging sensory information, to yield 3D information suitable for defining a capsule model of the subject being imaged. The 3D information is associated to one or more capsules in a model. The capsule model is aligned (rigidly, non-rigidly, or combinations thereof) with the 3D information. Information from the model is abstracted to detect a variance and/or a state of the subject being imaged. From the variance and/or state, information about the subject being imaged in the 3D sensory space is obtained and interpreted to provide biometric information about an individual being identified. Biometric information can be used to identify individuals in a scene.

Some implementations will authenticate individuals based upon the biometric information developed. A command is determined from recognizing a gesture indicated by variation in the tracking model over time and the biometric model is compared to known users' biometric information. When the biometric model corresponds to biometric information of a known user, an authorized command is communicated to a system under control. Authorized commands enable users to login to machines and/or systems, to effect transactions, invoke features/functionality, and/or exchange information.

A biometric model can be determined by analyzing image(s) to determine an image characteristic (e.g., intensity, brightness, color, other characteristics, combinations thereof) and determining a property (e.g., rate of change, maximal, minimal, average or other statistical properties, combinations thereof, and so forth) for the image characteristic. The property can be analyzed to determine changes in the property indicating biometric features corresponding to points of interest in the image. For example, a Hessian can be computed for points in the image, the Hessian indicating how the brightness (or other characteristic) is changing. The biometric features can be transformed based at least in part upon orientation/rotation/translation information to form normalized biometric features. A biometric profile set can be built from one or more identified biometric features; and a biometric model built for an individual from one or more biometric profile set(s).

Additional commands, if any, can be verified by recognizing a second gesture indicated by variation in the tracking model and comparing biometric information of the hand captured during the second gesture with biometric information of the hand captured previously to verify continuity; e.g., determine that the user has not changed. In the event that the biometric information of the hand captured during the second gesture does not correspond to biometric information of the hand captured previously, command information associated with the second gesture can be discarded.

Commands authorization can include determining from profile information stored for the known users, whether an authenticated user having the biometric profile is in a role (e.g., system administrator, developer, manager, and so forth) authorized to issue the command determined from tracking the user's hand (or other body) activity. If the user is determined to be authorized to issue the command based at least in part upon the role, the authorized command is communicated to a system being controlled.

Advantageously, some implementations can enable authorized commands to be issued responsive to gesture recognition for use in smart phones or other devices based upon authorized use. This capability allows the user to "self-authenticate" while executing intuitive gestures to command a device. Implementations can enable gesture detection, user identification, user authorization, and other machine control and/or machine communications applications in smart phones.

User Disambiguation

Figure 21A:
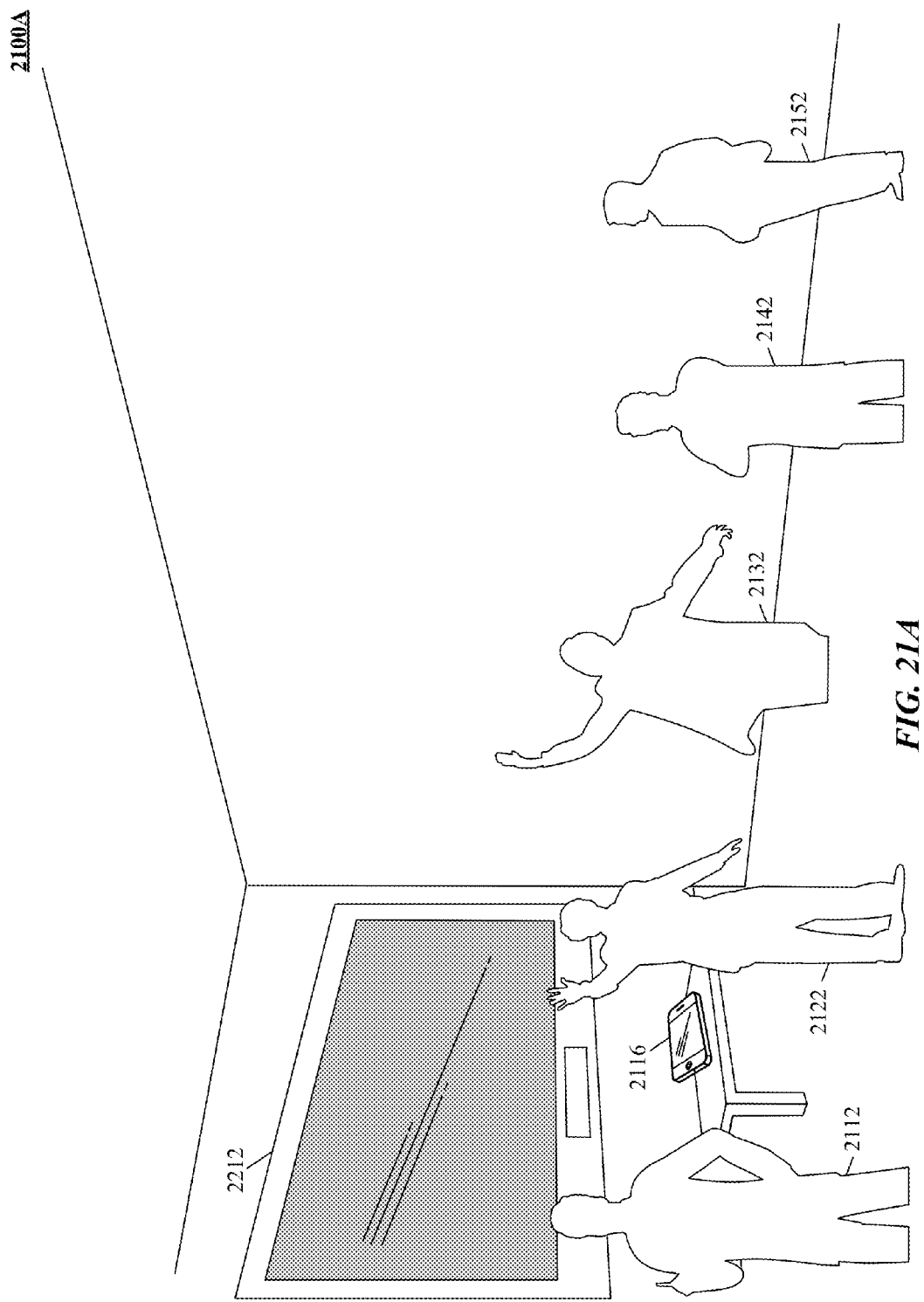
FIGS. 21A, 21B, and 21C show one implementation of distinguishing between users issuing gestural commands in a pervasive three dimensional (3D) sensory environment.
Figure 21B:
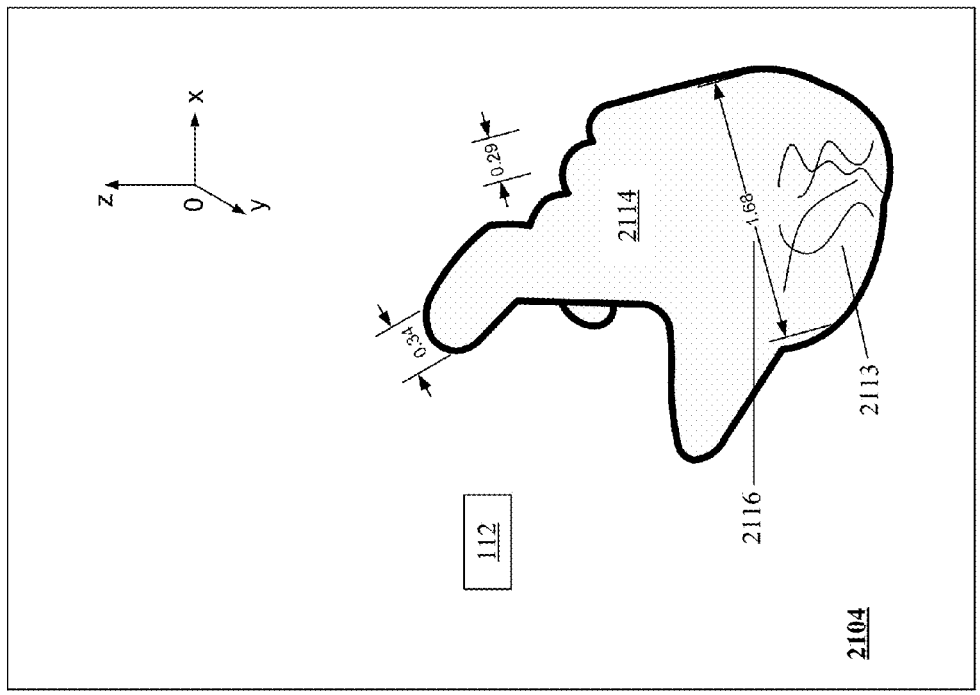
Figure 21B:
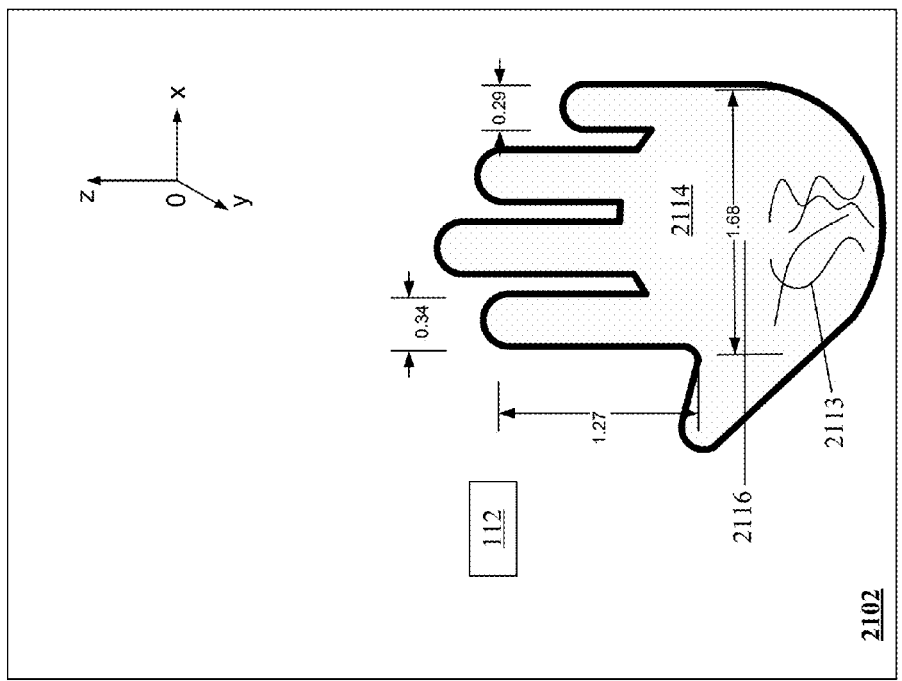
Figure 21C:
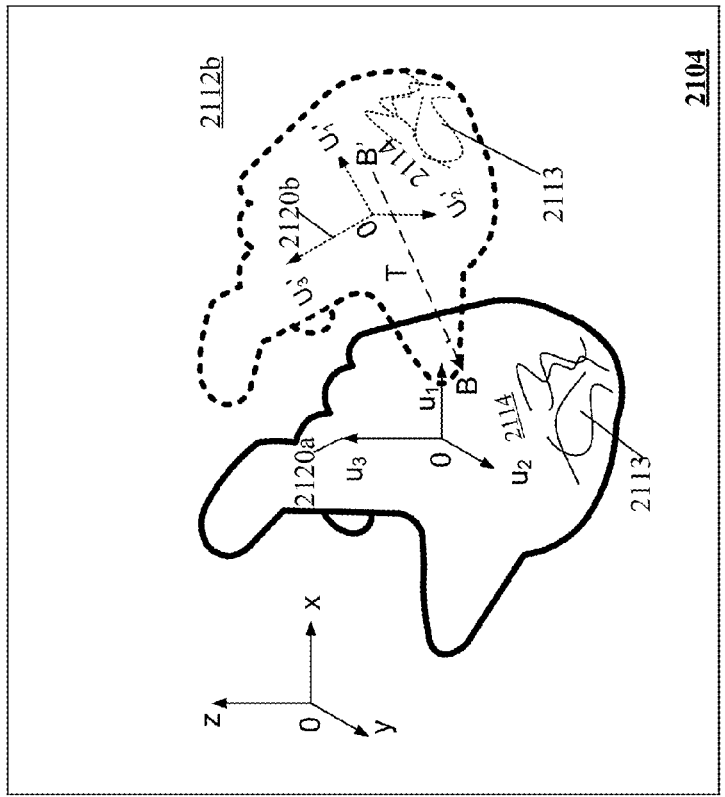

FIGS. 21A, 21B, and 21C show one implementation distinguishing between users issuing gestural commands in a pervasive three dimensional (3D) sensory environment 2100A. In one implementation, a dominant user can be identified in the pervasive three dimensional (3D) sensory environment 2100A that includes multiple users (2112, 2122, 2132, 2142, 2152) such that gestures performed by the dominant user are interpreted by the smart phone 2116 equipped with motion sensory control device and used to control responsiveness of a shared workspace like a presentation television 2212 in a conference room. In some implementations, the dominant user can be identified based on spatial behaviors of the users exhibited in the pervasive three dimensional (3D) sensory environment 2100A. In one example, certain postures of the users (pointed fingers, raised hands, high pitched voices) can be indicative of dominant users like speakers or presenter, while others (folded arms, intermittent voice registries) can be indicative of non-dominant users like listeners or audience members.

FIG. 21B illustrates training a smart phone equipped with a motion sensory control device 600 to recognize a user by biometric features identified from a portion of the user's body and recognizing the user by comparing a biometric profile set built from the user's biometric features with previously recognized biometric features of the user in accordance with the technology disclosed. FIG. 21B shows two views 2102, 2104 of hand 2114 within region of interest 112 of device 600 at two different times, training time $t_0$ (2102), and authentication time $t_1$ (2104), which can be moments or months apart. Further, views 2102, 2104 can be at different device 600 instances, which can be coupled to share data by a network or the like. In other words, a user might train a first device 600 instance to recognize the user's hand 2114 in block 2102, and subsequently authenticate at a second device 700A instance in block 2104. As shown in block 2102, at an initial training time $t_0$, hand 2114 is in a particular position and configuration in region of interest 112. Block 2102 illustrates a representative pose of a particular user's hand 2114 during a learning phase in which biometric features of the hand 2114 visible to cameras 102, 104 are identified by system 100A and used to build a biometric model based upon one or more biometric feature(s) of the user hand 2114. During training, a user's hand can adopt a variety of poses, e.g., palm facing camera(s), palm facing away from camera(s), and so forth, however only one training pose is shown in block 2102 for clarity sake. The user can be prompted to assume various hand poses and at various locations and distances relative to device 600. Device 600 captures one or more images of objects 2114 (hands) in a particular pose(s) present within region of interest 112. From images of the hand 2114, one or more biometric features (e.g., vein patterns 2113, measurements 2116 across the palm or at other specific locations, palm prints or patterns, complexion, body temperature indicated by visual cues, other individual specific features and any combination thereof) visible to cameras 102, 104 are identified based upon one or more image characteristics. One or more identified biometric features useful to identify hand 2114 comprise a biometric profile set. A biometric model specific to an individual can be built from one or more biometric profile sets, e.g., a first profile set of biometric features for a palm view of the individual's hand, a second profile set of features for a backhand view of the individual's hand, and so forth. Additionally, biometric models can comprise non-visible biometric features determined for an individual using other sources 108, 110 alone, or in conjunction with cameras 102, 104.

Now again with reference to FIG. 21B, in block 2104, the user's hand 2114 is captured during authentication at authentication time $t_1$. Certain biometric features 2113, 2116 (vein patterns, palm prints, fingerprints, other features, combinations thereof) can provide useful biometric features for authentication. During authentication, device 700A captures one or more images of hand 2114 being authenticated. Characteristics of the image are analyzed with respect to one or more properties to determine biometric features. The biometric features from the hand 2114 under authentication are compared with normalized biometric features of one or more biometric profiles built for the user during training in block 2102. Biometric features are normalized (e.g., compensated for rotation, translate, and depth) using for example technique(s) like those discussed with reference to FIG. 21C below, since the user's hand 2114 is not in the same pose (and may not even be viewed by the same device 600) at authentication time $t_1$ as it was during training time $t_0$. Accordingly, the apparent position of biometric features 2113, 2116 in the region of interest 112 in block 2104 will change from the apparent position of the biometric features 2113, 2116 in region of interest 112 in block 2102. Thus, apparent differences in the biometric features 2113, 2116 due to the change in position of the hand 2114 relative to the device 600, and/or differences in construction between various implementations of device 600, are taken into account by normalizing biometric features during authentication to enable device 600 to identify hand 2114 in the pose of block 2104 as being the hand 2114 trained in the pose of block 2102 using a process like that described below with reference to FIG. 21C.

Now with reference to FIG. 21C, which illustrates acquisition of one or more normalized biometric features by the device 600 during training and comparison of biometric features captured from a subject hand being authenticated. During acquiring of biometric features to build a biometric profile set, as shown by block 2102, field of view 2112a presented to device 600 at training time $t_0$ includes hand 2114 which is to be biometrically modeled. At training time $t_0$, the biometric features 2113, 2116 (e.g., of hand 2114) are determined with respect to model reference frame 2120a e.g., by processing image data from cameras 102, 104 viewing hand 2114. Biometric profile sets comprising one or more biometric features normalized to model reference frame 2120a are built from the biometric features. A biometric model of the user can be constructed based upon one or more biometric profile sets.

When comparing biometric features from a captured pose of a hand 2114 to be authenticated, as shown by block 2104, at authentication time $t_1$, field of view 2112b presented by device 600 at authentication time $t_1$ includes hand 2114 in a new apparent position. Not only is the hand 2114 in a different position when authenticated vs. when taught, it is likely that the hand 2114 is authenticated at a different installation of device 600 at a different location when using the device 600 from when characteristics of the hand 2114 were originally taught to one of the device 600 installations. Accordingly, the reference frame 2120b of the hand as captured during authentication will have moved from an original or starting hand reference frame 2120a as described by a transformation $R^T$. It is noteworthy that application of the transformation $R^T$ enables the hand 2114 to be compared and/or recognized when rotated as well as translated relative to a taught pose of hand 2114. Implementations can provide transforming the position and rotation of reference frame 2120b with respect to reference frame 2120a and therefore, transforming the position and rotation of tracked subject 2113 with respect to 2120b, at authentication time $t_1$. Implementations can determine the position and rotation of tracked subject 2113 with respect to 2120a from the transformed position and rotation of reference frame 2120b with respect to reference frame 2120a and the transformed position and rotation of tracked subject 2113 with respect to 2120b.

In an implementation, a transformation $R^T$ is determined that moves captured (red) reference frame 2120b to model (black) reference frame 2120a. Applying the transformation $R^T$ to any point(s) captured relative to the captured (red) reference frame 2120b makes the point(s) lie on top of corresponding point(s) relative to model (black) reference frame 2120a. Then the tracked object 2114 will be in the right place from the point of view of model (black) reference frame 2120a to facilitate recognition, comparison and so forth. In determining the motion of object 2114, image processing system 106 can determine its location and direction by computationally analyzing images captured by cameras 102, 104 and motion information captured by sensors. For example, an apparent position of any point on the object (in 3D space) at capture time $$t = t_1 : \begin{bmatrix} x \\ y \\ z \\ 1 \end{bmatrix},$$

can be converted to a position of the point on the original model object at training time $$t = t_0 : \begin{bmatrix} x' \\ y' \\ z' \\ 1 \end{bmatrix}$$

using an affine transform $$\begin{bmatrix} R_{ref} & T_{ref} \\ 0 & 1 \end{bmatrix}.$$

The correct location at capture time $t=t_1$ of a point on the tracked object with respect to model reference frame 120a is given by equation (3):

$$\begin{bmatrix} R_{ref}^T & (R_{ref}^T)*-T_{ref} \\ 0 & 1 \end{bmatrix} * \begin{bmatrix} x \\ y \\ z \\ 1 \end{bmatrix} = \begin{bmatrix} x' \\ y' \\ z' \\ 1 \end{bmatrix} \quad (3)$$

Where:
$R_{ref}$—Represents an affine transform describing the transformation from the hand reference frame 2120b to the model reference frame 2120a.
$T_{ref}$—Represents translation of the hand reference frame 2120b to the model reference frame 2120a.

Figure 22:
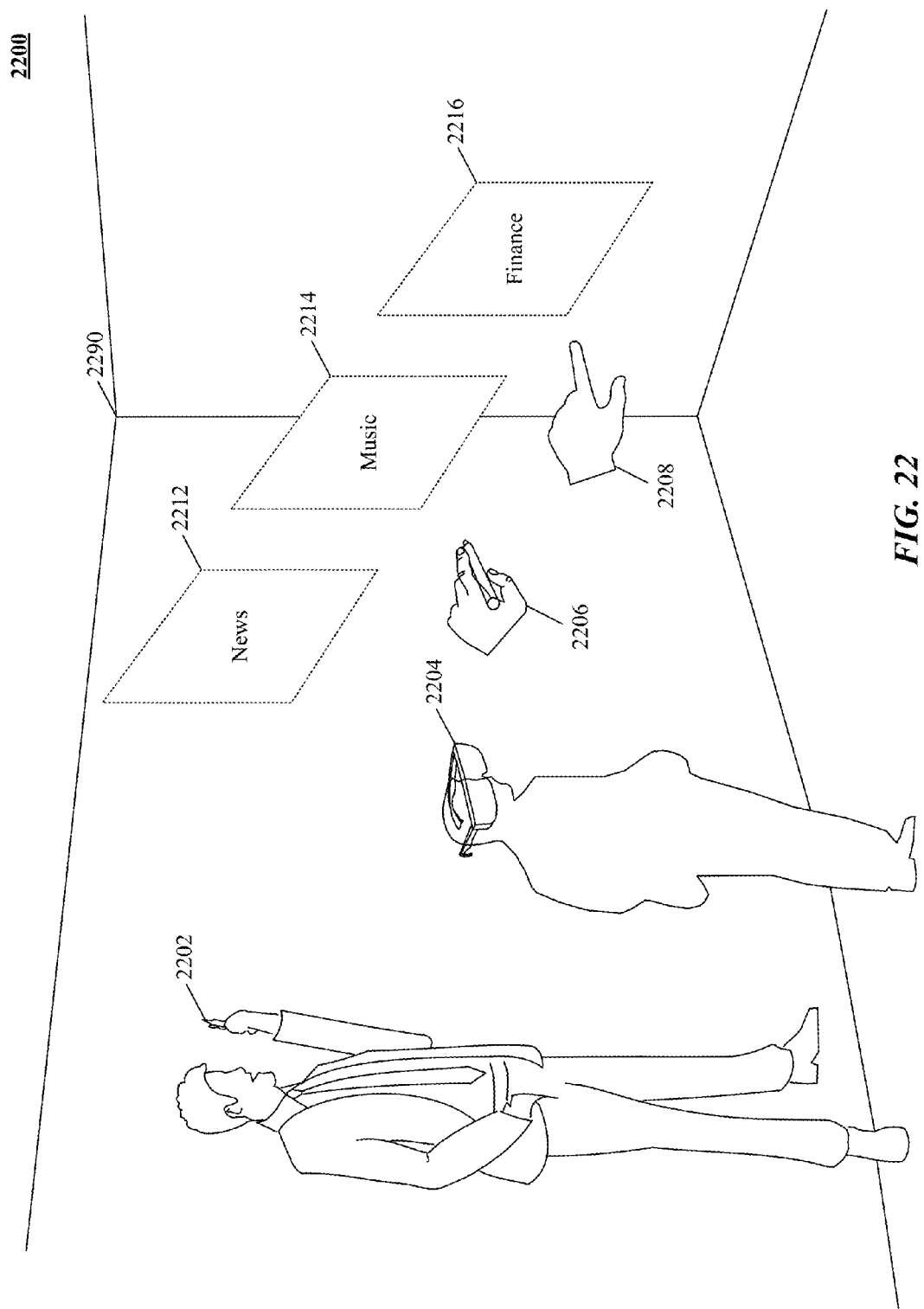
FIG. 22 is one implementation of selecting among virtual interaction modalities to interact with in a pervasive augmented environment.
Figure 23A:
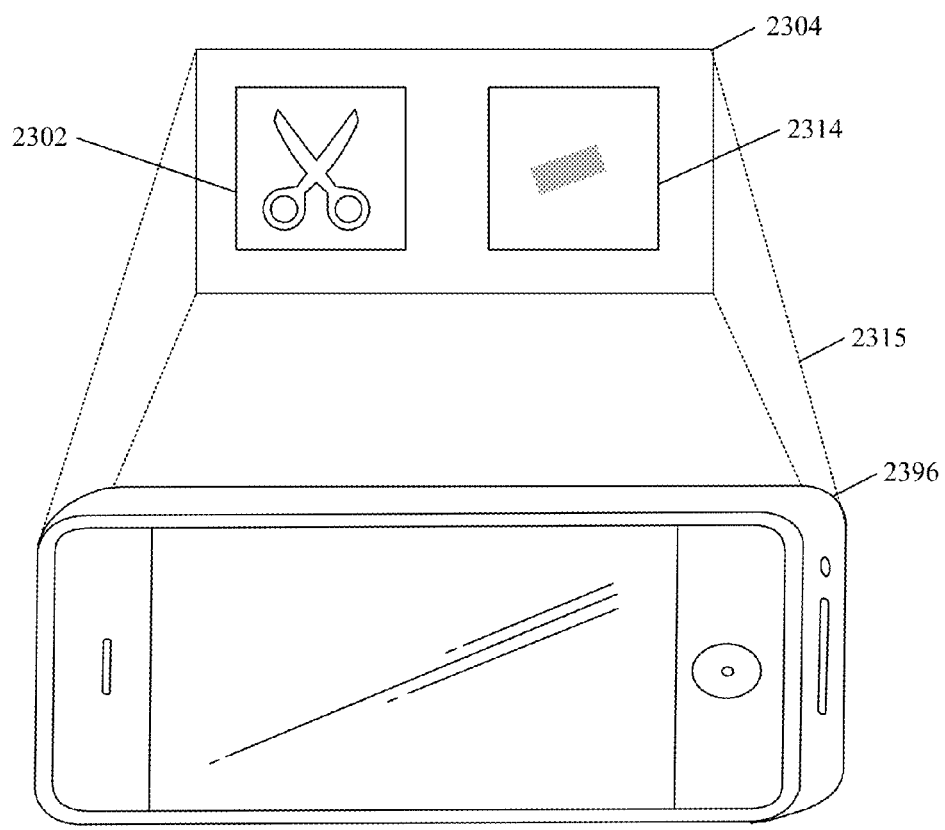
FIGS. 23A, 23B, 23C, 23D, and 23E illustrate one implementation of interacting with marker images that trigger augmented illusions in a pervasive virtual environment.
Figure 23B:
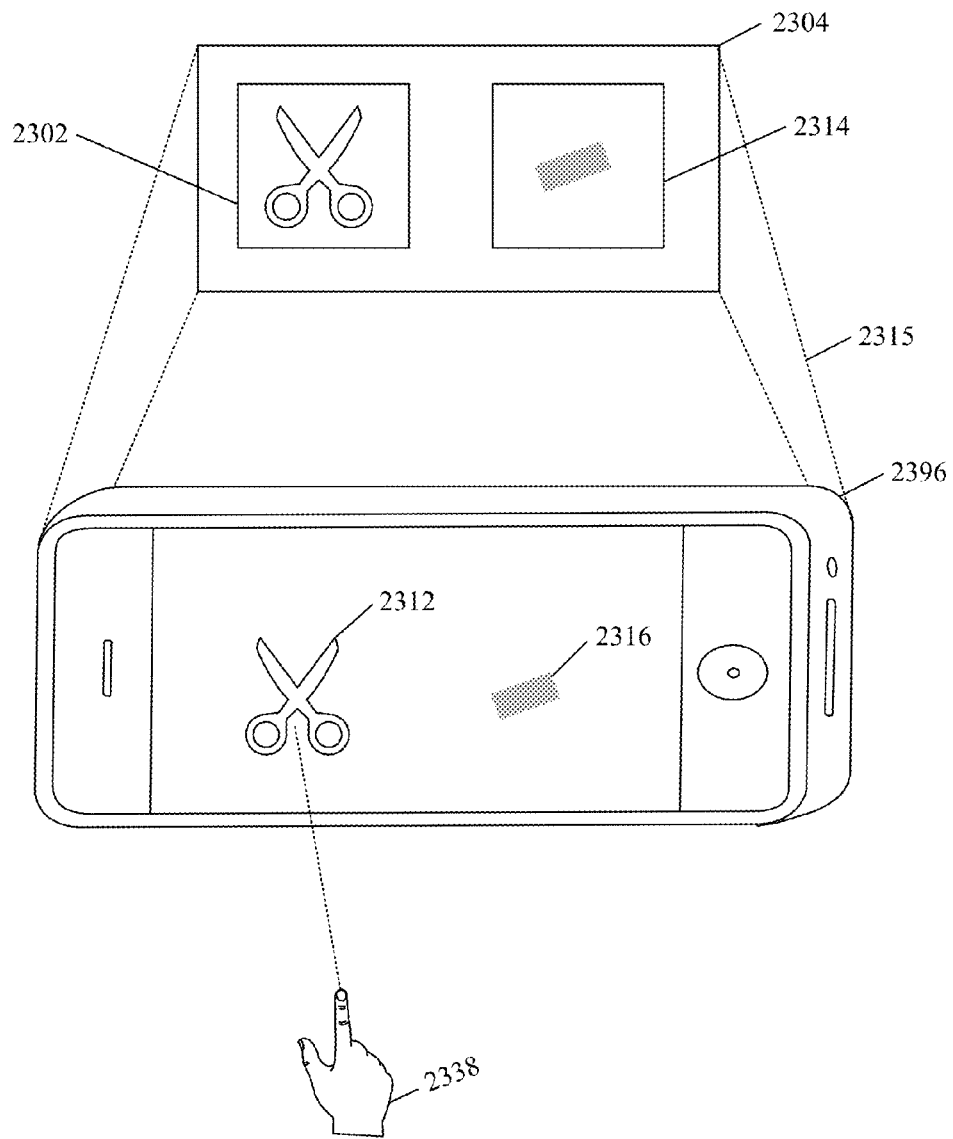
Figure 23C:
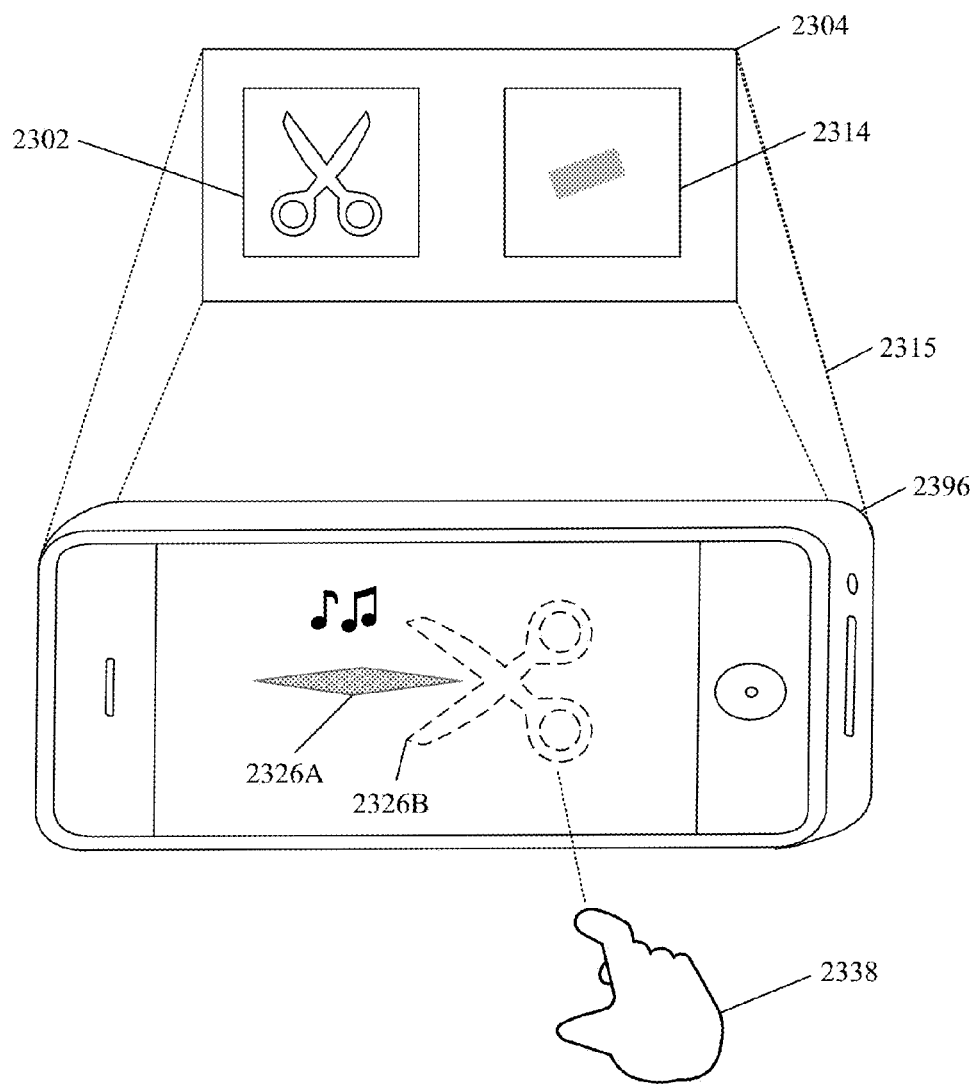
Figure 23D:
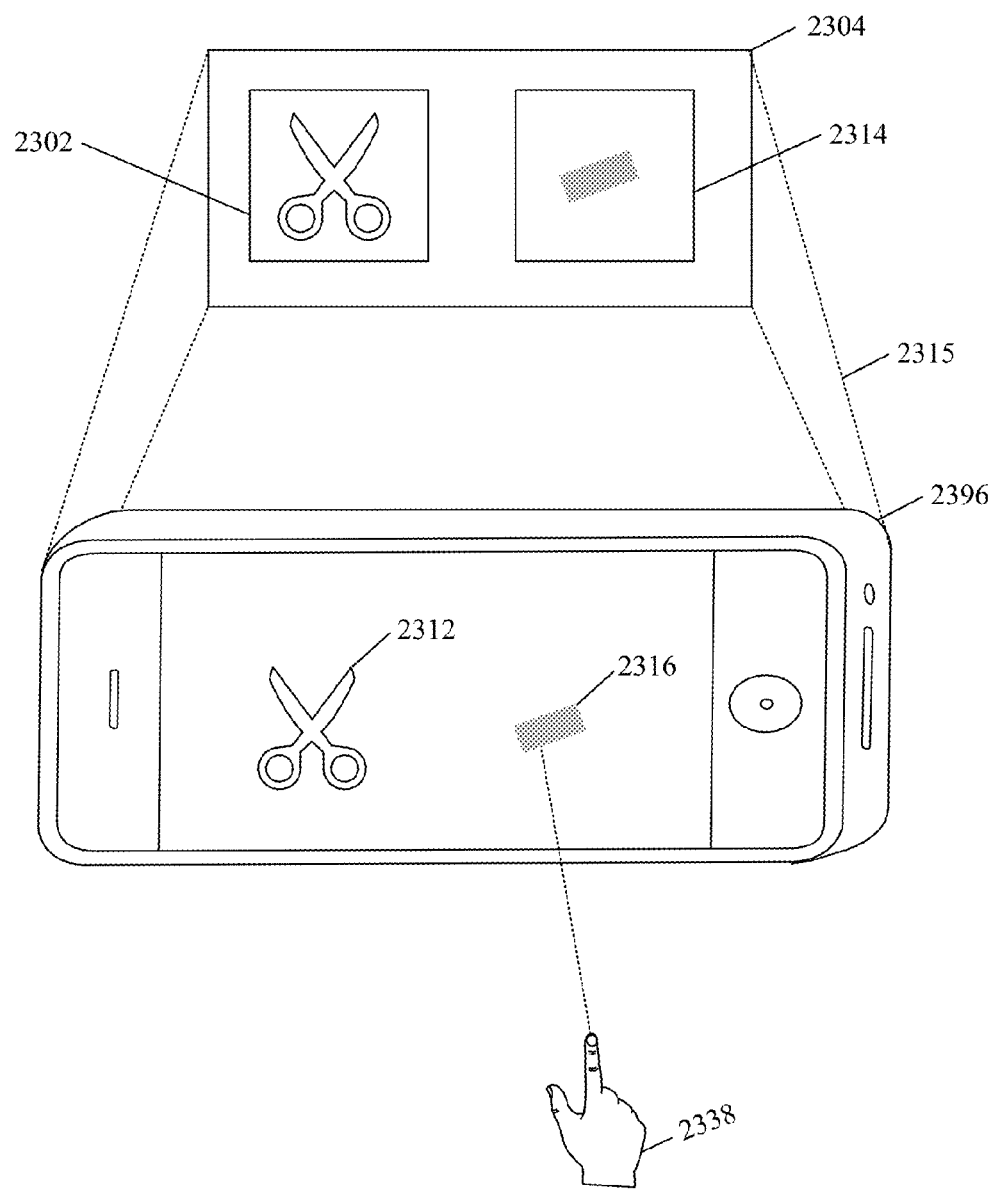
Figure 23E:
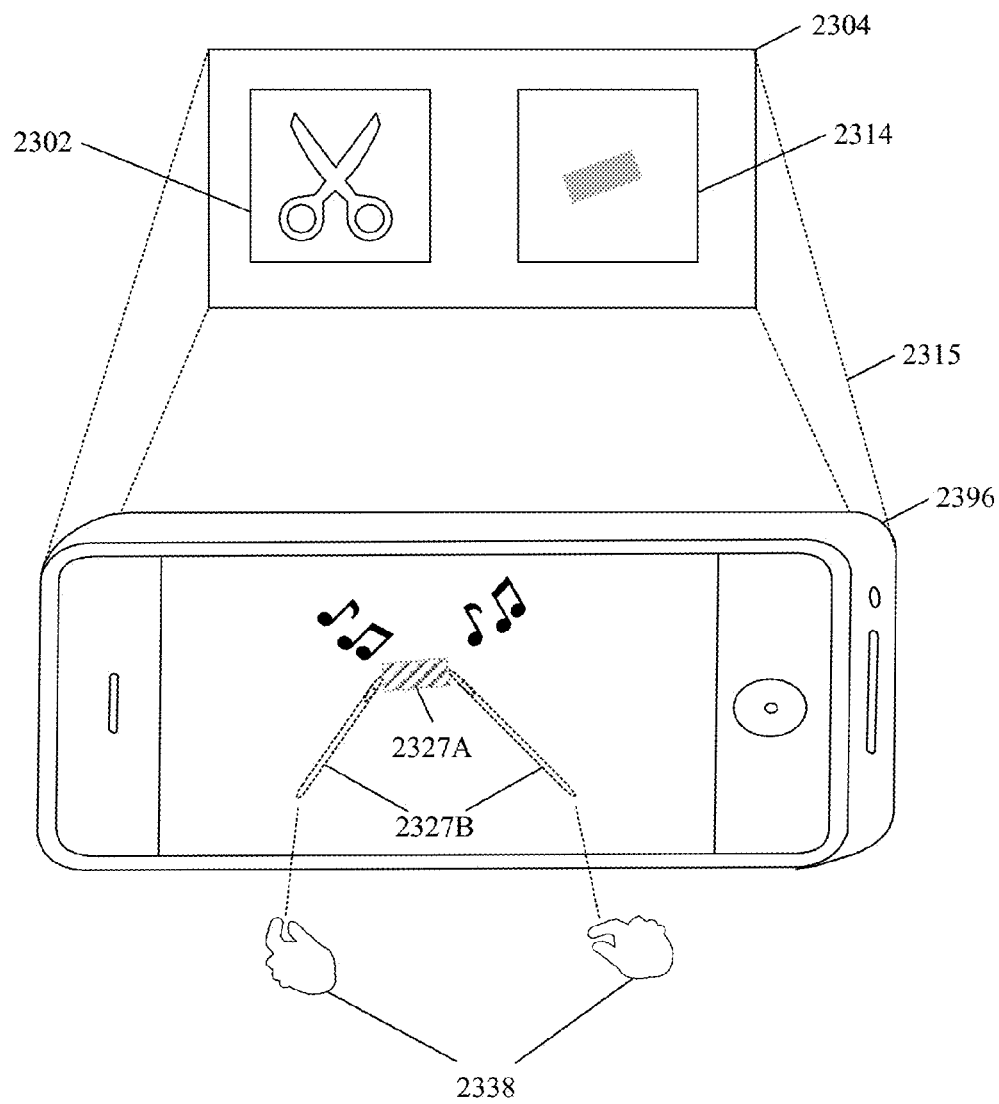

Again with reference to FIG. 21C, block 2104 illustrates hand reference frame 2120b, which can be represented by a 3×3 matrix $R'=[u_1', u_2', u_3']$ and model frame 2120a, which can be represented by a 3×3 matrix $R=[u_1, u_2, u_3]$. The objective is to transform R' (reference frame 2120b) into R (reference frame 2120a) so that any point on the hand 2114 being authenticated known with reference to frame 2120b can be compared to a point or points of the hand 2114 as taught (i.e., known) with reference to frame 2120a. Accordingly, an affine transform $R^T_{ref}=R(R')^T$ will achieve this objective. Affine transform $R^T_{ref}$ can be expressed in terms of R and R' as shown by equation (4):

$$R_{ref}^T = \begin{bmatrix} u_1 \cdot u_1' & u_1 \cdot u_2' & u_1 \cdot u_3' \\ u_2 \cdot u_1' & u_3 \cdot u_3' & u_2 \cdot u_3' \\ u_3 \cdot u_1' & u_3 \cdot u_2' & u_3 \cdot u_3' \end{bmatrix} \quad T = \begin{bmatrix} a \\ b \\ c \end{bmatrix} \quad (4)$$

is a vector representing a translation of the object with respect to origin of the coordinate system of the translated frame Augmented Reality FIG. 22 is one implementation of selecting among virtual interaction modalities to interact with in a pervasive augmented environment 2200. Pervasive augmented environment 2200 that supplements the real world with virtual, computer-generated objects that appear to co-exist in the same space as the real world. A smart phone 2202 or heads up display 2204 can be used to implement an augmented reality functionality, according to one implementation by displaying a projected image or graphic (2212, 2214, 2216) in a real world space 2290 where the projected image or graphic is superimposed over a real world view 2290 as perceived by the user through the lens elements of the smart phone 2202 or heads up display 2204.

In some implementations, the computer-generated graphics (2212, 2214, 2216) of the pervasive augmented environment 2200 can interact with a user's perceptions of a real world environment 2290 using gestures (2206, 2208) or other body movements. In other implementations, a virtual object integrated into an augmented rendering of a real environment can be projected to a user of a smart phone 2202 or heads up display 2204. Motion information of a user body portion can be determined based at least in part upon sensory information received from imaging 102, 104 or acoustic or other sensory devices. Control information is communicated to a system based in part on a combination of the motion of the smart phone 2202 or heads up display 2204 and the detected motion of the user determined from the sensory information received from imaging 102, 104 or acoustic or other sensory devices. The virtual device experience can be augmented in some implementations by the addition of haptic, audio and/or other sensory information projectors. For example, with reference to FIG. 22, optional a video projector can project an image of a newspaper (e.g., virtual object 2212) superimposed in the living room 2290 of a user; thereby creating a virtual experience of reading an actual newspaper, even though no newspaper is present. In some implementations, an optional haptic projector can project the feeling of the texture of the "virtual newspaper" to the reader's finger. In other implementations, an optional audio projector can project the sound of a newspaper page turning in response to detecting the reader making a swipe to turn the newspaper page.

In other implementations, multiple virtual objects or virtual interaction spaces can be superimposed in a real world space to create an augmented experience for a user. In such an implementation, a gesture can be detected that selects one or more virtual objects or virtual interaction spaces in the pervasive augmented environment 2200. Further, subsequent gestures can be interpreted to virtually interact with the one or more selected virtual objects or virtual interaction spaces, as described above.

FIGS. 23A, 2B, 2C, 2D, and 2E illustrate one implementation of interacting with marker images 2302 and 2304 that trigger augmented illusions 2312 and 2316 in a pervasive virtual environment 2300A-E, when in the field of view 2315 of smart phone 2396's camera. In one implementation, a smart phone 2396 can detect one or more marker images or initialization signal sources in a real world space and trigger augmented illusions 2312 and 2316 in response to the detection. In some implementations, one or more marker images or initialization signal sources are selected by a gesture performed by a user and interpreted by the smart phone 2396. Further, subsequent gestures can be detected to interact with the respective augmented illusions 2312 and 2316. In yet other implementations, paradigm setting gestures are detected that are specific to each of the generated augmented illusions 2312 and 2316 and uniquely control their responsiveness.

For example, as shown in FIGS. 23A, 2B, 2C, 2D, and 2E, an image marker of a scissor 2302 and a drum pad 2314 are detected by the smart phone 2396. Further, a user performs a gesture 2338 such as a forward pointing finger to select one of the marker images. Once selected, a corresponding augmented illusion is generated for the selected marker image. Following this, a subsequent paradigm setting gesture 2338 is detected to set a context for interacting with the generated augmented illusion. In one instance, a twin-finger movement can mean cutting a virtual paper 2326A with the virtual scissor 2326B or drumming the virtual drum pad 2327A with virtual sticks 2327B.

Figure 24:
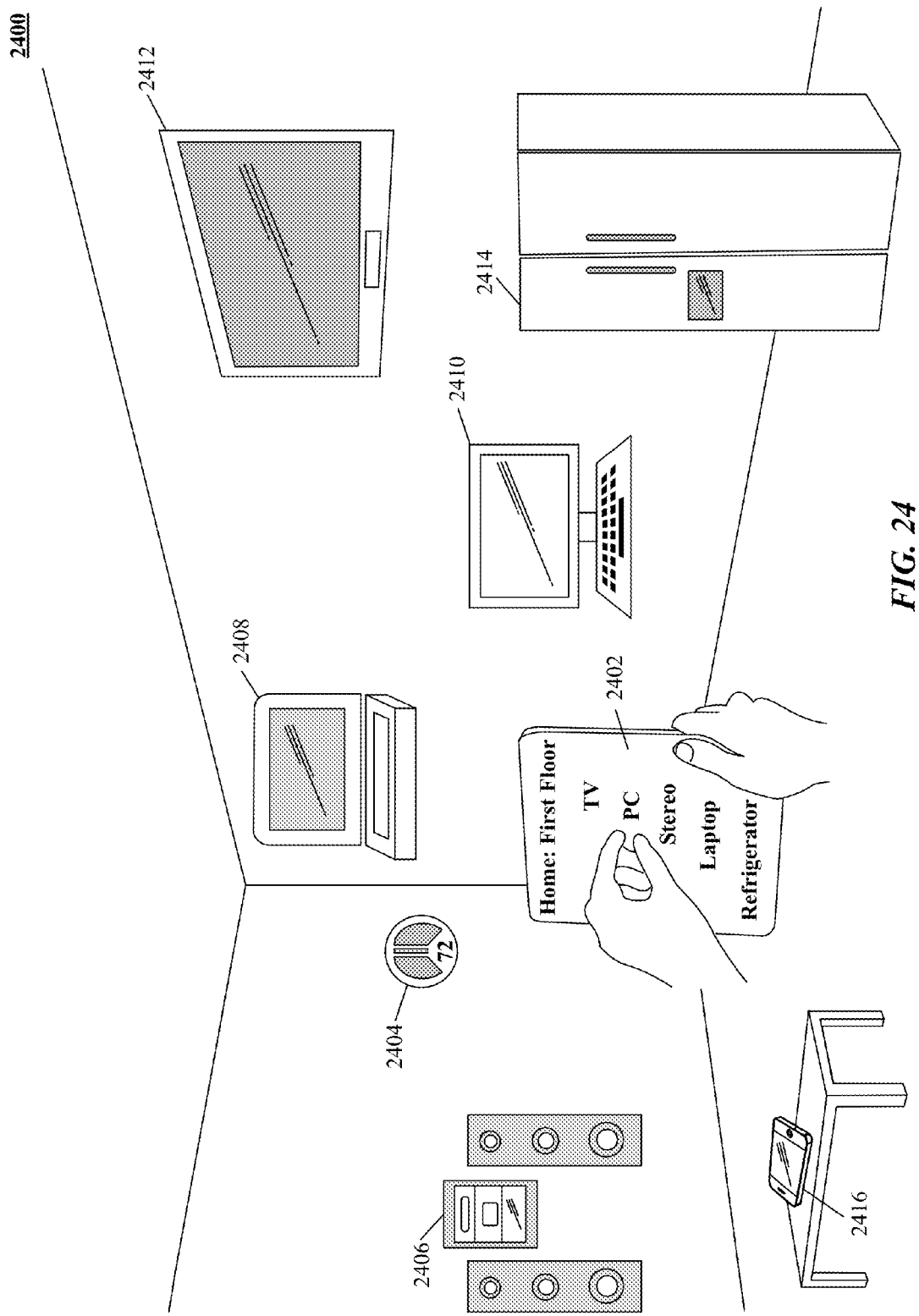
FIG. 24 is one implementation of a platform providing abstract feature information to an application.

FIG. 24 is one implementation of a platform providing abstract feature information to an application. In particular, FIG. 24 is one implementation of using a touch command to select a device from among heterogeneous devices in a pervasive computing environment 2400. In some implementations, data is created for display by the smart phone 2416 or another device or virtual screen in the environment 2400, which identifies the heterogeneous devices. In other implementations, a subsequent touch command 2402 is received that selects one of the identified heterogeneous devices, as shown in FIG. 24.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

Particular Implementations

In one implementation, described is a method of determining command input to a machine responsive to control object gestures in three dimensional (3D) sensory space. The method comprises determining observation information including gestural motion of a control object in three dimensional (3D) sensory space from at least one image captured at time t0, constructing a 3D solid model to represent the control object by fitting one or more 3D solid capsules to the observation information based on the image captured at time t0, responsive to modifications in the observation information based on another image captured at time t1, wherein the control object moved between t0 and t1, improving alignment of the 3D solid capsules to the modified observation information by determining variance between a point on another set of observation information based on the image captured at time t1 and a corresponding point on at least one of the 3D solid capsules fitted to the observation information based on the image captured at time t0 and responsive to the variance adjusting the 3D solid capsules and determining a gesture performed by the control object based on the adjusted 3D solid capsules, and interpreting the gesture as providing command input to a machine under control.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

In some implementations, adjusting the 3D solid capsules further includes improving conformance of the 3D solid capsules to at least one of length, width, orientation, and arrangement of portions of the observation information.

In other implementations, the method further includes receiving an image of a hand as the control object, determining span modes of the hand, wherein the span modes include at least a finger width span mode and a palm width span mode, and using span width parameters for the finger width and palm width span modes to initialize 3D solid capsules of a 3D solid model of the hand.

In yet other implementations, the method further includes receiving an image of a hand as the control object, determining span modes of the hand, wherein the span modes include at least a finger width span mode, a palm width span mode, and a wrist width span mode, and using span width parameters for the finger width, palm width, and wrist width span modes to initialize a 3D solid model of the hand and corresponding arm.

In a further implementation, the method includes interpreting the gesture as selecting one or more heterogeneous devices in the 3D sensory space.

The method further includes interpreting the gesture as selecting one or more heterogeneous marker images that trigger augmented illusions.

The method further includes automatically switching the machine under control from one operational mode to another in response to interpreting the gesture.

The method further includes determining whether the point on another set of observation information based on the image captured at time t1 and the corresponding point on one of the 3D solid capsules fitted to the observation information defined based on the image captured at time t0 are within a threshold closest distance.

The method further includes pairing point sets on an observation information of the control object with points on axes of the 3D solid capsules, wherein the observation information points lie on vectors that are normal to the axes and determining a reduced root mean squared deviation (RMSD) of distances between paired point sets.

The method further includes pairing point sets on an observation information of the control object with points on the 3D solid capsules, wherein normal vectors to the points sets are parallel to each other and determining a reduced root mean squared deviation (RMSD) of distances between bases of the normal vectors.

The method further includes determining from the 3D solid model at least one of a velocity of a portion of a hand, a state, a pose.

The method further includes determining at least one of a velocity of one or more fingers, and a relative motion of a portion of the hand.

The method further includes determining at least one of a position, an orientation, and a location of a portion of the hand.

The method further includes determining at least one of whether one or more fingers are extended or non-extended, one or more angles of bend for one or more fingers, a direction to which one or more fingers point, a configuration indicating a pinch, a grab, an outside pinch, and a pointing finger.

The method further includes determining from the 3D solid model whether a tool or object is present in the hand.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

In yet another implementation, described is a method of determining gesture features responsive to control object gestures in three dimensional (3D) sensory space. The method comprises determining observation information including gestural motion of a control object in three dimensional (3D) sensory space from at least one image of the control object, constructing a 3D solid model to represent the control object by fitting one or more 3D solid capsules to the observation information, determining gesture features of the control object based on the 3D solid capsules, and issuing a feature-specific command input to a machine under control based on the determined gesture features.

The method described in this section and other sections of the technology disclosed can include one or more of the following features and/or features described in connection with additional methods disclosed.

In one implementation, the control object is a hand and the gesture features include edge information for fingers of the hand.

In another implementation, the control object is a hand and the gesture features include edge information for palm of the hand.

In yet another implementation, the control object is a hand and the gesture features include joint angle and segment orientation information of the hand.

In a further implementation, the control object is a hand and the gesture features include finger segment length information for fingers of the hand.

In yet further implementation, the control object is a hand and the gesture features include curling of the hand during the gestural motion.

In another implementation, the control object is a hand and the gesture features include at least one of a pose, a grab strength, a pinch strength and a confidence of the hand.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

In yet another implementation, a method of authenticating a user of a machine responsive to control object gestures in three dimensional (3D) sensory space is described. The method comprises determining observation information including gestural motion of a control object in three dimensional (3D) sensory space from at least one image of the control object, constructing a 3D solid model to represent the control object by fitting one or more 3D solid capsules to the observation information, determining biometric features of the control object based on the 3D solid capsules, authenticating the control object based on the determined biometric features, determining a command input indicated by the gestural motion of the control object, determining whether the authenticated control object is authorized to issue the command input, and issuing an authorized command input to a machine under control.

The method described in this section and other sections of the technology disclosed can include one or more of the following features and/or features described in connection with additional methods disclosed.

In one implementation, the control object is a hand and the determined biometric features include at least one of measurements across a palm of the hand and finger width at a first knuckle of the hand.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

What is claimed is:

1. A method of determining command input to a machine responsive to control object gestures in three dimensional (3D) sensory space, the method comprising:

configuring a 3D model representing a control object by fitting one or more 3D capsules to observation information based on an image captured at time t0 of gestural motion of the control object in three dimensional (3D) sensory space;

responsive to modifications in the observation information based on another image captured at time t1, improving alignment of the 3D capsules to the observation information by:

determining variance between a point on another set of observation information based on the image captured at time t1 and a corresponding point on at least one of the 3D capsules fitted to the observation information based on the image captured at time t0 by:

pairing point sets from points on the observation information with points on axes of the 3D capsules, wherein points on observation information lie on vectors that are normal to points on axes; and determining the variance comprising a reduced root mean squared deviation (RMSD) of distances between paired point sets; and responsive to the variance adjusting the 3D capsules and determining a gesture performed by the control object based on the 3D capsules as adjusted; and interpreting the gesture as providing command input to a machine.

2. The method of claim 1, wherein adjusting the 3D capsules further includes improving conformance of the 3D capsules to at least one of length, width, orientation, and arrangement of portions of the observation information.

3. The method of claim 1, further including:
receiving an image of a hand as the control object;
determining span modes of the hand, wherein the span modes include at least a finger width span mode and a palm width span mode; and
using span width parameters for the finger width span mode and the palm width span mode to initialize 3D capsules of a 3D model of the hand.

4. The method of claim 1, further including:
receiving an image of a hand as the control object;
determining span modes of the hand, wherein the span modes include at least a finger width span mode, a palm width span mode, and a wrist width span mode; and
using span width parameters for the finger width span mode, palm width span mode, and wrist width span mode to initialize a 3D model of the hand and corresponding arm.

5. The method of claim 1, further including interpreting the gesture as selecting one or more heterogeneous devices.

6. The method of claim 1, further including interpreting the gesture as selecting one or more heterogeneous marker images that trigger augmented illusions.

7. The method of claim 1, further including automatically switching the machine under control from one operational mode to another in response to interpreting the gesture.

8. The method of claim 1, wherein determining the variance further includes determining whether the point on another set of observation information based on the image captured at time t1 and the corresponding point on one of the 3D capsules fitted to the observation information defined based on the image captured at time t0 are within a threshold closest distance.

9. The method of claim 1, wherein determining the variance further includes:
pairing point sets on an observation information of the control object with points on the 3D capsules, wherein normal vectors to the points sets are parallel to each other; and
determining a reduced root mean squared deviation (RMSD) of distances between bases of the normal vectors.

10. The method of claim 1, further including determining from the 3D model, at least one of a velocity of a portion of a hand, a state, a pose.

11. The method of claim 10, wherein the determining a velocity further includes determining at least one of a velocity of one or more fingers, and a relative motion of a portion of the hand.

12. The method of claim 10, wherein the determining a state further includes determining at least one of a position, an orientation, and a location of a portion of the hand.

13. The method of claim 10, wherein the determining a pose further includes determining at least one of whether one or more fingers are extended or non-extended, one or more angles of bend for one or more fingers, a direction to which one or more fingers point, a configuration indicating a pinch, a grab, an outside pinch, and a pointing finger.

14. The method of claim 10, further including determining from the 3D model whether a tool or object is present in the hand.

15. The method of claim 1, further comprising:
determining gesture features for the control object based on the 3D capsules; and
issuing a feature-specific command input to a machine under control based on the gesture features.

16. The method of claim 15, wherein the control object is a hand and the gesture features include edge information for fingers of the hand.

17. The method of claim 15, wherein the control object is a hand and the gesture features include edge information for palm of the hand.

18. The method of claim 15, wherein the control object is a hand and the gesture features include joint angle and segment orientation information of the hand.

19. The method of claim 15, wherein the control object is a hand and the gesture features include finger segment length information for fingers of the hand.

20. The method of claim 15, wherein the control object is a hand and the gesture features include curling of the hand during gestural motion.

21. The method of claim 15, wherein the control object is a hand and the gesture features include at least one of a pose, a grab strength, a pinch strength and a confidence of the hand.

22. The method of claim 1, further comprising:
determining biometric features for the control object based on the 3D capsules;
authenticating the control object based on the biometric features determined;
upon determining the command input indicated by gestural motion of the control object, determining whether the control object is authorized to issue the command input; and
issuing an authorized command input to a machine under control.

23. The method of claim 22, wherein the control object is a hand and the biometric features determined include at least one of measurements across a palm of the hand and finger width at a first knuckle of the hand.

24. A non-transitory computer readable storage medium impressed with computer program instructions to determine command input to a machine responsive to control object gestures in three dimensional (3D) sensory space, which instructions, when executed on a processor, implement actions comprising:
configuring a 3D model representing a control object by fitting one or more 3D capsules to observation information based on an image captured at time t0 of gestural motion of the control object in three dimensional (3D) sensory space;
responsive to modifications in the observation information based on another image captured at time t1, improving alignment of the 3D capsules to the observation information by:
determining variance between a point on another set of observation information based on the image captured at time t1 and a corresponding point on at least one of the 3D capsules fitted to the observation information based on the image captured at time t0 by:
pairing point sets from points on the observation information with points on axes of the 3D capsules, wherein points on observation information lie on vectors that are normal to points on axes; and
determining the variance comprising a reduced root mean squared deviation (RMSD) of distances between paired point sets; and responsive to the variance adjusting the 3D capsules and determining a gesture performed by the control object based on the 3D capsules as adjusted; and interpreting the gesture as providing command input to a machine.

25. A system to determine command input to a machine responsive to control object gestures in three dimensional (3D) sensory space, comprising:
- a processor and a computer readable storage medium storing computer instructions configured to cause the processor to:
  - configure a 3D model representing a control object by fitting one or more 3D capsules to observation information based on an image captured at time t0 of gestural motion of the control object in three dimensional (3D) sensory space;
  - responsive to modifications in the observation information based on another image captured at time t1, improve alignment of the 3D capsules to the observation information by:
    - determining variance between a point on another set of observation information based on the image captured at time t1 and a corresponding point on at least one of the 3D capsules fitted to the observation information based on the image captured at time t0 by:
      - pairing point sets from points on the observation information with points on axes of the 3D capsules, wherein points on observation information lie on vectors that are normal to points on axes; and
      - determining the variance comprising reduced root mean squared deviation (RMSD) of distances between paired point sets; and
    - responsive to the variance adjusting the 3D capsules; and determine a gesture performed by the control object based on the 3D capsules as adjusted; and
  - interpret the gesture as providing command input to a machine.

* * * * *